(12) United States Patent
Narita et al.

(10) Patent No.: US 11,264,648 B2
(45) Date of Patent: Mar. 1, 2022

(54) POWER STORAGE DEVICE, METHOD FOR MANUFACTURING POWER STORAGE DEVICE, AND ELECTRONIC DEVICE

(71) Applicant: SEMICONDUCTOR ENERGY LABORATORY CO., LTD., Atsugi (JP)

(72) Inventors: Kazuhei Narita, Kanagawa (JP); Ryota Tajima, Kanagawa (JP); Teppei Oguni, Kanagawa (JP)

(73) Assignee: SEMICONDUCTOR LABORATORY ENERGY CO., LTD., Kanagawa-ken (JP)

( * ) Notice: Subject to any disclaimer, the term of this patent is extended or adjusted under 35 U.S.C. 154(b) by 110 days.

(21) Appl. No.: 16/704,142

(22) Filed: Dec. 5, 2019

(65) Prior Publication Data
US 2020/0112061 A1  Apr. 9, 2020

Related U.S. Application Data

(63) Continuation of application No. 15/371,820, filed on Dec. 7, 2016, now Pat. No. 10,535,899.

(30) Foreign Application Priority Data

Dec. 10, 2015 (JP) .................................. 2015-240755

(51) Int. Cl.
 *H01M 10/0569* (2010.01)
 *H01G 11/84* (2013.01)
 (Continued)

(52) U.S. Cl.
 CPC ........ *H01M 10/0569* (2013.01); *G04G 19/00* (2013.01); *H01G 11/28* (2013.01);
 (Continued)

(58) Field of Classification Search
 CPC ......... H01M 10/0569; H01M 10/0525; H01M 10/0568; H01M 2/1626; H01M 2/1653;
 (Continued)

(56) References Cited

U.S. PATENT DOCUMENTS 5,135,694 A * 8/1992 Akahane ........... B29C 45/14065
                                                    264/138
5,889,737 A * 3/1999 Alameh ................. G04C 10/00
                                                    368/204
(Continued)

FOREIGN PATENT DOCUMENTS

CN      001675783 A      9/2005
CN      103682258 A      3/2014
(Continued)

OTHER PUBLICATIONS

Ota.H et al., "Characterization of Lithium Electrode in Lithium Imides/Ethylene Carbonate, and Cyclic Ether Electrolytes", J. Electrochem. Soc. (Journal of the Electrochemical Society), Feb. 9, 2004, vol. 151, No. 3, pp. 427-436.
(Continued)

*Primary Examiner* — Jimmy Vo
(74) *Attorney, Agent, or Firm* — Nixon Peabody LLP; Jeffrey L. Costellia

(57) ABSTRACT

To provide a power storage device whose charge and discharge characteristics are unlikely to be degraded by heat treatment. To provide a power storage device that is highly safe against heat treatment. The power storage device includes a positive electrode, a negative electrode, a separator, an electrolytic solution, and an exterior body. The separator is located between the positive electrode and the negative electrode. The separator contains polyphenylene sulfide or solvent-spun regenerated cellulosic fiber. The electrolytic solution contains a solute and two or more kinds
(Continued)

of solvents. The solute contains LiBETA. One of the solvents is propylene carbonate.

9 Claims, 33 Drawing Sheets

(51) Int. Cl.
| | |
|---|---|
| H01M 4/36 | (2006.01) |
| H01M 50/44 | (2021.01) |
| H01M 50/411 | (2021.01) |
| H01M 50/429 | (2021.01) |
| G04G 19/00 | (2006.01) |
| H01G 11/28 | (2013.01) |
| H01G 11/32 | (2013.01) |
| H01G 11/52 | (2013.01) |
| H01G 11/60 | (2013.01) |
| H01G 11/62 | (2013.01) |
| H01G 11/86 | (2013.01) |
| H01M 4/525 | (2010.01) |
| H01M 4/587 | (2010.01) |
| H01M 4/66 | (2006.01) |
| H01M 10/0525 | (2010.01) |
| H01M 10/0568 | (2010.01) |

(52) U.S. Cl.
CPC .............. *H01G 11/32* (2013.01); *H01G 11/52* (2013.01); *H01G 11/60* (2013.01); *H01G 11/62* (2013.01); *H01G 11/84* (2013.01); *H01G 11/86* (2013.01); *H01M 4/366* (2013.01); *H01M 4/525* (2013.01); *H01M 4/587* (2013.01); *H01M 4/661* (2013.01); *H01M 4/669* (2013.01); *H01M 10/0525* (2013.01); *H01M 10/0568* (2013.01); *H01M 50/411* (2021.01); *H01M 50/4295* (2021.01); *H01M 50/44* (2021.01); *H01M 2300/0037* (2013.01); *Y02E 60/13* (2013.01); *Y02T 10/70* (2013.01)

(58) Field of Classification Search
CPC ...... H01M 4/366; H01M 4/525; H01M 4/587; H01M 4/661; H01M 4/669; G04G 19/00; H01G 11/28; H01G 11/32; H01G 11/52; H01G 11/60; H01G 11/62; H01G 11/84; H01G 11/86

See application file for complete search history.

(56) References Cited

U.S. PATENT DOCUMENTS

| | | | |
|---|---|---|---|
| 6,040,092 A | 3/2000 | Yamada et al. | |
| 7,261,972 B2 | 8/2007 | Inada et al. | |
| 7,642,015 B2 | 1/2010 | Inada et al. | |
| 8,597,830 B2 | 12/2013 | Kawakami et al. | |
| 8,663,841 B2 | 3/2014 | Tajima et al. | |
| 8,785,030 B2 | 7/2014 | Ueda | |
| 8,822,088 B2 | 9/2014 | Tajima et al. | |
| 9,070,950 B2 | 6/2015 | Kuriki et al. | |
| 9,183,995 B2 | 11/2015 | Inoue et al. | |
| 9,368,792 B2 | 6/2016 | Lee et al. | |
| 9,401,247 B2 | 7/2016 | Tajima et al. | |
| 9,461,300 B2 | 10/2016 | Osada et al. | |
| 9,580,322 B2 | 2/2017 | Lee et al. | |
| 9,735,430 B2 | 8/2017 | Kimura et al. | |
| 9,806,305 B2 | 10/2017 | Suzuki et al. | |
| 10,256,442 B2 | 4/2019 | Suzuki et al. | |
| 10,529,990 B2 | 1/2020 | Kimura et al. | |
| 2004/0224230 A1* | 11/2004 | Yanagida | H01M 4/133 429/231.8 |
| 2007/0224516 A1 | 9/2007 | Deguchi et al. | |
| 2013/0084495 A1 | 4/2013 | Tajima et al. | |
| 2013/0149605 A1 | 6/2013 | Kakehata et al. | |
| 2013/0164611 A1 | 6/2013 | Nanba et al. | |
| 2013/0236781 A1 | 9/2013 | Oguni et al. | |
| 2013/0249054 A1 | 9/2013 | Kuriki et al. | |
| 2013/0273405 A1 | 10/2013 | Takahashi et al. | |
| 2014/0004412 A1 | 1/2014 | Ogino | |
| 2014/0023920 A1 | 1/2014 | Yamazaki et al. | |
| 2014/0087251 A1 | 3/2014 | Takahashi et al. | |
| 2014/0099539 A1 | 4/2014 | Yamazaki et al. | |
| 2014/0099554 A1 | 4/2014 | Inoue et al. | |
| 2014/0127566 A1 | 5/2014 | Kuriki et al. | |
| 2014/0127567 A1 | 5/2014 | Kuriki et al. | |
| 2014/0370379 A1 | 12/2014 | Inoue et al. | |
| 2015/0086868 A1 | 3/2015 | Inoue et al. | |
| 2015/0132648 A1 | 5/2015 | Inoue et al. | |
| 2015/0140397 A1 | 5/2015 | Tajima et al. | |
| 2015/0140400 A1 | 5/2015 | Yamazaki et al. | |
| 2015/0147626 A1 | 5/2015 | Tajima et al. | |
| 2015/0155528 A1 | 6/2015 | Takahashi et al. | |
| 2015/0155530 A1 | 6/2015 | Takahashi et al. | |
| 2015/0162590 A1 | 6/2015 | Takahashi et al. | |
| 2015/0207148 A1 | 7/2015 | Kimura et al. | |
| 2015/0243962 A1 | 8/2015 | Hiroki et al. | |
| 2015/0333359 A1 | 11/2015 | Takahashi et al. | |
| 2015/0333360 A1 | 11/2015 | Tajima et al. | |
| 2015/0340664 A1 | 11/2015 | Takahashi et al. | |
| 2015/0349375 A1 | 12/2015 | Takahashi et al. | |
| 2016/0013469 A1 | 1/2016 | Tajima et al. | |
| 2016/0020035 A1 | 1/2016 | Inoue et al. | |
| 2016/0043363 A1 | 2/2016 | Tajima et al. | |
| 2016/0087305 A1 | 3/2016 | Yoneda et al. | |
| 2016/0118689 A1 | 4/2016 | Oguni et al. | |
| 2016/0156012 A1 | 6/2016 | Takahashi et al. | |
| 2016/0156071 A1 | 6/2016 | Yamakaji et al. | |
| 2016/0190545 A1 | 6/2016 | Momo et al. | |
| 2016/0204437 A1 | 7/2016 | Tajima et al. | |
| 2016/0218387 A1 | 7/2016 | Tajima | |
| 2016/0240325 A1 | 8/2016 | Tajima et al. | |
| 2016/0268064 A1 | 9/2016 | Ishikawa et al. | |
| 2017/0117589 A1 | 4/2017 | Tajima et al. | |
| 2020/0144621 A1 | 5/2020 | Kimura et al. | |

FOREIGN PATENT DOCUMENTS

| | | |
|---|---|---|
| JP | 60-053084 | 4/1985 |
| JP | 60-053084 A | 4/1985 |
| JP | 09-274901 A | 10/1997 |
| JP | 2004-087229 A | 3/2004 |
| JP | 2004-127556 A | 4/2004 |
| JP | 2005-228730 A | 8/2005 |
| JP | 3771319 | 4/2006 |
| JP | 2012-009418 A | 1/2012 |
| JP | 2013-187138 A | 9/2013 |
| JP | 2013-219015 A | 10/2013 |
| JP | 2014-044950 A | 3/2014 |
| JP | 2015-159107 A | 9/2015 |
| JP | 2015-187967 A | 10/2015 |
| WO | WO-2012/140709 | 10/2012 |

OTHER PUBLICATIONS

Chinese Office Action (Application No. 201611127609.0) dated Oct. 28, 2020.

\* cited by examiner

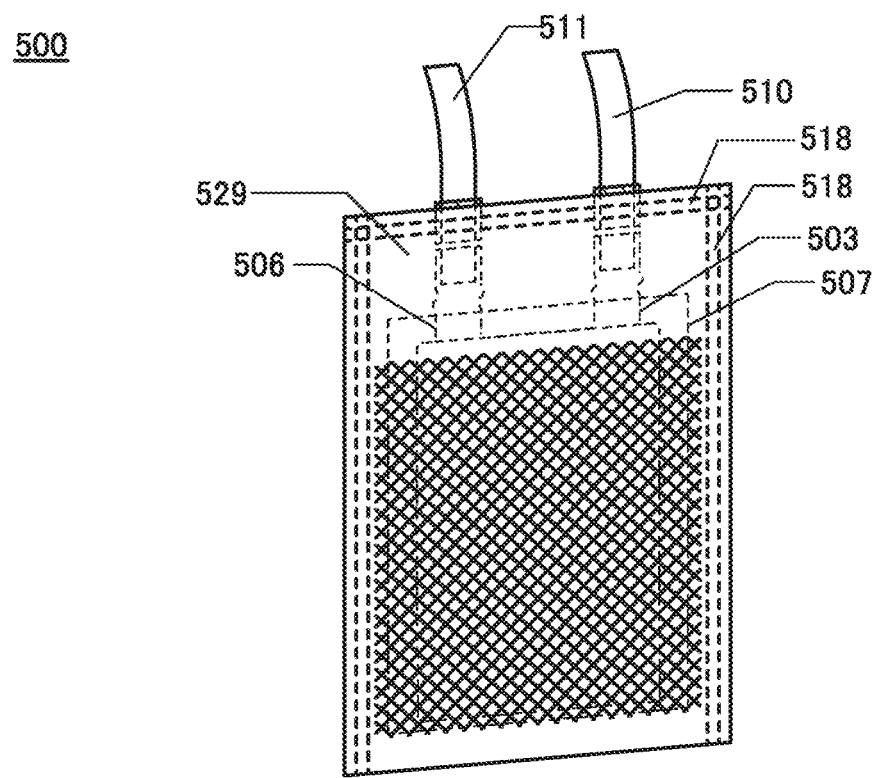

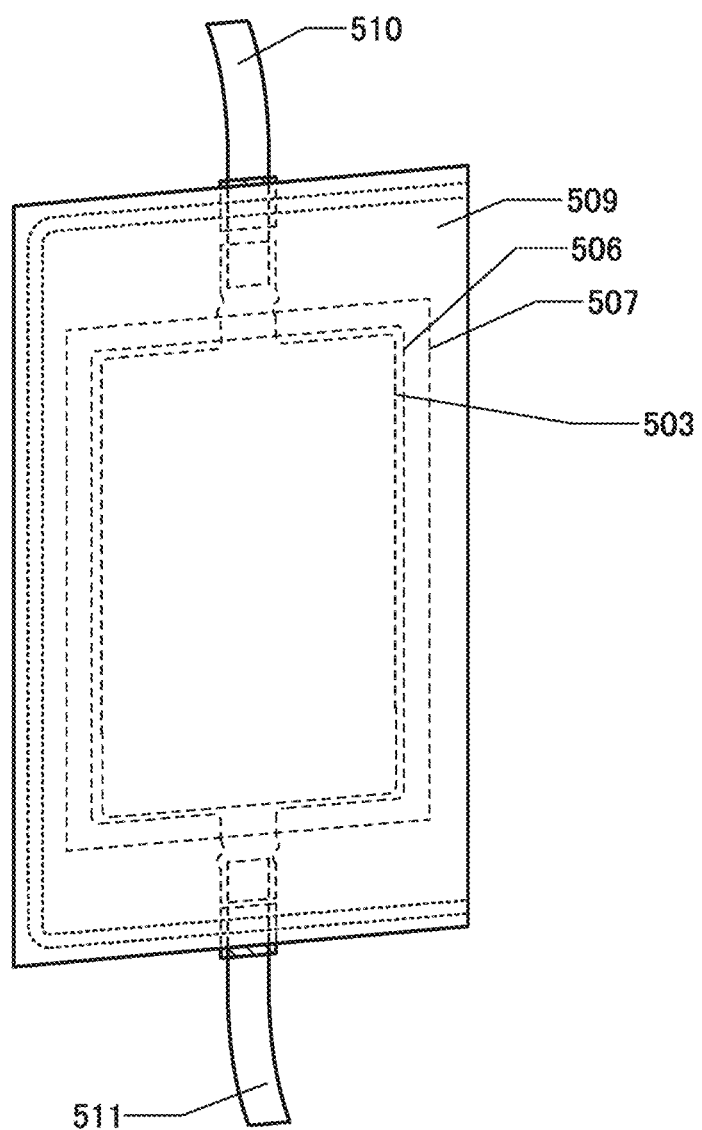

FIG. 9A
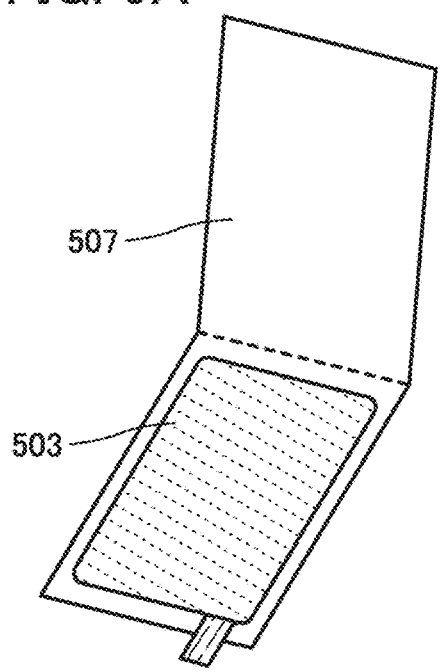
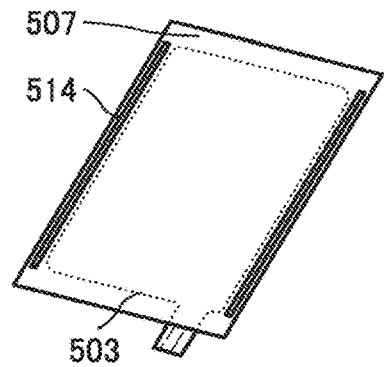
FIG. 9B
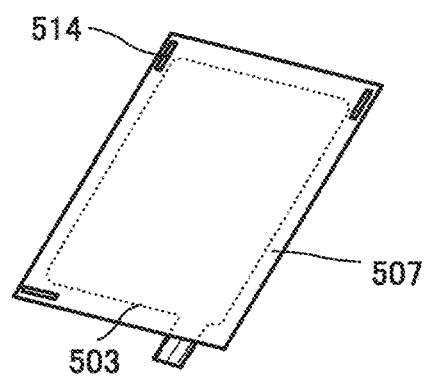
FIG. 9C
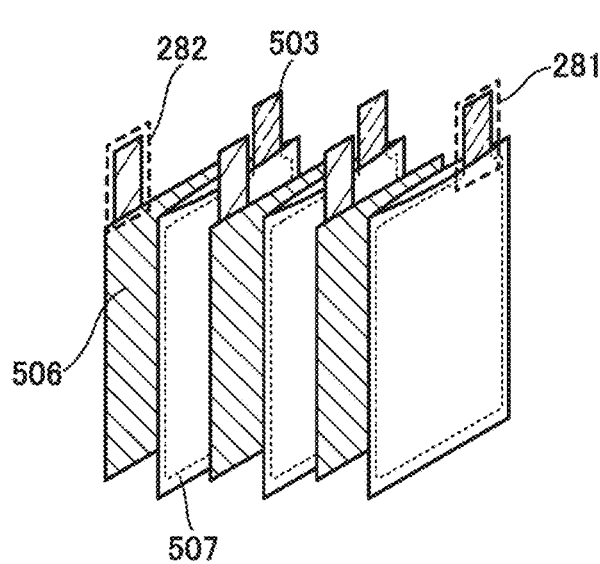
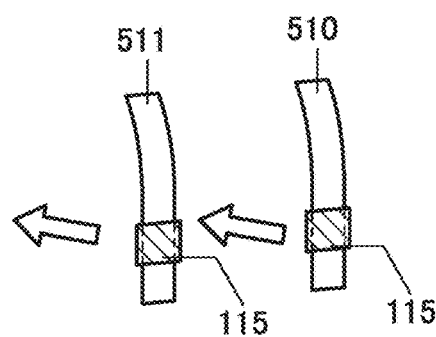

700,730

705A

750

FIG. 20A
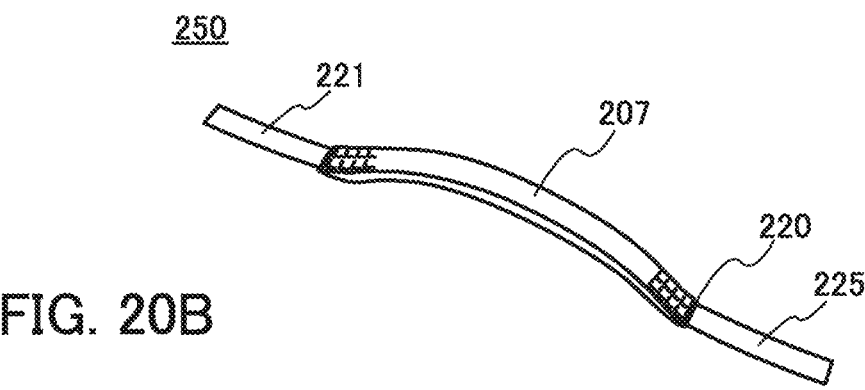
FIG. 20B
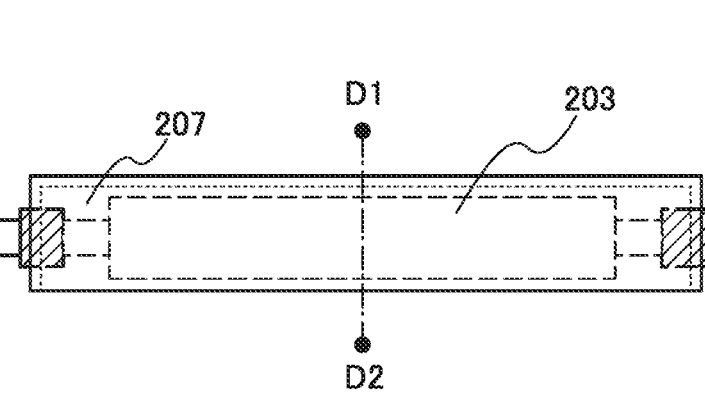
FIG. 20C1
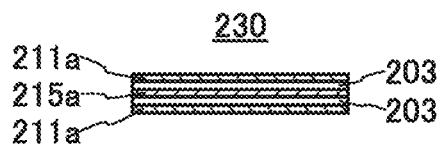
FIG. 20C2
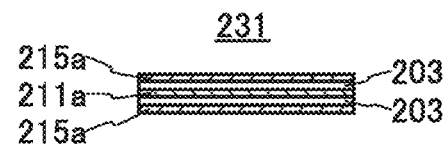

900

901

POWER STORAGE DEVICE, METHOD FOR MANUFACTURING POWER STORAGE DEVICE, AND ELECTRONIC DEVICE

BACKGROUND OF THE INVENTION

1. Field of the Invention

Embodiments of the present invention relate to a power storage device and an electronic device.

Note that one embodiment of the present invention is not limited to the above technical field. One embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the invention disclosed in this specification include a semiconductor device, a display device, a light-emitting device, a power storage device, a memory device, an imaging device, a driving method thereof, and a manufacturing method thereof.

In this specification, the power storage device is a collective term describing elements and devices that have a power storage function. For example, a power storage device (also referred to as a secondary battery) such as a lithium-ion secondary battery, a lithium-ion capacitor, and an electric double layer capacitor are included in the category of the power storage device.

2. Description of the Related Art

In recent years, a variety of power storage devices, for example, lithium-ion secondary batteries, lithium-ion capacitors, and air cells have been actively developed. In particular, demand for lithium-ion secondary batteries with high output and high energy density has rapidly grown with the development of the semiconductor industry, for portable information terminals such as mobile phones, smartphones, and laptop computers, portable music players, and digital cameras; medical equipment; next-generation clean energy vehicles such as hybrid electric vehicles (HEV), electric vehicles (EV), and plug-in hybrid electric vehicles (PHEV); and the like. The lithium-ion secondary batteries are essential as rechargeable energy supply sources for today's information society.

As described above, lithium-ion secondary batteries have been used for a variety of purposes in various fields. Properties necessary for such lithium-ion secondary batteries are high energy density, excellent cycle performance, safety in a variety of operation environments, and the like.

A lithium-ion secondary battery includes at least a positive electrode, a negative electrode, and an electrolytic solution (Patent Document 1).

REFERENCE

Patent Document

[Patent Document 1] Japanese Published Patent Application. No. 2012-009418

SUMMARY OF THE INVENTION

Lithium-ion secondary batteries that are to be mounted in electronic devices such as a wearable device and a portable information terminal need to resist heat treatment performed when the electronic devices are processed. Particularly in the case where a housing of the electronic device and a lithium-ion secondary battery are integrally formed, the lithium-ion secondary battery needs to have heat resistance to a temperature higher than or equal to the manufacturing temperature of the housing.

An object of one embodiment of the present invention is to provide a power storage device whose charging and discharging characteristics are unlikely to be degraded by heat treatment.

Another object of one embodiment of the present invention is to provide a power storage device that is highly safe against heat treatment.

Another object of one embodiment of the present invention is to provide a power storage device having high flexibility. Another object of one embodiment of the present invention is to provide a novel power storage device, a novel electronic device, or the like.

Note that the description of these objects does not disturb the existence of other objects. In one, embodiment of the present invention, there is no need to achieve all the objects. Other objects will be apparent from and can be derived from the description of the specification, the drawings, the claims, and the like.

One embodiment of the present invention is a power storage device including a positive electrode, a negative electrode, a separator, an electrolytic solution, and an exterior body. The positive electrode includes a positive electrode active material layer and a positive electrode current collector. The negative electrode includes a negative electrode active material layer and a negative electrode current collector. The separator is located between the positive electrode and the negative electrode. The separator contains polyphenylene sulfide or solvent-spun regenerated cellulosic fiber. The electrolytic solution contains a solute and two or more kinds of solvents. The solute contains lithium bis (pentafluoroethanesulfonyl)amide (LiBETA). One of the solvents is propylene carbonate.

Another embodiment of the present invention is the power storage device in which the solvents include propylene carbonate and ethylene carbonate.

Another embodiment of the present invention is the power storage device in which the negative electrode active material layer contains graphite.

Another embodiment of the present invention is the power storage device in which the negative electrode active material layer includes spherical natural, graphite. The spherical natural graphite includes a first region and a second region. The first region covers the second region. The first region has lower crystallinity than the second region.

Another embodiment of the present invention is the power storage device in which the positive electrode active material layer contains $LiCoO_2$.

Another embodiment of the present invention is the power storage device in which the positive electrode current collector contains aluminum or stainless steel.

Another embodiment of the present invention is a method for manufacturing the power storage device. In the method, a heating step is performed at a first temperature for 10 minutes before energization of the power storage device. The first temperature is higher than or equal to 110° C. and lower than or equal to 190° C.

Another embodiment of the present invention is an electronic device including, the power storage device, a band, a display panel, and a housing. The power storage device includes a positive electrode lead and a negative electrode lead. The positive electrode lead is electrically connected to the positive electrode. The negative electrode lead is electrically connected to the negative electrode. The power storage device is buried in the band. Part of the positive electrode lead and part of the negative electrode lead protrude from the band. The power storage device has flexibility. The power storage device is electrically connected to the display panel. The display panel is included in the housing. The band is connected to the housing. The band includes a rubber material.

Another embodiment of the present invention is the electronic device in which the rubber material is fluorine rubber or silicone rubber.

One embodiment of the present invention can provide a power storage device whose charging and discharging characteristics are unlikely to be degraded by heat treatment.

One embodiment of the present invention can provide a power storage device that is highly safe against heat treatment.

One embodiment of the present invention can provide a power storage device having high flexibility. One embodiment of the present invention can provide a novel power storage device, a novel electronic device, or the like.

Note that the description of these effects does not disturb the existence of other effects. One embodiment of the present invention does not necessarily have all the effects listed above. Other effects will be apparent from and can be derived from the description of the specification, the drawings, the claims, and the like.

BRIEF DESCRIPTION OF THE DRAWINGS

FIG. 7 illustrates an example of a power storage device.

FIG. 8 illustrates an example of a power storage device.

FIGS. 9A to 9C illustrate an example of a method for manufacturing a power storage device.

FIGS. 20A, 20B, 20C1, and 20C2 illustrate an example of a power storage device.

DETAILED DESCRIPTION OF THE INVENTION

Figure 1A:
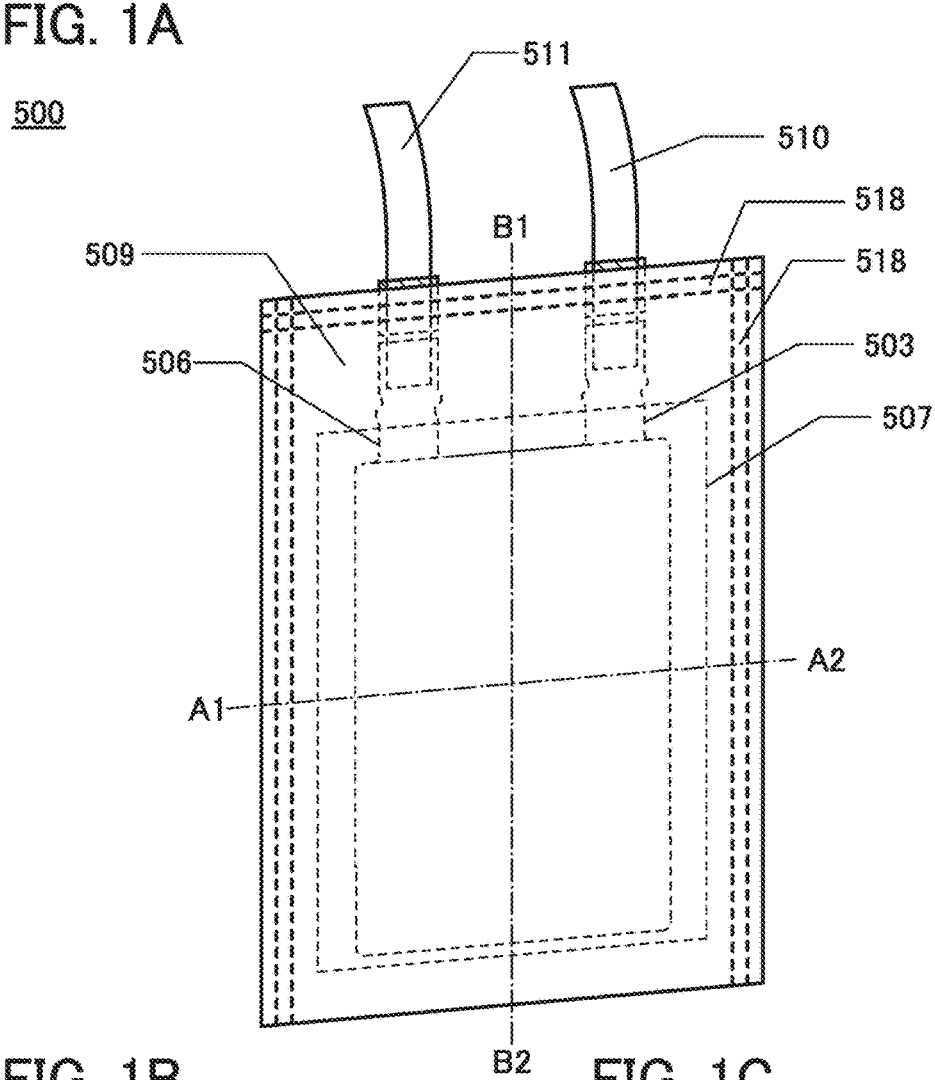
FIGS. 1A to 1C illustrate an example of a power storage device and examples of electrodes.

Embodiments and an example will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments and example below.

Note that in the structures of the invention described below, the same portions or portions having similar functions are denoted by the same reference numerals in different drawings, and the descriptions of such portions are not repeated. Furthermore, the same hatching pattern is applied to portions having similar functions, and the portions are not specially denoted by reference numerals in some cases.

In addition, the position, size, range, or the like of each structure illustrated in drawings and the like is not accurately represented in some cases for easy understanding. Therefore, the disclosed invention is not necessarily limited to the position, size, range, or the like disclosed in the drawings and the like.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

Embodiment 1

In this embodiment, power storage devices of embodiments of the present invention will be described with reference to FIGS. 1A to 1C to FIG. 11.

The power storage device of one embodiment of the present invention includes a positive electrode, a negative electrode, a separator, an electrolytic solution, and an exterior body.

Note that in this specification and the like, the electrolytic solution is not limited to a liquid one and may be a gelled or solid one.

For high heat resistance of the power storage device, first, a solute contained in the electrolytic solution needs to have high stability at high temperature. For example lithium hexafluorophosphate ($LiPF_6$), which is widely used as a lithium salt serving as a solute, is decomposed into LiF and $PF_5$ at high temperature. It is said that $PF_5$ causes the decomposition of a solvent; thus, $LiPF_6$ seems to have low stability at high temperature for a solute.

In view of the above, as a solute in the electrolytic solution in the power storage device of one embodiment of the present invention, lithium bis(pentafluoroethanesulfonyl)amide ($Li(C_2F_5SO_2)_2N$, abbreviation: LiBETA) is preferably used. LiBETA has a decomposition temperature of 350° C., and has high heat resistance. Furthermore, in the case where, for example, aluminum is used for a positive electrode current collector, the use of LiBETA can inhibit aluminum dissolution from the positive electrode current collector because a passivating film is easily formed on a surface of the positive electrode current collector when the power storage device is charged and discharged.

Moreover, to increase the heat resistance of the power storage device, a solvent contained in the electrolytic solution preferably has a high boiling point and low vapor pressure. An example of a nonaqueous solvent having a boiling point of 242° C. is propylene carbonate (PC).

However, in the case where graphite is used as a negative electrode active material, PC does not form a passivating film on a surface of graphite but is intercalated between graphite layers together with lithium ions, separating part of the graphite layers from a graphite particle in some cases.

Thus, the electrolytic solution in the power storage device of one embodiment of the present invention contains two or more kinds of solvents, including at least PC. The solvent in the electrolytic solution other than PC preferably has a function of forming a passivating film on a surface of the negative electrode. Examples of the solvent contained in the electrolytic solution other than PC include ethylene carbonate (EC) and vinylene carbonate (VC).

The boiling point of EC is 248° C., and EC has high heat resistance and low vapor pressure. Depending on a selected graphite material, a mixed solvent of PC and EC can inhibit separation of a graphite layer. For example, a 1:1 (volume ratio) mixture of PC and EC can be used as the solvent. In the case where graphite is used for the negative electrode, a graphite material in which PC is unlikely to be intercalated between layers is preferably selected. In the power storage device of one embodiment of the present invention, spherical natural graphite is used for the negative electrode active material. The spherical natural graphite includes a region having low crystallinity on the surface side, whereby PC intercalation between layers of the spherical natural graphite may be reduced.

It is confirmed that the following aluminum laminated cell does not expand due to heat treatment performed at 1.70° C. for 15 minutes. In the aluminum laminated tell, encapsulated is an electrolytic solution in which 1 mol/l of LiBETA is dissolved and PC and EC are mixed at a volume ratio of 1:1. Thus, the solvent in which PC and EC are mixed at a volume ratio of 1:1 has high stability and low vapor pressure at high temperature.

Polyethylene, polypropylene, and the like, which are generally used as a separator, are sensitive to heat. Minute pores of a separator might be blocked at high temperature, resulting in malfunction of the power storage device.

In view of the above, in the power storage device of one embodiment of the present invention, a separator containing polyphenylene sulfide or a separator containing solvent-spun regenerated cellulosic fiber is used.

The separator containing polyphenylene sulfide and the separator containing solvent-spun regenerated cellulosic fiber have high heat resistance and high chemical resistance.

Moreover, the separator containing polyphenylene sulfide and the separator containing solvent-spun regenerated cellulosic fiber have low reactivity to the electrolytic solution at high temperature. Thus, degradation of the output characteristics and the charge and discharge cycle performance can be inhibited.

<Structural Example of Power Storage Device>

Next, a specific structure of the power storage device of one embodiment of the present invention will be described below.

FIG. 1A illustrates a power storage device 500, which is a power storage device of one embodiment of the present invention. Although FIG. 1A illustrates a mode of a thin power storage device as an example of the power storage device 500, one embodiment of the present invention is not limited to this example.

As illustrated in FIG. 1A, the power storage device 500 includes a positive electrode 503, a negative electrode 506, a separator 507, and an exterior body 509. The power storage device 500 may include a positive electrode lead 510 and a negative electrode lead 511. A bonding portion 518 corresponds to a thermo compression bonding portion in the outer region of the exterior body 509.

Figure 2A:
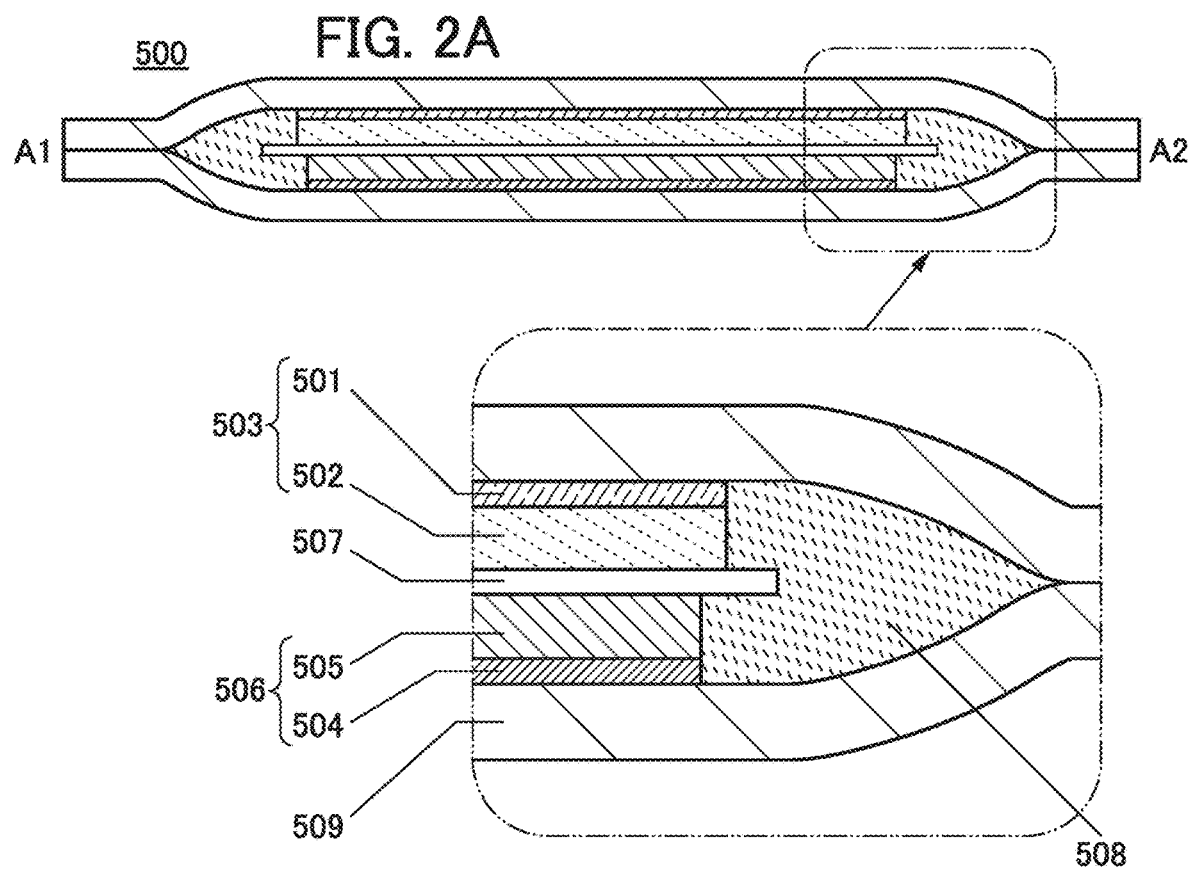
FIGS. 2A and 2B each illustrate an example of a power storage device.
Figure 2B:
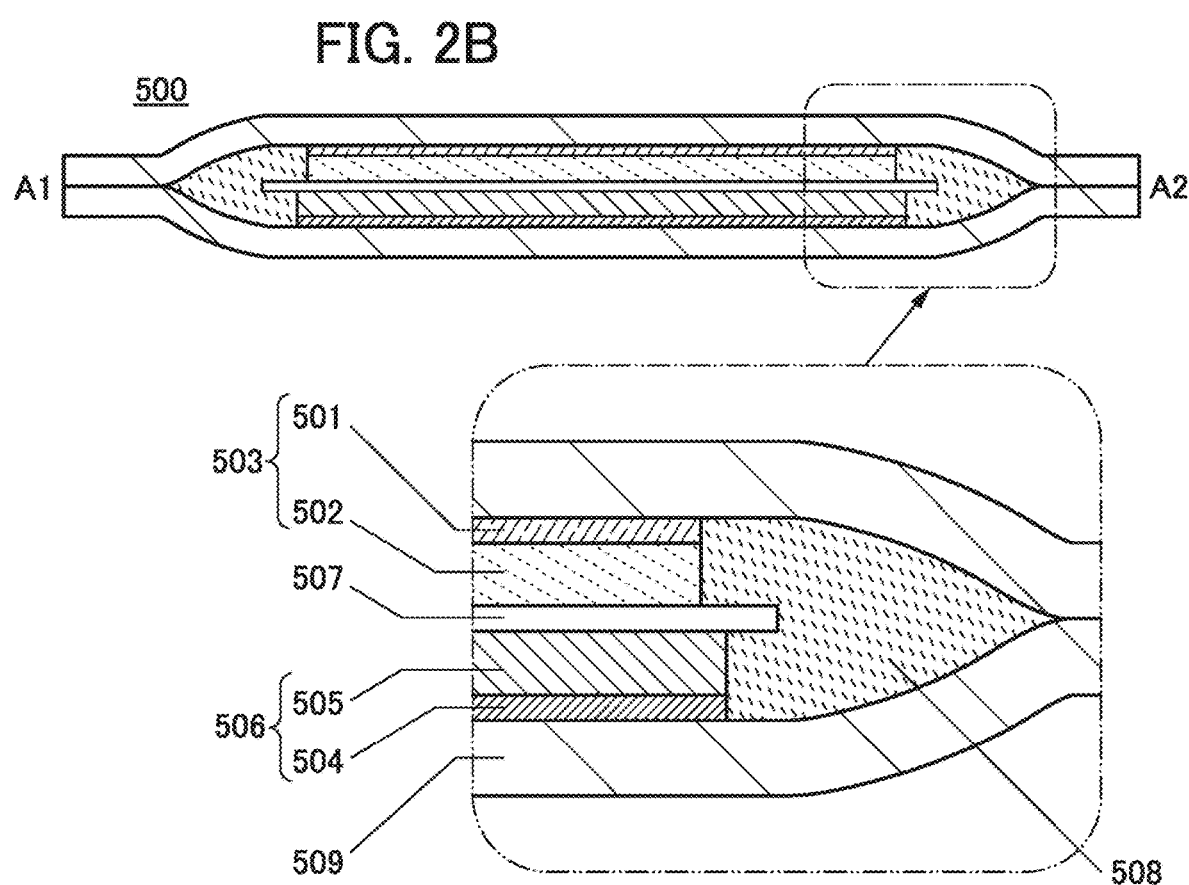

FIGS. 2A and 2B each illustrate an example of a cross-sectional view along dashed-dotted line A1-A2 in FIG. 1A. FIGS. 2A and 2B each illustrate a cross-sectional structure of the power storage device 500 that is formed using a pair of the positive electrode 503 and the negative electrode 506.

As illustrated in FIGS. 2A and 2B, the power storage device 500 includes the positive electrode 503, the negative electrode 506, the separator 507, an electrolytic solution 508, and, the exterior bodies 509. The separator 507 is located between the positive electrode 503 and the negative electrode 506. A space surrounded by the exterior bodies 509 is filled with the electrolytic solution 508.

The positive electrode. 503 includes a positive electrode active material layer 502 and a positive electrode current collector 501. The negative electrode 506 includes a negative electrode active material layer 505 and a negative electrode current collector 504. The active material layer is formed on one surface or opposite surfaces of the current collector. The separator 507 is positioned between the positive electrode current collector 501 and the negative electrode current collector 504.

The power Storage device includes one or more positive electrodes and one or more negative electrodes. For example, the power storage device can have a layered structure including a plurality of positive electrodes and a plurality of negative electrodes.

Figure 3A:
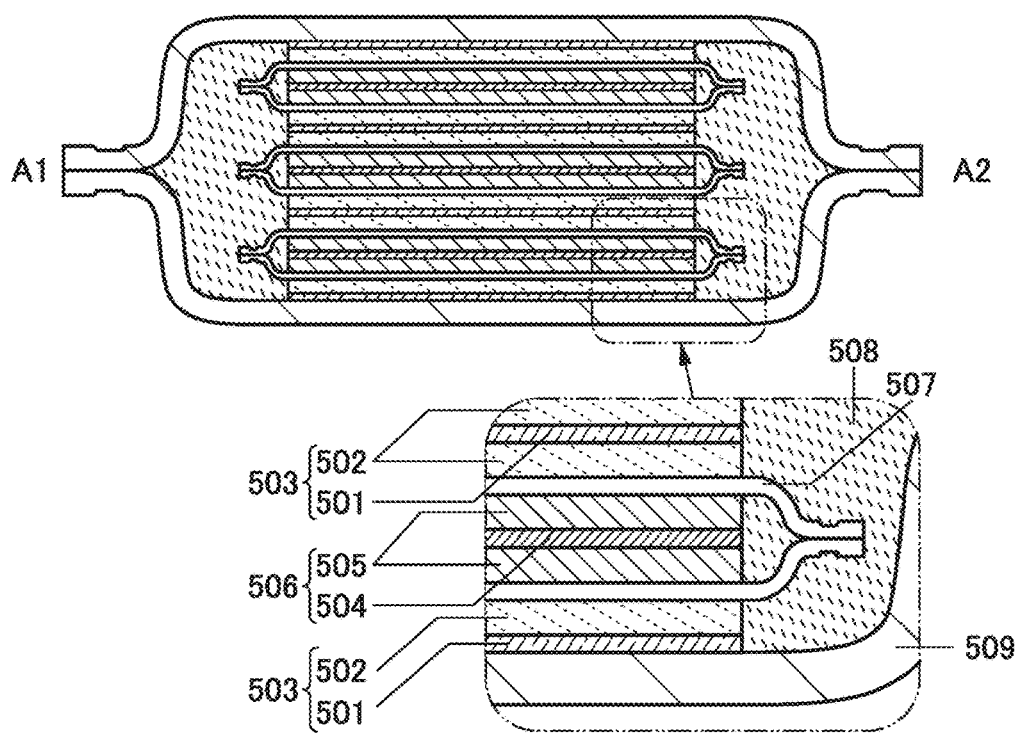
FIGS. 3A and 3B each illustrate an example of a power storage device.
Figure 3B:
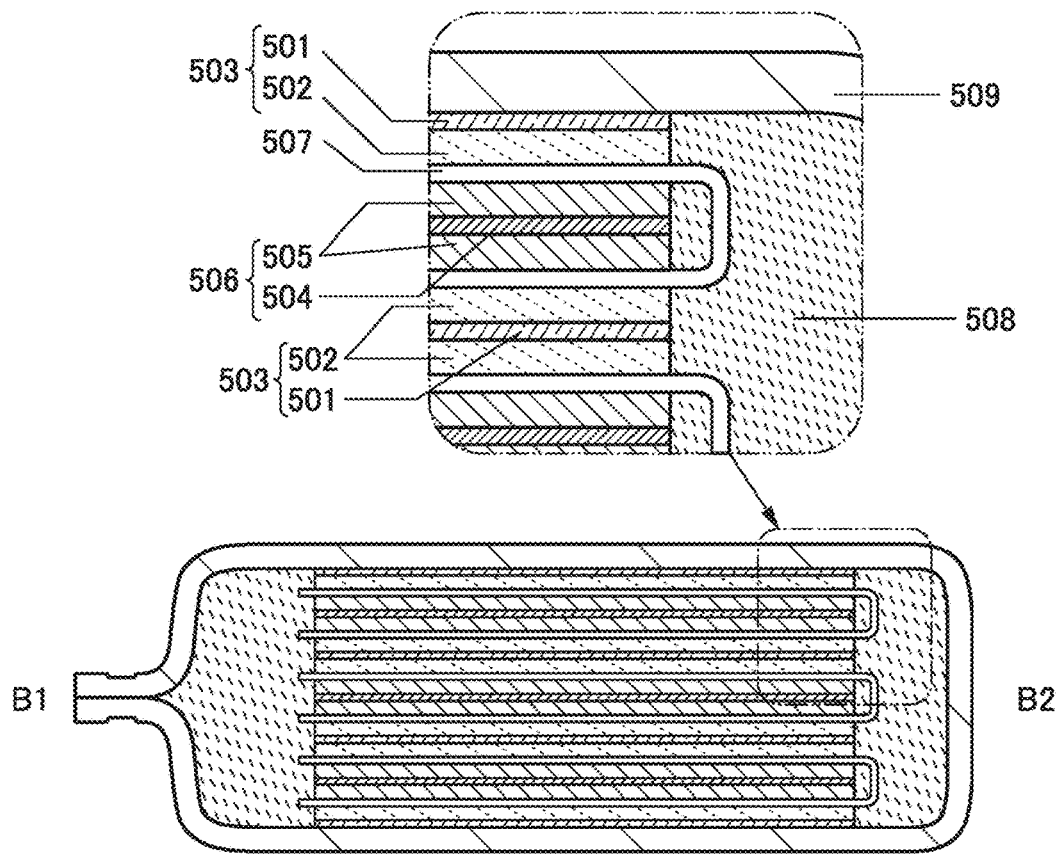

FIG. 3A illustrates another example of a cross-sectional view along dashed-clotted line A1-A2 in FIG. 1A. FIG. 3B is a cross-sectional view along dashed-dotted line B1-B2 in FIG. 1A.

FIGS. 3A and 3B each illustrate a cross-sectional structure of the power storage device 500 that is formed using a plurality of pairs of the positive and negative electrodes 503 and 506. There is no limitation on the number of electrode layers of the power storage device 500. In the case of using a large number of electrode layers, the power storage device can have high capacity. In contrast, in the case of using a small number of electrode layers, the power storage device can have a small thickness and high flexibility.

The examples in FIGS. 3A and 3B each include two positive electrodes 503 in each of which the positive electrode active material layer 502 is provided on one surface of the positive electrode current collector 501; two positive electrodes 503 in each of which the positive electrode active material layers 502 are provided on opposite surfaces of the positive electrode current collector 501; and three negative electrodes 506 in each of which the negative electrode active material layers 505 are provided on opposite surfaces of the negative electrode current collector 504. In other words, the power storage device 500 includes six, positive electrode active material layers 502 and six negative electrode active material layers 505. Note that although the separator 507 has a bag-like shape in the examples illustrated in FIGS. 3A and 3B, the present invention is not limited to this example and the separator 507 may have a strip shape or a bellows shape.

Figure 4A:
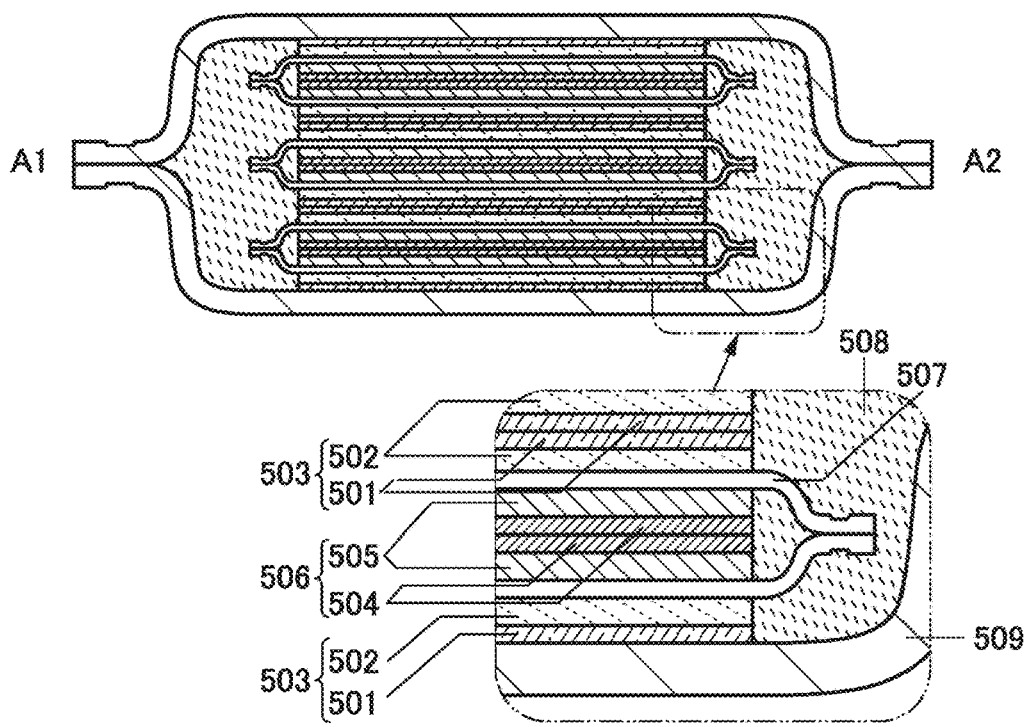
FIGS. 4A and 4B each illustrate an example of a power storage device.
Figure 4B:
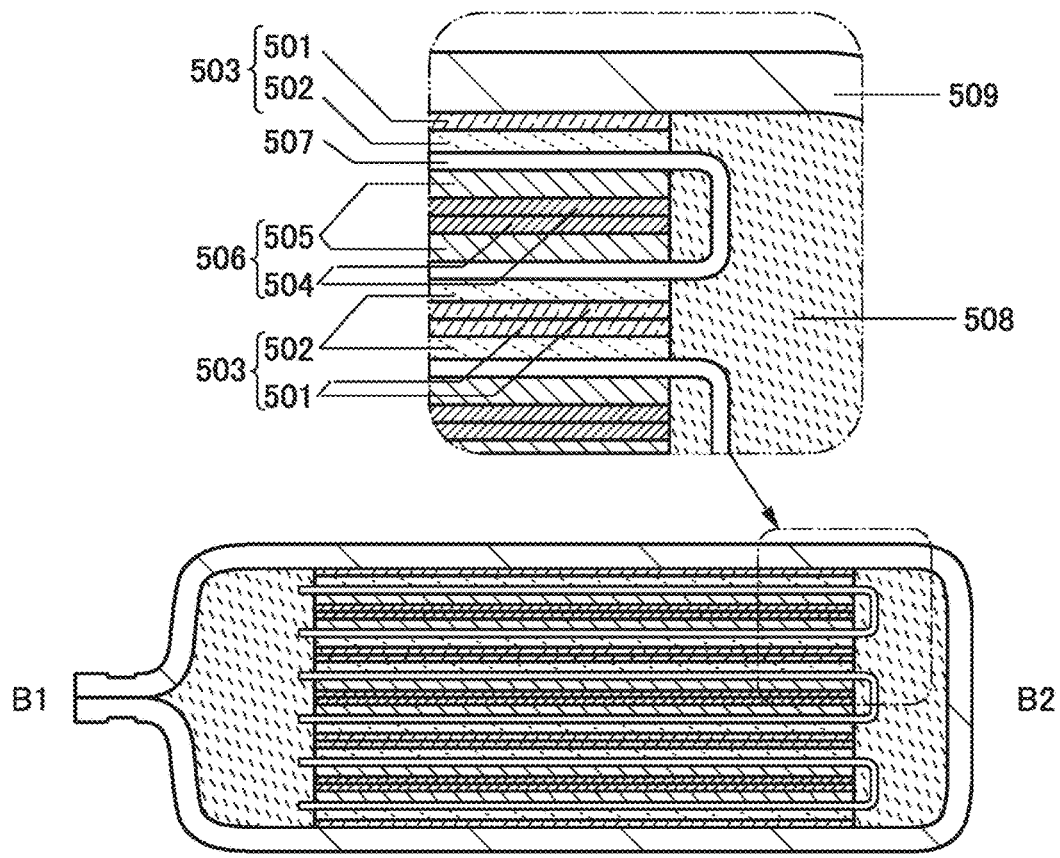

Alternatively, one positive electrode in which both surfaces of the positive electrode current collector 501 are provided with the positive electrode active material layers 502 in FIGS. 3A and 3B is preferably replaced with two positive electrodes in each of which one surface of the positive electrode current collector 501 is provided with the positive electrode active material layer 502. Similarly, one negative electrode in which both surfaces of the negative electrode current collector 504 are provided with the negative electrode active material layers 505 is preferably replaced with two negative electrodes in each of which one surface of the negative electrode current collector 504 is provided with the negative electrode active material layer 505. In the power storage device 500 in FIGS. 4A and 4B, surfaces of the positive electrode current collectors 501 on the side not provided with the positive electrode active material layer 502 face and are in contact with each other, and surfaces of the negative electrode current collectors 504 on the side not provided with the negative electrode active material layer 505 face and are in contact with each other. Such a structure allows the interface between the two positive electrode current collectors 501 and the two negative electrode current collectors 504 to serve as sliding planes when the power storage device 500 is curved, relieving stress caused in the power storage device 500.

Figure 1B:
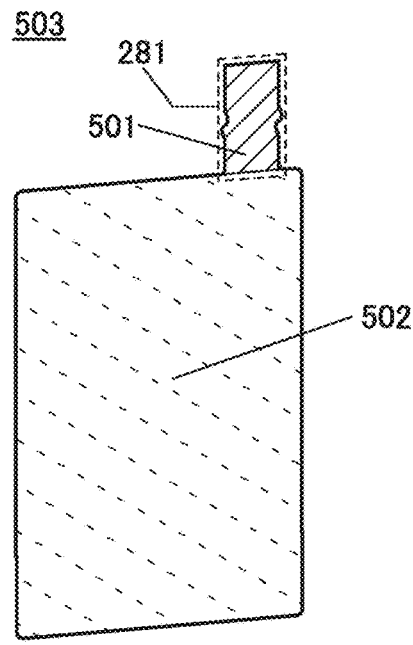

FIG. 1B illustrates the appearance of the positive electrode 503. The positive electrode 503 includes the positive electrode current collector 501 and the positive electrode active material layer 502.

Figure 1C:
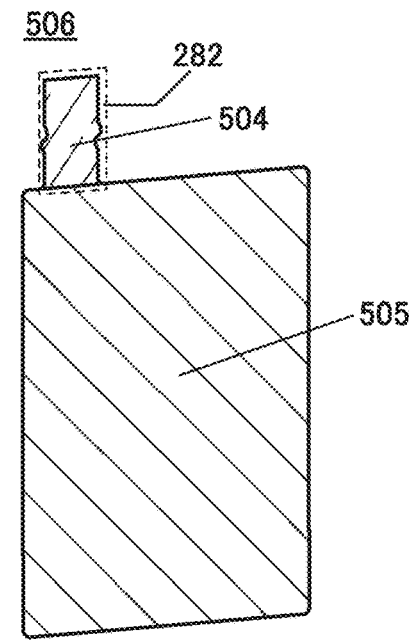

FIG. 1C illustrates the appearance of the negative electrode 506. The negative electrode 506 includes the negative electrode current collector 504 and the negative electrode active material layer 505.

The positive electrode 503 and the negative electrode 506 preferably include tab regions so that a plurality of stacked positive electrodes can be electrically connected to each other and a plurality of stacked negative electrodes can be electrically connected to each other. Furthermore, a lead is preferably electrically connected to the tab region.

As illustrated in FIG. 1B, the positive electrode 503 preferably includes the tab region 281. The positive electrode lead 510 is preferably welded to part of the tab region 281. The tab region 281 preferably includes a region where the positive electrode current collector 501 is exposed. When the positive electrode lead 510 is welded to the region where the positive electrode current, collector 501 is exposed, contact resistance can be further reduced. Although FIG. 1B illustrates the example where the positive electrode current collector 501 is exposed in the entire tab region 281, the tab region 281 may partly include the positive electrode active material layer 502.

As illustrated in FIG. 1C, the negative electrode 506 preferably includes the tab region 282. The negative electrode lead 511 is preferably welded to part of the tab region 282. The tab region 282 preferably includes a region where the negative electrode current collector 504 is exposed. When the negative electrode lead 511 is welded to the region where the negative electrode current collector 504 is exposed, contact resistance can be further reduced. Although FIG. 1C illustrates the example where the negative electrode current collector 504 is exposed in the entire tab region 282, the tab region 282 may partly include the negative electrode active material layer 505.

Although FIG. 1A illustrates the example where the ends of the positive electrode 503 and the negative electrode 506 are substantially aligned with each other, part of the positive electrode 503 may extend beyond the end of the negative electrode 506.

In the power storage device 500, the area of a region where the negative electrode 506 does not overlap with the positive electrode 503 is preferably as small as possible.

In the example illustrated in FIG. 2A, the end of the negative electrode 506 is located inward from the end of the positive electrode 503. With this structure, the entire negative electrode 506 can overlap with the positive electrode 503 or the area of the region where the negative electrode 506 does not overlap with the positive electrode 503 can be small.

The areas of the positive electrode 503 and the negative electrode 506 in the power storage device 500 are preferably substantially equal. For example, the areas of the positive electrode 503 and the negative electrode 506 that face each other with the separator 507 therebetween are preferably substantially equal. For example, the areas of the positive electrode active material layer 502 and the negative electrode active material layer 505 that face each other with the separator 507 therebetween are preferably substantially equal.

For example, as illustrated in FIGS. 3A and 3B, the area of the positive electrode 503 on the separator 507 side is preferably substantially equal to the area of the negative electrode 506 on the separator 507 side. When the area of a surface of the positive electrode 503 on the negative electrode 506 side is substantially equal to the area of a surface of the negative electrode 506 on the positive electrode 503 side, the region where the negative electrode 506 does not overlap with the positive electrode 503 can be small (does not exist, ideally), whereby the power storage device 500 can have reduced irreversible capacity. Alternatively, as illustrated in FIGS. 3A and 3B, the area of the surface of the positive electrode active material layer 502 on the separator 507 side is preferably substantially equal to the area of the surface of the negative electrode active material layer 505 on the separator 507 side.

As illustrated in FIGS. 3A and 3B, the end of the positive-electrode 503 and the end of the negative electrode 506 are preferably substantially aligned with each other. Ends of the positive electrode active material layer 502 and the negative electrode active material layer 505 are preferably substantially aligned with each other.

In the example illustrated in FIG. 2B, the end of the positive electrode 503 is located inward from the end of the negative electrode 506. With this structure, the entire positive electrode 503 can overlap with the negative electrode 506 or the area of the region where the positive electrode 503 does not overlap with the negative electrode 506 can be small. In the case where the end of the negative electrode 506 is located inward from the end of the positive electrode 503, a current sometimes concentrates at the end portion of the negative electrode 506. For example, concentration of a current in part of the negative electrode 506 results in deposition of lithium on the negative electrode 506 in some cases. By reducing the area of the region where the positive electrode 503 does not overlap with the negative electrode 506, concentration of a current in part of the negative electrode 506 can be inhibited. As a result, for example, deposition of lithium on the negative electrode 506 can be inhibited, which is preferable.

As illustrated in FIG. 1A, the positive electrode lead 510 is preferably electrically connected to the positive electrode 503. Similarly, the negative electrode lead 511 is preferably electrically connected to the negative electrode 506. The positive electrode lead 510 and the negative electrode lead 511 are exposed to the outside of the exterior body 509 so as to serve as terminals for electrical contact with an external portion.

The positive electrode current collector 501 and the negative electrode current collector 504 can double as terminals for electrical contact with an external portion. In that case, the positive electrode current collector 501 and the negative electrode current collector 504 may be arranged such that part of the positive electrode current collector 501 and part of the negative electrode current collector 504 are exposed to the outside of the exterior body 509 without using leads.

Note that part of a surface of the exterior body 509 preferably has projections and depressions. This can relieve stress applied to the exterior body 509 when the power storage device 500 is curved. Thus, the power storage device 500 can have high flexibility. Such projections and depressions can be formed by embossing the exterior body 509 before the power storage device 500 is assembled.

Here, embossing, which is a kind of pressing, will be described.

FIGS. 5A to 5F are cross-sectional views illustrating examples of embossing. Note that embossing refers to processing for forming unevenness on a film by bringing an embossing roll whose surface has unevenness into contact with the film with pressure. Note that the embossing roll is a roll whose surface is patterned.

Figure 5A:
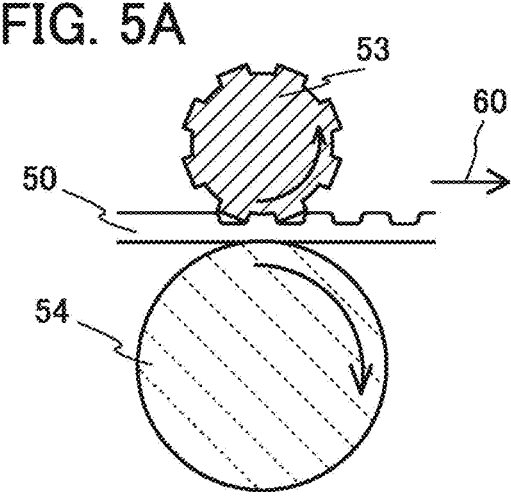
FIGS. 5A to 5F illustrate examples of embossing.

FIG. 5A illustrates an example where one surface of a film 50 used for the exterior body 509 is embossed.

FIG. 5A illustrates the state where a film 50 is sandwiched between an embossing roll 53 in contact with the one surface of the film and a roll 54 in contact with the other surface and the film 50 is transferred in a direction 60. The surface of the film is patterned by pressure or heat.

Processing illustrated in FIG. 5A is called one-side embossing, which can be performed by a combination of the embossing roll 53 and the roll 54 (a metal roll or an elastic roll such as a rubber roll).

Figure 5B:
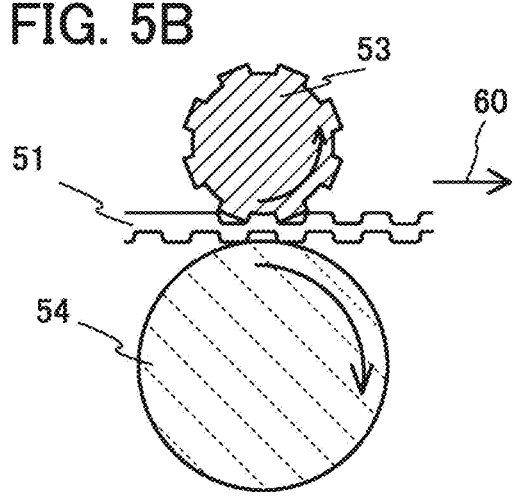

FIG. 5B illustrates the state where a film 51 whose one surface is embossed is sandwiched between the embossing roll 53 and the roll 54 and is transferred in the direction 60. The embossing roll 53 rolls along a non-embossed surface of the film 51; thus, both surfaces of the film 51 are embossed. As described here, one film can be embossed more than once.

Figure 5C:
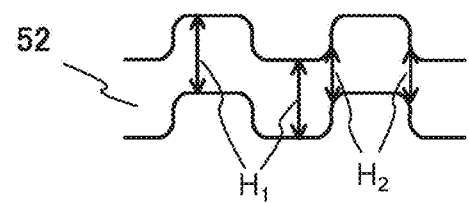

FIG. 5C is an enlarged view of a cross section of a film 52 whose both surfaces are embossed. Note that $H_1$ represents the thickness of the film in depressions or projections, and $H_2$ represents the thickness of the film at a boundary portion between a depression and its adjacent projection or the thickness of the film at a boundary portion between a projection and its adjacent depression. The thickness of the film is not uniform, and $H_2$ is smaller than $H_1$.

Figure 5D:
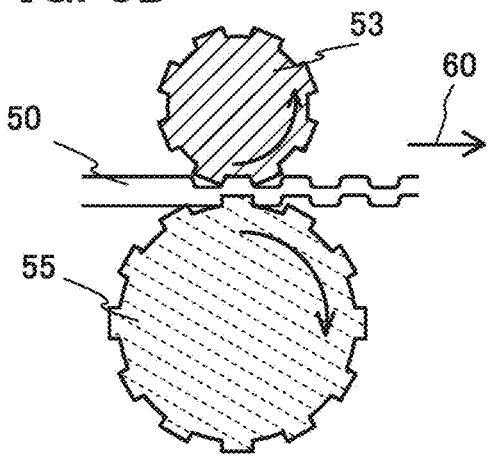

FIG. 5D illustrates another example where both surfaces of a film are embossed.

FIG. 5D illustrates the state where the film 50 is sandwiched between the embossing roll 53 in contact with one surface of the film and an embossing roll 55 in contact with the other surface and the film 50 is being transferred in the direction 60.

FIG. 5D illustrates a combination of the embossing roll 53 and the embossing roll 55, which are a couple of embossing rolls. The surface of the film 50 is patterned by alternately provided projections and depressions for embossing and debossing part of the surface of the film 50.

Figure 5E:
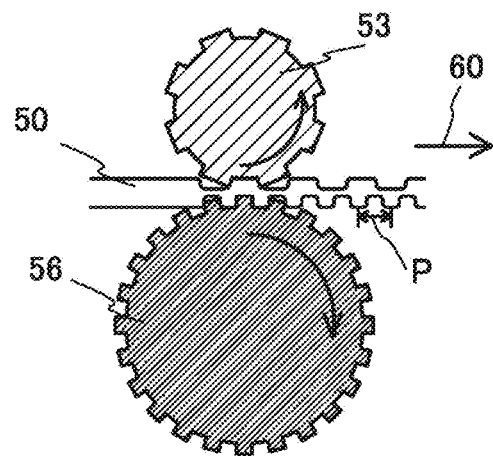

FIG. 5E illustrates the case of using the embossing roll 53 and an embossing roll 56 whose protrusions have a pitch different from that of protrusions of the embossing roll 55 in FIG. 5D. Note that a protrusion pitch or an embossing pitch is the distance between the tops of adjacent protrusions. For example, a distance P in FIG. 5E is a protrusion pitch or an embossing pitch FIG. 5E illustrates the state where the film 50 is sandwiched between the embossing roll 53 and the embossing roll 56 and is transferred in the direction 60. The film processed using the embossing rolls with different protrusion pitches can have surfaces with different embossing pitches.

Figure 5F:
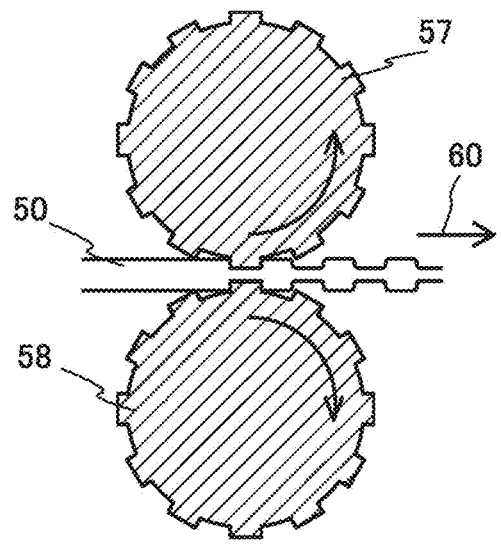

FIG. 5F illustrates the state where the film 50 is sandwiched between an embossing roll 57 in contact with one surface of the filth and an embossing roll 58 in contact with the other surface and the film 50 is transferred in the direction 60.

Processing illustrated in FIG. 5F is called tip-to-tip both-side embossing performed by a combination of the embossing roll 57 and the embossing roll 58 that has the same pattern as the embossing roll 57. The phases of the projections and depressions of the two embossing rolls are coordinate, so that substantially the same pattern can be formed on both surfaces of the film 50. Unlike in the case of FIG. 5F, embossing, may be performed without coordinating the phases of the projections and depressions of the same embossing rolls.

An embossing plate can be used instead of the embossing roll. Furthermore, embossing is not necessarily employed, and any method that allows formation of a relief on part of the film can be employed.

Figure 6A:
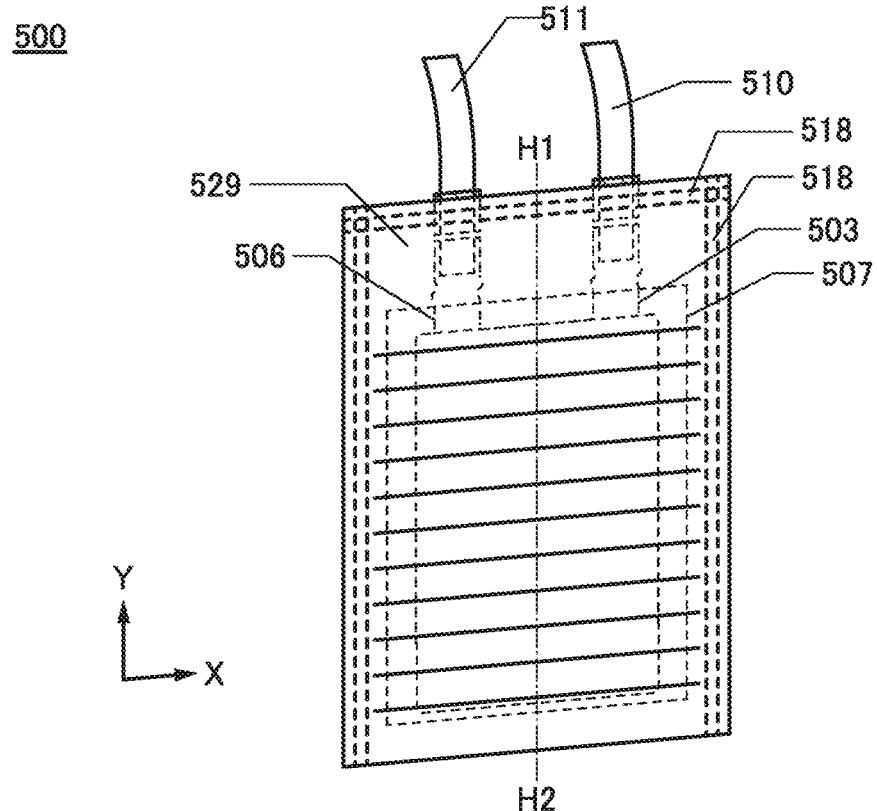
FIGS. 6A and 6B illustrate an example of a power storage device.
Figure 6B:
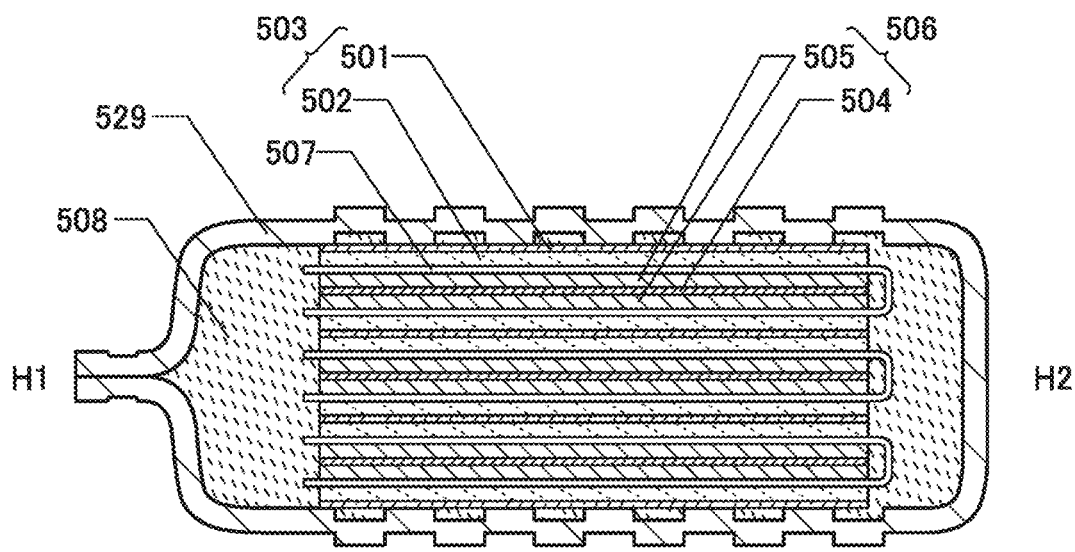

FIG. 6A illustrates an example of the power storage device 500 using an exterior body 529 having projections and depressions formed by the embossing described above. FIG. 6B is a cross-sectional view taken along the dashed-dotted line H1-H2 in FIG. 6A. The structure of FIG. 6B without the exterior body 529 is similar to the structure of FIG. 3B.

The projections and depressions of the exterior body 529 are formed so as to include a region overlapping with the positive electrode 503 and the negative electrode 506. In FIG. 6A, the bonding portion 518 does not have projections and depressions, but may have projections and depressions.

Furthermore, the projections and depressions of the exterior body 529 are formed at regular intervals in the long axis direction of the power storage device 500 (the Y direction in FIG. 6A). In other words, one depression and one projection are formed so as to extending the short axis direction of the power storage device 500 (the X direction in FIG. 6A). Such projections and depressions can relieve stress applied when the power storage device 500 is curved in the long axis direction.

Note that the projections and depressions of the exterior body 529 may be formed so as to have a geometric pattern in which diagonal lines in two directions cross each other (see FIG. 1). Such projections and depressions can relieve stresses caused by curving the power storage device 500 in at least two directions.

Although the positive electrode lead 5 to and the negative electrode lead 511 are provided on the same side of the power storage device 500 in FIG. 1A, the positive electrode lead 510 and the negative electrode lead 511 may be provided on different sides of the power storage device 500 as illustrated in FIG. 8. The leads of the power storage device of one embodiment of the present invention can be freely positioned as described above; therefore, the degree of freedom in design is high. Accordingly, a product including the power storage device of one embodiment of the present invention can have a high degree of freedom in design. Furthermore, a yield of products each including the power storage device of one embodiment of the present invention can be increased.

<Example of Manufacturing Method for Power Storage Device>

Next, an example of a manufacturing method for the power storage device 500, which is a power storage device of one embodiment of the present invention, will be described with reference to FIGS. 9A and 9B to FIG. 11.

First, the positive electrode 503, the negative electrode 506, and the separator 507 are stacked. Specifically, the separator 507 is positioned over the positive electrode 503. Then, the negative electrode 506 is positioned over the separator 507. In the case of using two or more positive electrode-negative electrode pairs, another separator 507 is positioned over the negative electrode 506, and then, the positive electrode 503 is positioned. In this manner, the positive electrodes 503 and the negative electrodes 506 are alternately stacked and separated by the separator 507.

Alternatively, the separator 507 may have a bag-like shape. The electrode is preferably surrounded by the separator 507, in which case the electrode is less likely to be damaged during a fabricating process.

First, the positive electrode 503 is positioned over the separator 507. Then, the separator 507 is folded along a broken line in FIG. 9A so that the positive electrode 503 is sandwiched by the separator 507. Although the example where the positive electrode 503 is sandwiched by the separator 507 is described here, the negative electrode 506 may be sandwiched by the separator 507.

Here, the outer edges of the separator 507 outside the positive electrode 503 are bonded so that the separator 507 has a bag-like shape (or an envelope-like shape). The bonding of the outer edges of the separator 507 can be performed with the use of an adhesive or the like, by ultrasonic welding, or by thermal fusion bonding.

Next, the outer edges of the separator 507 are bonded by heating. Bonding portions 514 are illustrated in FIG. 9A, in such a manner, the positive electrode 503 can be covered with the separator 507.

Note that in the case where a material such as cellulose or paper is used as the separator 507, the outer edges of the separator 507 are bonded using an adhesive or the like. The amount of the adhesive is preferably small. The outer edges of the separator 507 are bonded such that an electrode (the positive electrode 503 in FIG. 9A) sandwiched between facing portions of the separator 507 does not protrude from the separator 507; thus, for example, when the bonding portions 514 are formed as illustrated in FIG. 9B, the amount of the adhesive can be reduced. In FIG. 9B, the bonding portions 514 are formed at the following portions of the outer edges of the separator 507 portions of two sides intersecting with a side where a fold is formed that are close to the fold; and a portion of a side opposite to the side where the fold is formed.

Then, the positive electrodes 503 each covered with the separator 507 and the negative electrodes 506 are alternately stacked as illustrated in FIG. 9C. Furthermore, the positive electrode lead 510 and the negative electrode lead 511 each having a sealing layer 115 are prepared.

Figure 10A:
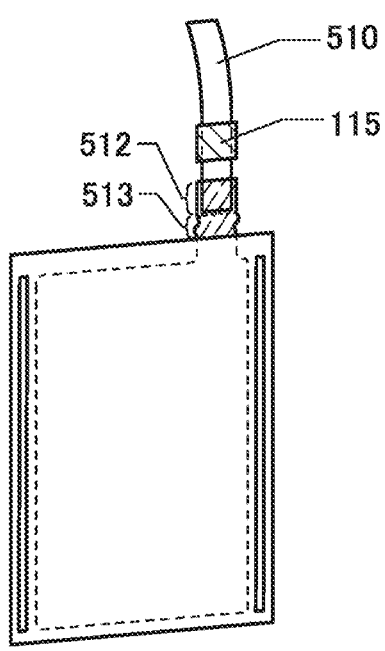
FIGS. 10A to 10C illustrate an example of a method for manufacturing a power storage device.
Figure 10B:
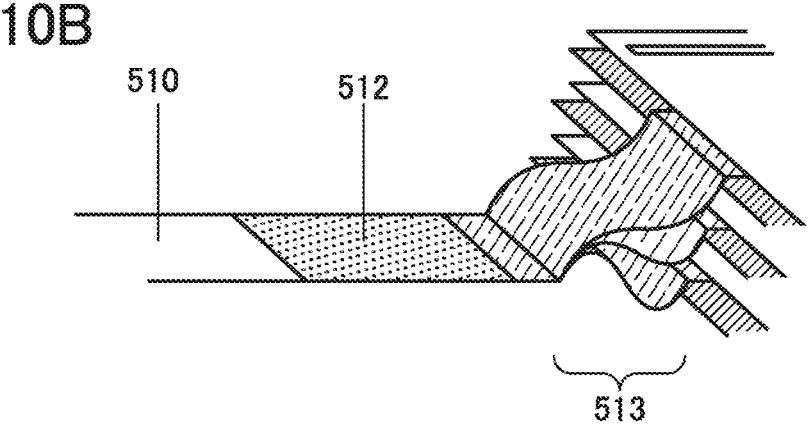

After that, the positive electrode lead 510 having the sealing layer 115 is connected to the tab region 281 of the positive electrode 503 as illustrated in FIG. 10A. FIG. 108 is an enlarged view of a connection portion. The tab region 281 of the positive electrode 503 and the positive electrode lead 510 are electrically connected to each other by irradiating the bonding portion 512 with ultrasonic waves while applying pressure thereto (ultrasonic welding). In that case, a curved portion 513 is preferably provided in the tab region 281.

This curved portion 513 can relieve stress clue to external force applied after fabrication of the power storage device 500. Thus, the power storage device 500 can have high reliability.

The negative electrode lead 511 can be electrically connected to the tab region 282 of the negative electrode 506 by a similar method.

Subsequently, the positive electrode 503, the negative electrode 506, and the separator 507 are positioned over an exterior body 509.

Figure 10C:
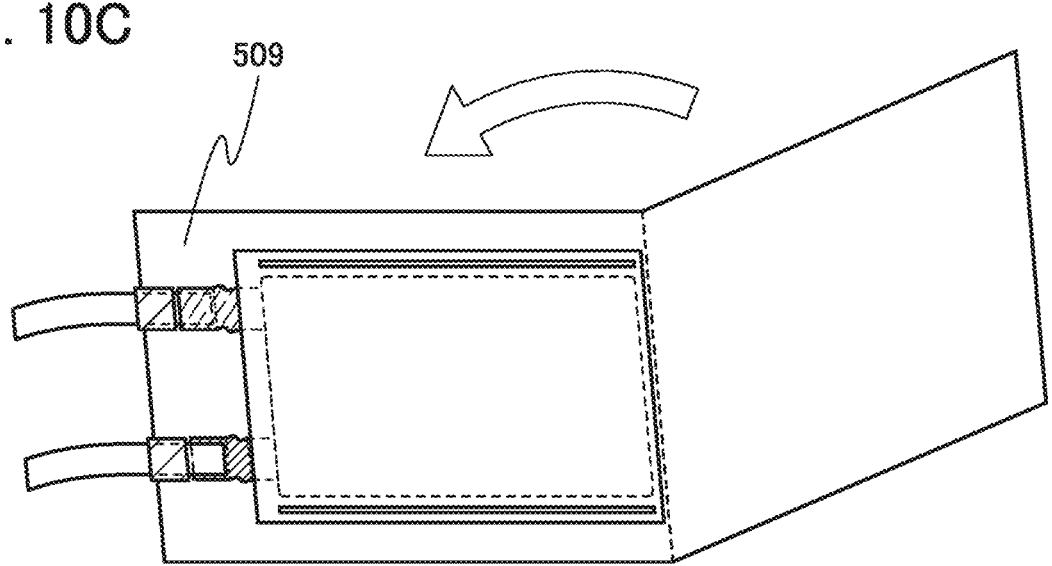

Then, the exterior body 509 is folded along a portion shown by a dotted line in the vicinity of a center portion of the exterior body 509 in FIG. 10C.

Figure 11:
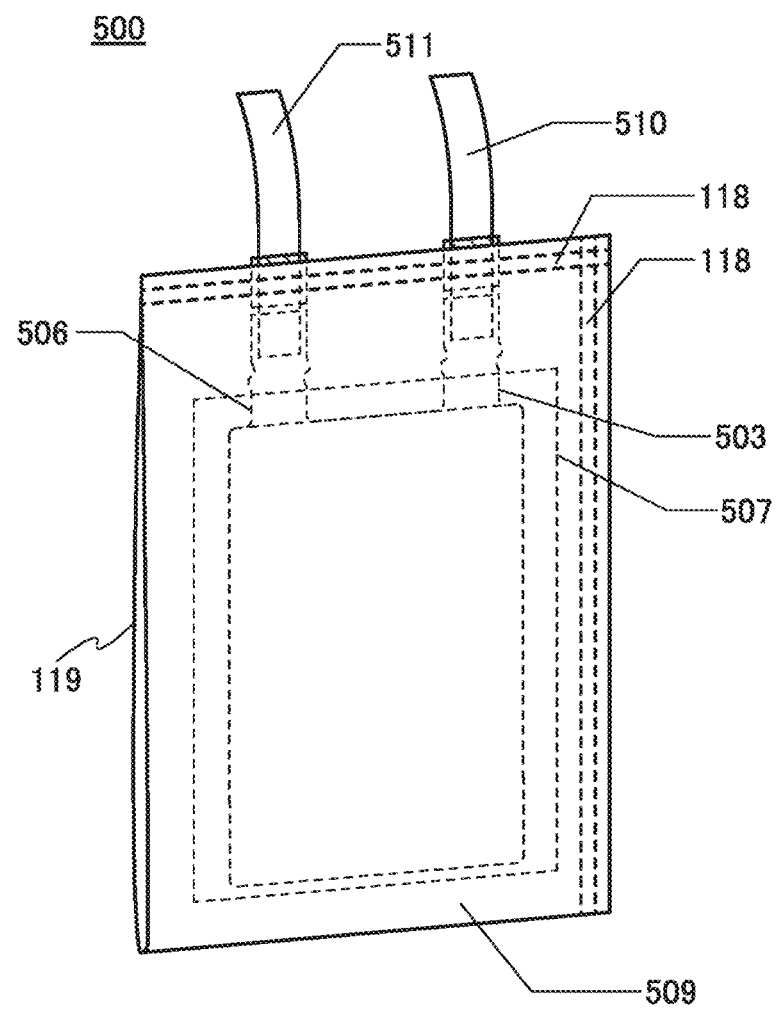
FIG. 11 illustrates an example of a method for manufacturing a power storage device.

In FIG. 11, the thermo compression bonding portion in the outer edges of the exterior body 509 is illustrated as a bonding portion 118. The outer edges of the exterior body 509 except an inlet 119 for introducing the electrolytic solution 508 are bonded by thermo compression bonding. In thermo compression bonding, sealing layers provided over the leads are also melted, thereby fixing the leads and the exterior body 509 to each other. Moreover, adhesion between the exterior body 509 and the leads can be increased.

After that, in a reduced-pressure atmosphere or an inert gas atmosphere, a desired amount of electrolytic solution 508 is introduced to the inside of the exterior body 509 from the inlet 119. Lastly, the inlet 119 is sealed by thermo compression bonding. Through the above steps, the power storage device 500, which is, a thin power storage device, can be fabricated.

Aging may be performed after fabrication of the power storage device 500. The aging can be performed under the following conditions, for example. Charging is performed at a rate of 0.001 C or more and 0.2 C or less at temperatures higher than or equal to room temperature and lower than or equal to 50° C. In the case where an electrolytic solution is decomposed and a gas is generated and accumulates between the electrodes, the electrolytic solution cannot be in contact with a surface of the electrode in some regions. That is to say, an effectual reaction area of the electrode is reduced and effectual resistance is increased.

When the resistance is extremely increased, the negative electrode potential is decreased. Consequently, lithium is intercalated into graphite and lithium is deposited on the surface of graphite. The lithium deposition might reduce capacity. For example, if a coating film or the like is grown on the surface after lithium deposition, lithium deposited on the surface cannot be dissolved again. This lithium cannot contribute to capacity. In addition, when deposited lithium is physically collapsed and conduction with the electrode is lost, the lithium also cannot contribute to capacity. Therefore, the gas is preferably released to prevent the potential of the negative electrode from reaching the potential of lithium because of an increase in a charging voltage.

In the case of performing degasification, for example, part of the exterior body of the thin power storage device is cut to open the power storage device. When the exterior body is expanded because of a gas, the form of the exterior body is preferably adjusted. Furthermore, the electrolytic solution may be added as needed before resealing. In the case where degasification cannot be performed, a space for releasing a gas may be provided in the cell so that a gas that accumulates between the electrodes can be released from between the electrodes. Alternatively, a space formed by the use of the embossed laminate exterior body described above can be utilized as a space for releasing a gas.

After the release of the gas, the charging state may be maintained at temperatures higher than room temperature, preferably higher than or equal to 30° C. and lower than or equal to 60° C., more preferably higher than or equal to 35° C. and lower than or equal to 50° C. for, for example, 1 hour or more and 100 hours or less. In the initial charging, an electrolytic solution decomposed on the surface forms a coating film. The formed coating film may thus be densified when the charging state is held at temperatures higher than room temperature after the release of the gas, for example.

<Components of Power Storage Device>

Components of the power storage device of one embodiment of the present invention will be described in detail below. When a flexible material is selected from materials of the members described in this embodiment and used, a flexible power storage device can be fabricated.

<<Separator>>

In the power storage device of one embodiment of the present invention, a separator containing polyphenylene sulfide or solvent-spun regenerated cellulosic fiber is used. The separator can have either a single-layer structure or a layered structure, and may have a layered structure of a separator containing solvent-spun regenerated cellulosic fiber and another separator, for example.

As a material for the separator, one or more materials selected from the following can be used besides polyphenylene sulfide and solvent-spun regenerated cellulosic fiber polypropylene sulfide, a fluorine-based polymer, cellulose, paper, nonwoven fabric, glass fiber, ceramics, synthetic fiber such as nylon (polyamide), vinylon (polyvinyl alcohol fiber), polyester, acrylic, polyolefin, or polyurethane, and the like.

<<Electrolytic Solution>>

The electrolytic solution contains an electrolyte and a solvent. Note that in this specification and the like, an electrolyte is referred to as a solute in some cases.

As the solvent of the electrolytic solution, a material with carrier ion mobility is used. In particular, the solvent preferably has high heat resistance and low reactivity to a graphite negative electrode. In the power storage device of one embodiment of the present invention, a mixture of PC and EC is used as the solvent.

As the solvent, an aprotic organic solvent is preferably used. For example, one of EC, PC, butylene carbonate, γ-butyrolactone, γ-valerolactone, dimethyl sulfoxide, methyl diglyme, benzonitrile, and sulfolane can be used, or two or more of these solvents can be used in an appropriate combination in an appropriate ratio.

When a gelled high-molecular material is used as the solvent of the electrolytic solution, safety against liquid leakage and the like is improved. Furthermore, the power storage device can be thinner and more lightweight. Typical examples of gelled high-molecular materials include a silicone gel, an acrylic gel, an acrylonitrile gel, a polyethylene oxide-based gel, a polypropylene oxide-based gel, a fluorine-based polymer gel, and the like.

Alternatively, the use of one or more kinds of ionic liquids (room temperature molten salts) which have features of non-flammability and non-volatility as a solvent of the electrolytic solution can prevent the power storage device from exploding or catching fire even when the power storage device internally shorts out or the internal temperature increases owing to overcharging and others. Thus, the power storage device has improved safety.

As the solute, a material that has carrier ion mobility and contains carrier ions can be used in the case where carrier ions are lithium ions, the solute is a lithium salt. As a lithium salt, LiBETA, lithium bis(trifluoromethanesulfonyl)amide (Li(CF$_3$SO$_2$)$_2$N, abbreviation: LiTFSA), lithium bis(fluorosulfonyl)amide (Li(FSO$_2$)$_2$N, abbreviation: LiFSA), LiBF$_4$, lithium bis(oxalato)borate (LiB(C$_2$O$_4$)$_2$ abbreviation; LiBOB), or the like, which has high heat resistance, is preferably used.

In the power storage device, when a metal included in the positive electrode current collector is dissolved by a battery reaction between the electrolytic solution and the current collector, the capacity of the power storage device is decreased and the power storage device deteriorates. That is, the capacity is significantly decreased as charging and discharging are repeated through the cycle performance test of the power storage device, and the lifetime of the power storage device becomes short. Furthermore, when metal dissolution from the current collector at a connection portion between the lead and the current collector proceeds, disconnection might occur. In one embodiment of the present invention, a material which is unlikely to react with the current collector and thus is unlikely to cause the dissolution of the metal in the current collector is used for the solute material contained in the electrolytic solution.

Examples of a metal in materials for the positive electrode current collector include aluminum and stainless steel. In one embodiment of the present invention, for a solute material used for the electrolytic solution, the white that is unlikely to dissolve such a metal included in the positive electrode current collector is used. Specifically, LiBETA can be given as a lithium salt that can be used as the solute in one embodiment of the present invention.

Therefore, in the power storage device of one embodiment of the present invention, the dissolution of the metal included in the positive electrode current collector into the electrolytic solution is inhibited, so that the deterioration of the positive electrode current collector is inhibited. In addition, the deposition of the metal on a surface of the negative electrode is inhibited, so that the capacity reduction is small, and the power storage device can have a favorable cycle lifetime.

Other than the above electrolytes, one of lithium salts such as LiPF$_6$, LiClO$_4$, LiAsF$_6$, LiAlCl$_4$, LiSCN, LiBr, LiI, Li$_2$SO$_4$, Li$_2$B$_{10}$Cl$_{10}$, Li$_2$B$_{12}$Cl$_{12}$, LiCF$_3$SO$_3$, LiC$_4$F$_9$SO$_3$, LiC(CF$_3$SO$_2$)$_3$, LiC(C$_2$F$_5$SO$_2$)$_3$, LiN(C$_4$F$_9$SO$_2$)(CF$_3$SO$_2$), and LiN(C$_2$F$_5$SO$_2$)$_2$ can be used, or two or more of these lithium salts can be used in an appropriate combination in an appropriate ratio.

Although the case where carrier ions are lithium ions in the above electrolyte is described, carrier ions other than lithium ions can be used. When the carrier ions other than lithium ions are alkali metal ions or alkaline-earth metal ions, instead of lithium in the lithium salts, an alkali metal (e.g., sodium or potassium) or an alkaline-earth metal (e.g., calcium, strontium, barium, beryllium, or magnesium) may be used as the electrolyte.

Furthermore, an additive such as VC, propane sulfone (PS), tert-butylbenzene (TBB), fluoroethylene carbonate (FEC), or LiBOB may be added to the electrolytic solution. The concentration of such an additive in the whole solvent is, for example, higher than or equal to 0.1 wt % and lower than or equal to 5 wt %.

With the use of the above, solvent and the above electrolyte, an electrolytic solution of the power storage device of one embodiment of the present invention can be formed.

<<Current Collector>>

There is no particular limitation on the current collector as long as it has high conductivity without causing a significant chemical change in a power storage device. For example, the positive electrode current collector and the negative electrode current collector can each be formed using a metal such as stainless steel, gold, platinum, zinc, iron, nickel, copper, aluminum, titanium, tantalum, or manganese, an alloy thereof, sintered carbon, or the like. Alternatively, copper or stainless steel that is coated with carbon, nickel, titanium, or the like may be used. Alternatively, the current collectors can each be formed using an aluminum alloy to which an element that improves heat resistance, such as silicon, titanium, neodymium, scandium, or molybdenum, is added. Still alternatively, a metal element that forms silicide by reacting with silicon can be used to form the current collectors. Examples of the metal element that forms silicide by reacting with silicon include zirconium, titanium, hafnium, vanadium, niobium, tantalum, chromium, molybdenum, tungsten, cobalt, and nickel.

An irreversible reaction with an electrolytic solution is sometimes caused on surfaces of the positive electrode current collector and the negative electrode current collector. Thus, the positive electrode current collector and the negative electrode current collector preferably have low reactivity to an electrolytic solution.

The positive electrode current collector and the negative electrode current collector can each have any of various shapes including a foil-like shape, a plate-like shape (sheet-like shape), a net-like shape, a cylindrical shape, a coil shape; a punching-metal shape, an expanded-metal shape, a porous shape, and a shape of non-woven fabric as appropriate. The positive electrode current collector and the negative electrode current collector may each be formed to have micro irregularities on the surface thereof in order to enhance adhesion to the active material layer. The positive electrode current collector and the negative electrode current collector each preferably have a thickness of 5 μm to 30 μm inclusive.

An undercoat layer may be provided, over part of a surface of the current collector. The undercoat layer is a coating layer provided to reduce contact resistance between the current collector and the active material layer or to improve adhesion between the current collector and the active material layer. Note that the undercoat layer is not necessarily formed over the entire surface of the current collector and may be partly formed to have an island-like shape. In addition, the undercoat layer may serve as an active material to have capacity. For the undercoat layer, a carbon material can be used, for example. Examples of the carbon material include graphite, carbon black such as acetylene black, and a carbon nanotube. Examples of the undercoat layer include a metal layer, a layer containing carbon and high molecular compounds, and a layer containing metal and high molecular compounds.

<<Active Material Layer>>

The active material layer includes the active material. An active material refers only to a material that is involved in insertion and extraction of ions that are carriers. In this specification and the like, a layer including an active material is referred to as an active material layer. The active material layer may include a conductive additive and a binder in addition to the active material.

The positive electrode active material layer includes one or more kinds of positive electrode active materials. The negative electrode active material layer includes one or more kinds of negative electrode active materials.

The positive electrode active material and the negative electrode active material have a central role in battery reactions of a power storage device, and receive and release carrier ions. To increase the lifetime of the power storage device, the active materials preferably have a little capacity involved in irreversible battery reactions, and have high charge and discharge efficiency.

For the positive electrode active material, a material into and from which carrier ions such as lithium ions can be inserted and extracted can be used. Examples of a positive electrode active material include materials having an olivine crystal structure, a layered rock-salt crystal structure, a spinel crystal structure, and NASICON crystal structure.

As the positive electrode active material, a compound such as $LiCoO_2$, $LiNiO_2$, or $LiMn_2O_4$, $V_2O_5$, $Cr_2O_5$, $MnO_2$, or $LiFeO_2$ can be used.

As an example of a material having an olivine crystal structure, lithium-containing complex phosphate ($LiMPO_4$ (general formula) (M is one or more of Fe(II), Mn(II), Co(II), and Ni(II))) can be given. Typical examples of $LiMPO_4$ are compounds such as $LiFePO_4$, $LiNiPO_4$, $LiCoPO_4$, $LiMnPO_4$, $LiFe_aNi_bPO_4$, $LiFe_aCo_bPO_4$, $LiFeMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iO_4$ (f+g+h+i≤1, 0<f<1, 0<g<1, 0<h<1, and 0<i<1).

For example, lithium iron phosphate ($LiFePO_4$) is preferable because it properly has properties necessary for the positive electrode active material, such as safety, stability, high capacity density, high potential, and the existence of lithium ions which can be extracted in initial oxidation (charging).

Examples of a material with a layered rock-salt crystal structure include lithium cobalt oxide ($LiCoO_2$), $LiNiO_2$, $LiMnO_2$, $Li_2MnO_3$, a NiCo-containing material (general formula: $LiNi_xCo_{1-x}O_2$ (0<x<1)) such as $LiNi_{0.8}Co_{0.2}O_2$, a NiMn-containing material. (general formula: $LiNi_xMn_{1-x}O_2$ (0<x<1)) such as $LiNi_{0.5}Mn_{0.5}O_2$, a NiMnCo-containing material (also referred to as NMC) (general formula $LiNi_xMn_yCo_{1-x-y}O_2$ (x>0, y>0, x+y<1)) such as $LiNi_{1/3}Mn_{1/3}Co_{1/3}O_2$. Moreover, $Li(Ni_{0.8}Co_{0.15}Al_{0.05})O_2$, $Li_2MnO_3$—$LiMO_2$ (M=Co, Ni, or Mn), and the like can be given as the examples.

In particular, $LiCoO_2$, is preferable because it has advantages such as, high capacity, higher stability in the air than that of $LiNiO_2$, and higher thermal stability than that of $LiNiO_2$.

Examples of a material with a spinel crystal structure include $LiMn_2O_4$, $Li_{1+x}Mn_{2-x}O_4$ (0<x<2), $LiMn_{2-x}Al_xO_4$ (0<x<2), and $LiMm_{1.5}Ni_{0.5}O_4$.

It is preferred that a small amount of lithium nickel oxide (LiNiO$_2$, or LiNi$_{1-x}$M$_x$O$_2$ (0<x<1, M=Co, Al, or the like)) be added to a material with a spinel crystal structure that contains manganese, such as LiMn$_2$O$_4$, in which case advantages such as inhibition of the dissolution of manganese and the decomposition of an electrolytic solution can be obtained.

Alternatively, a lithium-containing complex silicate expressed by Li$_{(2-j)}$MSiO$_4$ (general formula) (M is one or more of Fe(II), Mn(II), Co(II), or Ni(II); 0≤j≤2) may be used as the positive electrode active material typical examples of the general formula Li$_{(2-j)}$MSiO$_4$ are compounds such as Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Ni$_k$Co$_l$SiO$_4$, Li$_{(2-j)}$Ni$_k$Mn$_l$SiO$_4$ (k+l, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Still alternatively, a NASICON compound expressed by A$_x$M$_2$(XO$_4$)$_3$ (general formula) (A=Li, Na, or Mg, M=Fe, Mn, Ti, V, Nb, or Al, X=S, P, Mo, W, As, or Si) can be used for the positive electrode active material. Examples of the NASICON compound are Fe$_2$(MnO$_4$)$_3$, Fe$_2$(SO$_4$)$_3$, and Li$_3$Fe$_2$(PO$_4$)$_3$.

Further alternatively, for example, a compound expressed by Li$_2$MPO$_4$F, Li$_2$MP$_2$O$_7$, or Li$_5$MO$_4$ (general formula) (M=Fe or Mn), a perovskite fluoride such as FeF$_3$, a metal chalcogenide (a sulfide, a selenide, or a telluride) such as TiS$_2$ and MoS$_2$, a lithium-containing material with an inverse spinel structure such as LiMVO$_4$, a vanadium oxide (V$_2$O$_5$, V$_6$O$_{13}$, LiV$_3$O$_8$, LiVOPO$_4$, or the like), a manganese oxide, or an organic sulfur compound can be used as the positive electrode active material.

Further alternatively, any of the aforementioned materials may be combined to be used as the positive electrode active material. For example, a solid solution obtained by combining two or more of the above materials can be used as the positive electrode active material. For example a solid solution of LiCo$_{1/3}$Mn$_{1/3}$Ni$_{1/3}$O$_2$ and Li$_2$MnO$_3$ can be used as the positive electrode active material.

In the case where carrier ions are alkali metal ions other than lithium ions, or alkaline-earth metal ions, a compound containing carriers such as an alkali metal (e.g., sodium and potassium) or an alkaline-earth metal (e.g, calcium, strontium, barium, beryllium, and magnesium) instead of lithium of the lithium compound, the lithium-containing complex phosphate, or the lithium-containing complex silicate may be used as the positive electrode active material.

The average diameter of primary particles of the positive electrode active material is preferably, for example, greater than or equal to 5 nm and less than or equal to 100 μm.

For example, lithium-containing complex phosphate having an olivine crystal structure used for the positive electrode active material has a one-dimensional lithium diffusion path, so that lithium diffusion is slow. Thus, in the case of using lithium-containing complex phosphate having an olivine crystal structure, the average diameter of particles of the positive electrode, active material is, for example, preferably greater than or equal to 5 nm and less than or equal to 1 μm so that the charge and discharge rate is increased. The specific surface area of the positive electrode active material is, for example, preferably greater than or equal to 10 m$^2$/g and less than or equal to 50 m$^2$/g.

An active material having an olivine crystal structure is much less likely to be changed in the crystal structure by charging and discharging and has a more stable crystal structure than, for example, an active material having a layered rock-salt crystal structure. Thus, a positive electrode active material having an olivine crystal structure is stable against operation such as overcharging. The use of such a positive electrode active material allows fabrication of a highly safe power storage device.

As the negative electrode active material, for example, a carbon-based material, an alloy-based material, or the like can be used.

Examples of the carbon-based material include graphite, graphitizing carbon (soft carbon), non-graphitizing carbon (hard carbon), a carbon nanotube, graphene, carbon black, and the like. Examples of the graphite include artificial graphite such as meso-carbon microbeads (MCMB), coke-based artificial graphite, or pitch-based artificial graphite and natural graphite such as spherical natural graphite. In addition, examples of the shape of the graphite include a flaky shape and a spherical shape.

Graphite has a low potential substantially equal to that of a lithium metal when lithium ions are intercalated into the graphite (while a lithium-graphite intercalation compound is formed). For this reason, a lithium-ion secondary battery can have a high operating voltage. Graphite is preferred because of its advantages described above, such as relatively high capacity per unit volume, small volume expansion, low cost, and safety greater than that of a lithium metal.

Here, a graphite material will be described. Graphite is a layered compound in which a plurality of graphene layers are stacked parallel to each other by van der Waals forces. A surface of the graphite material includes a plane parallel to the graphene layer (also referred to as a basal plane) and a plane where edges of the plurality of graphene layers are arranged (also referred to as an edge plane). In the basal plane, one surface of the outmost layer of the graphene layers composing graphite is exposed. In the edge plane, the edges of the plurality of graphene layers are exposed. In charging and discharging of a secondary battery, the edge plane of the graphite material serves as a main gate for lithium intercalation and deintercalation to and from the graphite material.

In the case where graphite is used for the negative electrode active material, the contact between the exposed portion of the edge plane and the electrolytic solution containing PC might cause a side reaction between graphite and PC in charging and discharging. In spherical natural graphite used for the negative electrode active material included in the power storage device of one embodiment of the present invention, a layer having lower crystallinity than a graphite layer is formed in contact with the edge plane; thus, a side reaction between graphite and PC can be inhibited in some cases.

For example, in the case where carrier ions are lithium ions, a material including at least one of Mg, Ca, Ga, Si, Al, Ge, Sn, Pb, As, Sb, Bi, Ag, Au, Zn, Cd, Hg, In, and the like can be used as the alloy-based material. Such elements have a higher capacity than carbon. In particular, silicon has a high theoretical capacity of 4200 mAh/g, and therefore, the capacity of the power storage device can be increased. Examples of an alloy-based material (compound-based material) using such elements include Mg$_2$Si, Mg$_2$Ge, Mg$_2$Sn, SnS$_2$, V$_2$Sn$_3$, FeSn$_2$, CoSn$_2$, Ni$_3$Sn$_5$, Cu$_6$Sn$_5$, Ag$_3$Sn, Ag$_3$SbNi$_2$MnSb, CeSb$_3$, LaSn$_3$, La$_3$Co$_2$Sn$_1$, CoSb$_3$, InSb, and SbSn.

Alternatively, for the negative electrode active material, an oxide such as SiO, SnO, SnO$_2$, titanium dioxide (TiO$_2$), lithium titanium oxide (Li$_4$Ti$_5$O$_{12}$), lithium-graphite intercalation compound (Li$_x$C$_6$), niobium pentoxide (Nb$_2$O$_5$), tungsten oxide (WO$_2$), or molybdenum oxide (MoO$_2$) can be used. Here, SiO is a compound containing silicon and oxygen. When the atomic ratio of silicon to oxygen is represented by $\alpha:\beta$, $\alpha$ preferably has an approximate value of $\beta$. Here, when a has an approximate value of $\beta$, an absolute value of the difference between $\alpha$ and $\beta$ is preferably less than or equal to 20% of a value of more preferably less than or equal to 10% of a value of $\beta$.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.04}N_3$ is preferable because of high charge and discharge capacity (900 mAh/g and 1890 $mAh/cm^3$).

When a nitride containing lithium and a transition metal is used, lithium ions are contained in the negative electrode active material and thus the negative electrode active material can be used in combination with a material for a positive electrode active material that does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active material; for example, a transition metal oxide that does not cause an alloy reaction with lithium, such, as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FoF_3$ and $BiF_3$. The average diameter of primary particles of the negative electrode active material is preferably, for example, greater than or equal to 5 nm and less than or equal to 100 μm.

The positive electrode active material layer and the negative electrode active material layer may each include a conductive additive.

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, more preferably greater than or equal to 1 wt % and less than or equal to 5 wt %.

A network for electric conduction can be formed in the electrode by the conductive additive. The conductive additive also allows maintaining of a path for electric conduction between the negative electrode active material particles. The addition of the conductive additive to the active material layer increases the electric conductivity of the active material layer.

Examples of the conductive additive include natural graphite, artificial graphite such as meso carbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, graphene oxide, and fullerene. Alternatively, metal powder or metal fibers of copper, nickel, aluminum, silver, gold, or the like, a conductive ceramic material, or the like can be used.

Flaky graphene has an excellent electrical characteristic of high conductivity and excellent physical properties of high flexibility and high mechanical strength. Thus, the use of graphene as the conductive additive can increase contact points and the contact area of the active materials.

Graphene is capable of making low-resistance surface contact and has extremely high conductivity even with a small thickness. Therefore, even a small amount of graphene can efficiently form a conductive path in an active material layer.

In the case where an active material with a small average particle diameter (e.g., 1 μm or less) is used, the specific surface area of the active material is large and thus more conductive paths for the active material particles are needed. In such a case, it is particularly preferred that graphene with extremely high conductivity that can efficiently form a conductive path even in a small amount is used.

The positive electrode active material layer and the negative electrode active material layer may each include a binder.

In this specification, the binder has a function of binding or bonding the active materials and/or a function of binding or bonding the active material layer and the current collector. The binder is sometimes changed in state during fabrication of an electrode or a battery. For example, the binder can be at least one of a liquid, a solid and a gel. The binder is sometimes changed from a monomer to a polymer during fabrication of an electrode or a battery.

As the binder, for example, a water-soluble high molecular compound can be used. As the water-soluble high molecular compound, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, fluororubber, or ethylene-propylene-diene copolymer can be used. Any of these rubber materials may be used in combination with the aforementioned water-soluble high molecular compound. Since these rubber materials have rubber elasticity and easily expand and contract, it is possible to obtain a highly reliable electrode that is resistant to stress due to expansion and contraction of an active material by charging and discharging, bending of the electrode, or the like. On the other hand, the rubber materials have a hydrophobic group and thus are unlikely to be soluble in water in some cases. In such a case, particles are dispersed in an aqueous solution without being dissolved in water, so, that increasing the viscosity of a composition containing a solvent used for the formation of the active material layer (also referred to as an electrode binder composition) up to the viscosity suitable for application might be difficult. A water-soluble high molecular compound having excellent viscosity modifying properties, such as polysaccharide, can moderately increase the viscosity of the solution and can be uniformly dispersed together with a rubber material. Thus, a favorable electrode, with high uniformity (e.g., an electrode with uniform electrode thickness or electrode resistance) can be obtained.

Alternatively, as the binder, a material such as PVdF, polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyacrylonitrile (PAN), ethylene-propylene-diene polymer, polyvinyl acetate, or nitrocellulose can be used.

Two or more of the above materials may be used in combination for the binder.

The content of the binder in the active material layer is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %.

<<Exterior Body>>

It is preferred that the surface of the exterior body 509 that is in contact with the electrolytic solution 508, i.e., the inner surface of the exterior body 509, does not react with the electrolytic solution 508 significantly. When moisture enters the power storage device 500 from the outside, a reaction between a component of the electrolytic solution 508 or the like and water might occur. Thus, the exterior body 509 preferably has low moisture permeability.

As the exterior body 509, a film having a three-layer structure can be used, for example. In the three-layer structure, a highly flexible metal thin film of aluminum, stainless steel, copper, nickel, or the like is provided over a film formed using polyethylene, polypropylene, polycarbonate, ionomer, polyamide, or the like, and an insulating, synthetic resin film of a polyamide-based resin, a polyester-based resin, or the like is provided as the outer surface of the exterior body over the metal thin film can be used. With such a three-layer structure, the passage of an electrolytic solution and a gas can be blocked and an insulating property and resistance to the electrolytic solution can be provided. The exterior body is folded inside in two, or two exterior bodies are stacked with the inner surfaces facing each other, in which case application of heat melts the materials on the overlapping inner surfaces to cause fusion bonding between the two exterior bodies. In this manner, a sealing structure can be formed.

A portion where the sealing structure is formed by fusion bonding or the like of the exterior body is referred to as a sealing portion. In the case where the exterior body is folded inside in two, the sealing portion is formed in the place other than the fold, and a first region of the exterior body and a second region of the exterior body that overlaps with the first region are fusion-bonded, for example. In the case where two exterior bodies are stacked, the sealing portion is formed along the entire outer region by heat fusion bonding or the like.

The power storage device 500 can be flexible by using the exterior body 509 with flexibility. When the power storage device 500 has flexibility, it can be used in an electronic device at least part of which is flexible, and the power storage device 500 can be bent as the electronic device changes its form.

Note that in one embodiment of the present invention, a graphene compound can be used in a component of the power storage device. As described later, when modification is performed, the structure and characteristics of a graphene compound can be selected from a wider range of alternatives. Thus, a preferable property can be exhibited in accordance with a component in which a graphene compound is to be used. Moreover, a graphene compound has high mechanical strength and therefore can be used in a component of a flexible power storage device. Graphene compounds will be described below.

Graphene has carbon atoms arranged in one atomic layer. A π bond exists between the carbon atoms. Graphene including two or more and one hundred or less layers is referred to as multilayer graphene in some cases. The length in the longitudinal direction or the length of the major axis in a plane in each of graphene and multilayer-graphene is greater than or equal to 50 nm and less than or equal to 100 μm or greater than or equal to 800 nm and less than or equal to 50 μm.

In this specification and the like, a compound including graphene or multilayer graphene as a basic skeleton is referred to as a graphene compound. Graphene compounds include graphene and multilayer graphene.

Graphene compounds will be detailed below.

A graphene compound is, for example, a compound where graphene or multilayer graphene is modified with an atom other than carbon or an atomic group with an atom other than carbon. A graphene compound may be a compound where graphene or multilayer graphene is modified with an atomic group composed mainly of carbon, such as an alkyl group or alkylene. An atomic group that modifies graphene or multilayer graphene is referred to as a substituent, a functional group, a characteristic group, or the like in some cases. Modification in this specification and the like refers to introduction of an atom other than carbon, an atomic group with an atom other than carbon, or an atomic group composed mainly of carbon to graphene, multilayer graphene, a graphene compound, or graphene oxide. (described later) by a substitution reaction, an addition reaction, or other reactions.

Note that the surface and the rear surface of graphene may be modified with different atoms or atomic groups. In multilayer graphene, multiple layer may be modified with different atoms or atomic groups.

An example of the above-described graphene modified with an atom or an atomic group is graphene or multilayer graphene that is modified with oxygen or a functional group containing oxygen. Examples of a functional group containing oxygen include an epoxy group, a carbonyl group such as a carboxyl group, and a hydroxyl group. A graphene compound modified with oxygen or a functional group containing oxygen is referred to as graphene oxide in some cases. In this specification, graphene oxides include multilayer graphene oxides.

As an example of modification of graphene oxide, silylating of graphene oxide will be described. First, in a nitrogen atmosphere, graphene oxide is put in a container, n-butylamine ($C_4H_9NH_2$) is added to the container, and stirring is performed for one hour with the temperature kept at 60° C. Then, toluene is added to the container, alkyl-trichlorosilane is added thereto as a silylating, agent, and stirring is performed in a nitrogen atmosphere for five hours with the temperature kept at 60° C. Then, toluene is further added to the container, and the resulting solution is suction-filtrated to give solid powder. The powder is dispersed in ethanol, and the resulting solution is suction-filtered to give solid powder. The powder is dispersed in acetone, and the resulting solution is suction-filtered to give solid powder. A liquid of the solid powder is vaporized to give silylated graphene oxide.

The modification is not limited to silylation, and silylation is not limited to the above-described method. Furthermore, the modification is not limited to introduction of an atom or an atomic group of one kind, and the modification of two or more types may be performed to introduce atoms or atomic groups of two or more kinds. By introducing a given, atomic group to a graphene compound, the physical property of the graphene compound can be changed. Therefore, by performing desirable modification in accordance with the use of a graphene compound, a desired property of the graphene compound can be exhibited intentionally.

A formation method example of graphene oxide will be described below. Graphene oxide can be obtained by oxidizing the aforementioned graphene or multilayer graphene. Alternatively, graphene oxide can be obtained by being separated from graphite oxide. Graphite oxide can be obtained by oxidizing graphite. The graphene oxide may further be modified with the above-mentioned atom or atomic group.

A compound that cap be obtained by reducing graphene oxide is referred to as reduced graphene oxide (RGO) in some cases. In RGO, in some cases, all oxygen atoms contained in the graphene oxide are not extracted and part of them remains in a state of oxygen or an atomic group containing oxygen that is bonded to carbon. In some cases, RGO includes a functional group, e.g., an epoxy group a carbonyl group such as a carboxyl group, or a hydroxyl group.

A graphene compound may have a sheet-like shape where a plurality of graphene compounds partly overlap with each other. Such a graphene compound is referred to as a graphene compound sheet in some cases. The graphene compound sheet has, for example, an area with a thickness larger than or equal to 0.33 nm and smaller than or equal to 10 mm, preferably larger than or equal to 0.34 nm and smaller than or equal to 10 μm. The graphene compound sheet may be modified with an atom other than carbon, an atomic group containing an atom other than carbon, an atomic group composed mainly of carbon such as an alkyl group, or the like. A plurality of layers in the graphene compound sheet may be modified with different atoms or atomic groups.

A graphene compound may have a five-membered ring composed of carbon atoms or a poly-membered ring that is a seven- or more-membered ring composed of carbon atoms, in addition to a six-membered ring composed of carbon atoms. In the neighborhood of a poly-membered ring which is a seven- or more-membered ring, a region through which a lithium ion can pass may be generated.

Furthermore, a plurality of graphene compounds may be gathered to form a sheet-like shape, for example.

A graphene compound has a planar shape, thereby enabling surface contact.

In some cases, a graphene compound has high conductivity even when it is thin. The contact area between graphene compounds or between a graphene compound and an active material can be increased by surface contact. Thus, even with a small amount of a graphene compound per volume, a conductive path can be formed efficiently.

In contrast, a graphene compound may also be used as an insulator. For example, a graphene compound sheet can be used as a sheet-like insulator. Graphene oxide, for example, has a more excellent insulation property than a graphene compound that is not oxidized, in some cases. A graphene compound modified with an atomic group may have an improved insulation property, depending on the type of the modifying atomic group.

A graphene compound in this specification and the like may include a precursor of graphene. The precursor of graphene refers to a substance used to form graphene. The precursor of graphene may contain the above-described graphene oxide, graphite oxide or the like.

Graphene containing an alkali metal or an element other than carbon, such as oxygen, is referred to as a graphene analog in some cases. In this specification and the like, graphene compounds include graphene analogs.

A graphene compound in this specification and the like may include an atom, an atomic group, and ions of them between the layers. The physical properties, such as electric conductivity and ionic conductivity, of a graphene compound sometimes change when an atom, an atomic group and ions of them exist between layers of the compound. In addition, a distance between the layers is increased in some cases.

A graphene compound has excellent electrical characteristics of high conductivity and excellent physical properties of high flexibility and high mechanical strength in some cases. A modified graphene compound can have extremely low conductivity and serve as an insulator depending on the type of the modification. A graphene compound has a planar shape. A graphene compound enables low-resistance surface contact.

This embodiment can be combined with any of the other embodiments as appropriate.

Embodiment 2

In this embodiment, electronic devices of embodiments of the present invention will be described with reference to FIG. 12A to 12C to FIGS. 15A to 15C.

<Structural Example 1 of Smartwatch>

Figure 12A:
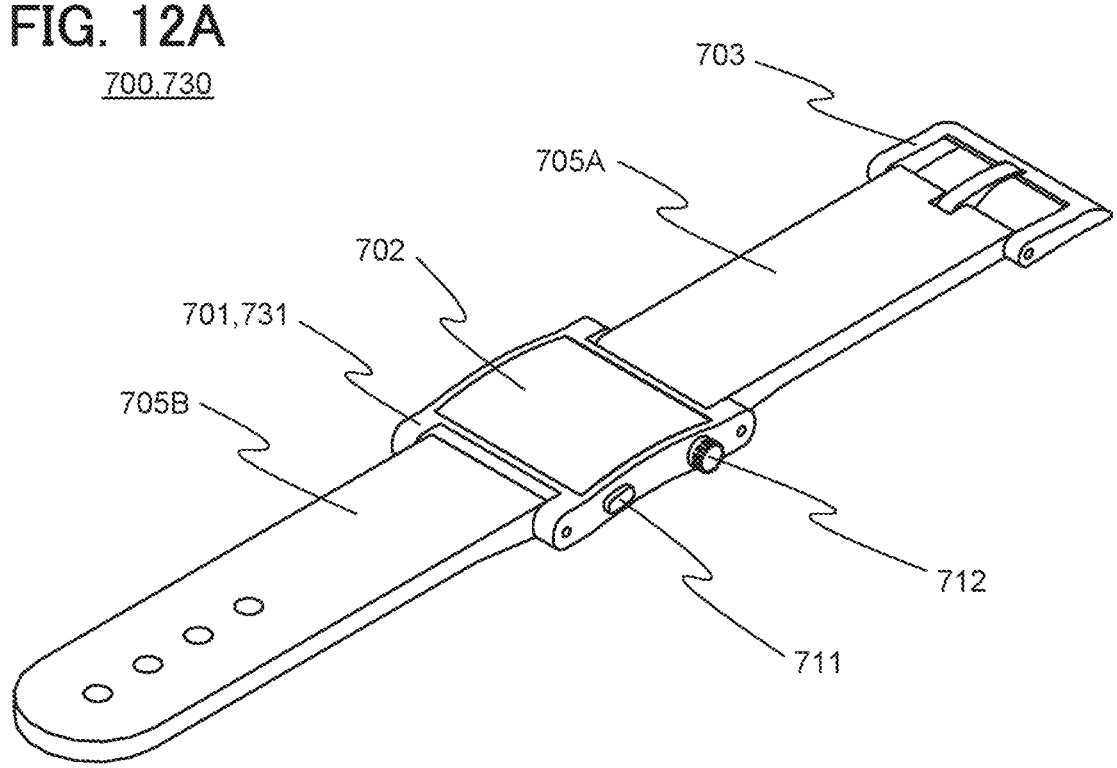
FIGS. 12A to 12C illustrate examples of an electronic device, a band, and a power storage device.

FIG. 12A is a perspective view of a watch-type portable information terminal (also called a smartwatch) 700. The portable information terminal 700 includes a housing 701, a display panel 702, a clasp 703, bands 705A and 705B, and operation buttons 711 and 712.

The display panel 702 mounted in the housing 701 doubling as a bezel includes a rectangular display region. The display region has a curved surface. The display panel 702 preferably has flexibility. Note that the display region may be non-rectangular.

The bands 705A and 705B are connected to the housing 701. The clasp 703 is connected to the band 705A. The band 705A and the housing 701 are connected to each other with a pin such that they can pivot around the pin at a connection portion, for example. In a similar manner, the band 705B and the housing 701 are connected to each other and the band 705A and the clasp 703 are connected to each other.

Figure 12B:
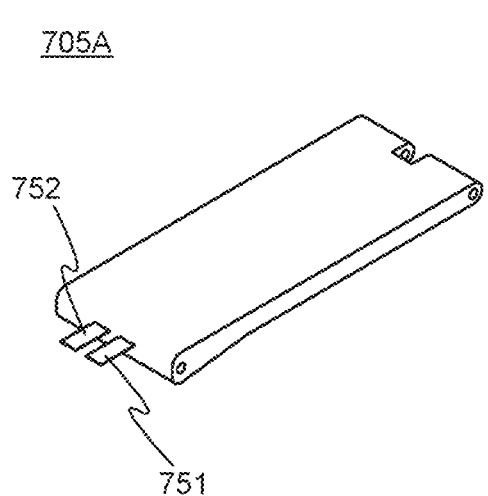
Figure 12C:
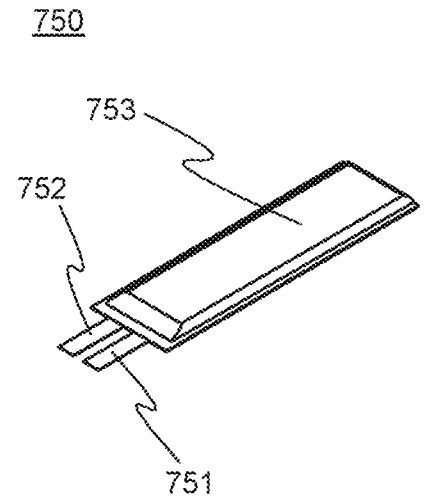

FIGS. 12B and 12C are perspective views of the band 705A and a power storage device 750, respectively. The band 705A includes the power storage device 750. As the power storage device 750, the power storage device 500 described in Embodiment 1 can be used, for example. The power storage device 750 is embedded in the band 705A, and part of the positive electrode lead 751 and part of the negative electrode lead 752 protrude from the band 705A (see FIG. 12B). The positive electrode lead 751 and the negative electrode lead 752 are electrically connected to the display panel 702. The surface of the power storage device 750 is covered with an exterior body 753 (see FIG. 12C). Note that the pin may function as an electrode. Specifically, the positive electrode lead 751 and the display panel 702 may be electrically connected to each other through the pin that connects the band 705A and the housing 701, and the negative, electrode lead 752 and the display panel 702 may be electrically connected to each other through the pin. In that case, the structure of the connection portion between the band 705A and the housing 701 can be simplified.

The power storage device 750 has flexibility. Specifically, a surface of the exterior body 753 preferably has projections and depressions formed by the embossing described in Embodiment 1. Furthermore, the power storage device 750 preferably has sliding planes of the power storage device 500 illustrated in FIGS. 4A and 4B.

The band 705A can be formed so as to incorporate the power storage device 750. For example, the power storage device 750 is set in a mold that the outside shape of the band 705A fits and a material of the band. 705A is poured in the mold and cured, so that the band 705A illustrated in FIG. 12B can be formed.

In the case where a rubber material is used as the material of the band 705A, rubber is cured through heat treatment. For example, in the case where fluorine rubber is used as a rubber material, it is cured through heat treatment at 170° C. for 10 minutes. In the case where silicone rubber is used as a rubber material, it is cured through heat treatment at 150° C. for 10 minutes. The power storage device of one embodiment of the present invention has high heat resistance, which can inhibit breakage and degradation of the charge and discharge characteristics due to heat treatment performed when the power storage device and the rubber material are integrally formed.

Examples of the material of the band 705A include fluorine rubber, silicone rubber, fluorosilicone rubber, and urethane rubber.

Note that energization of the power storage device 750, including aging, is preferably performed after the power storage device 750 is formed to be incorporated in the band 705A. In other words, heat treatment is preferably performed on the power storage device 500 described in Embodiment 1 before energization of the power storage device 500. The heat treatment is preferably performed at 110° C. to 190° C. inclusive for a period of time suitable for vulcanization of the rubber material, for example, at 170° C. for 10 minutes. This can inhibit degradation of the charge and discharge characteristics of the power storage device 500 due to heat treatment.

The portable information terminal 700 in FIG. 12A can have a variety of functions such as a function of displaying a variety of data (e.g., a still image, a moving image, and a text image) on the display region, a touch panel function, a function of displaying a calendar, date, time, and the like, a function, of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display region.

The housing 701 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infared rays), a microphone, and the like. Note that the portable information terminal 700 can be manufactured using the light-emitting element for the display panel 702.

Although FIGS. 12A to 12C illustrate the example where the power storage device 750 is incorporated in the band 705A, the power storage device 750 may be incorporated in the band 705B. The band 705B Can be formed using a material similar to that of the band 705A.

The rubber material used for the band 705A preferably has high chemical resistance. Specifically, the rubber material preferably has low reactivity to an electrolytic solution contained in the power storage device 750.

When the band 705A is cracked or chipped despite of its high chemical resistance, a user of the portable information terminal 700 might touch the electrolytic solution that leaks from the power storage device 750. In the case where the portable information terminal 700 has a function of detecting leakage of the electrolytic solution, the user can stop operation of the portable information terminal 700 and remove it as soon as the electrolytic solution leakage is detected. Consequently, the portable information terminal 700 can be highly safe.

<Structural Example 2 of Smartwatch>

Figure 13A:
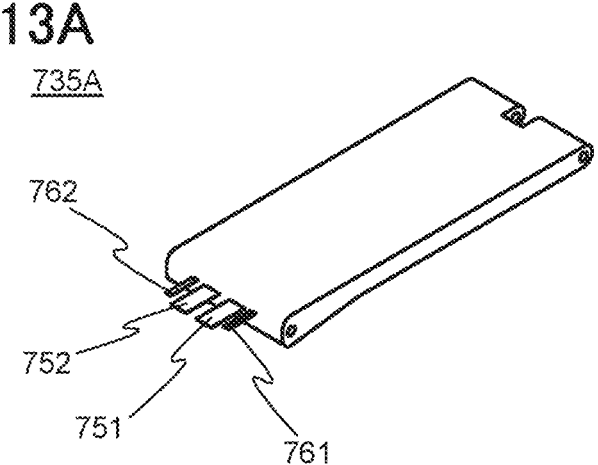
FIGS. 13A to 13C illustrate examples of a band and power storage devices.

FIG. 13A is a perspective view of a band 735A having a structure different form that of the band 705A illustrated in FIG. 12B. A housing 731 connected to the band 735A includes a leakage detection circuit (not illustrated) having a function of detecting leakage of the electrolytic solution of the power storage device (see FIG. 12A). Note that a perspective view of a portable information terminal 730 including the leakage detection circuit is similar to that of the portable information terminal 700.

The band 735A includes a power storage device 760. The power storage device 760 is embedded in the band 735A, and part of the positive electrode lead 751, part of the negative electrode lead 752, part of a terminal 761, and part of a terminal 762 protrude from the band 735A. The positive electrode lead 751 and the negative electrode lead 752 are electrically connected to the display panel 702. The terminal 761 and the terminal 762 are electrically connected to the above leakage detection circuit, for example.

Figure 13B:
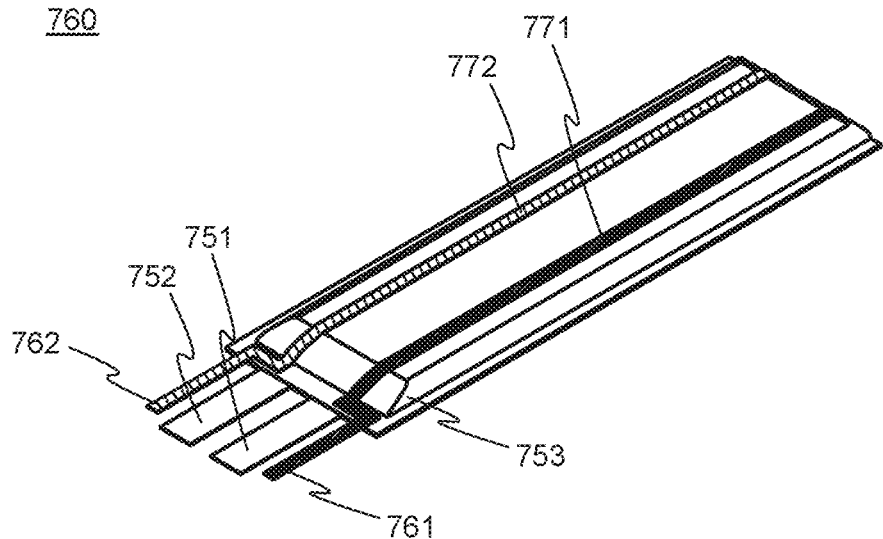

FIG. 13B is a perspective view of the power storage device 760. FIG. 13B is an enlarged view of FIG. 13A for clarification. The power storage device. 760 is different from the power storage device 750 in FIG. 12C in including the terminal 761, terminal 762, a wiring 771, and a wiring 772. The terminal 761 is electrically connected to the wiring 771. The terminal 762 is electrically connected to the wiring 772.

Although the wiring 771 and the wiring 772 are indicated by different hatch patterns for clarification in FIG. 13B, the wiring 771 and the wiring 772 are preferably formed using the same material to achieve cost reduction. Although the terminal 761 and the wiring 771 are indicated by the same, hatching pattern and the terminal 762 and the wiring 772 are indicated by the same hatching pattern, the terminal 761 and the wiring 771 may be formed using different materials and the terminal 762 and the wiring 772 may be formed using different materials.

The wiring 771 and the wiring 772 are provided on a surface of the exterior body 753 with a predetermined gap therebetween (see FIG. 13B). If the electrolytic solution leaks to a surface of the exterior body 753, the wiring 771 and the wiring 772 are electrically connected to each other through the electrolytic solution, whereby the leakage detection circuit can detect leakage of the electrolytic solution.

Although the wiring 771 and the wiring 772 each having a linear shape are provided in the direction of the long axis of the power storage device 760 in FIG. 13B, one embodiment of the present invention is not limited thereto. For example, as illustrated in FIG. 13C, the wiring 771 and the wiring 772 each having a comb-like shape may be provided with a gap therebetween so as to engage with each other.

Figure 13C:
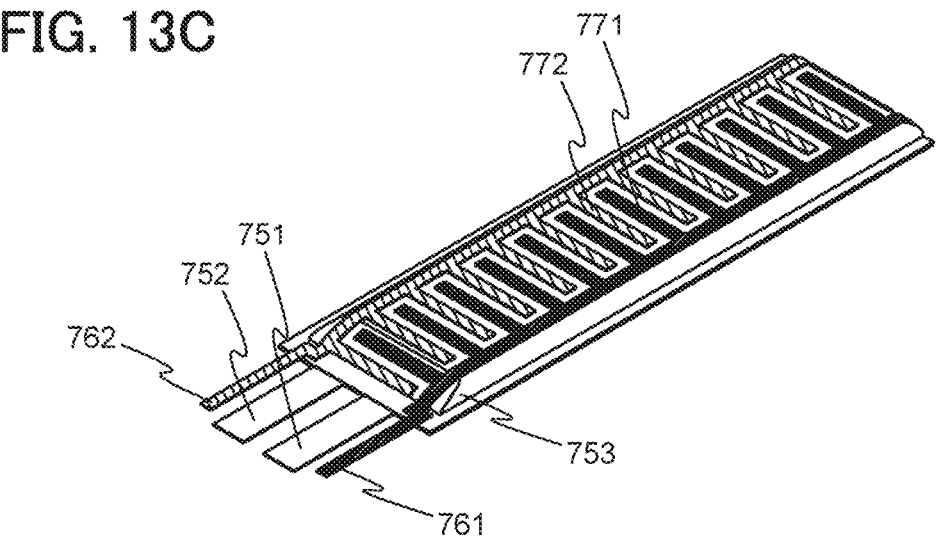
Figure 14A:
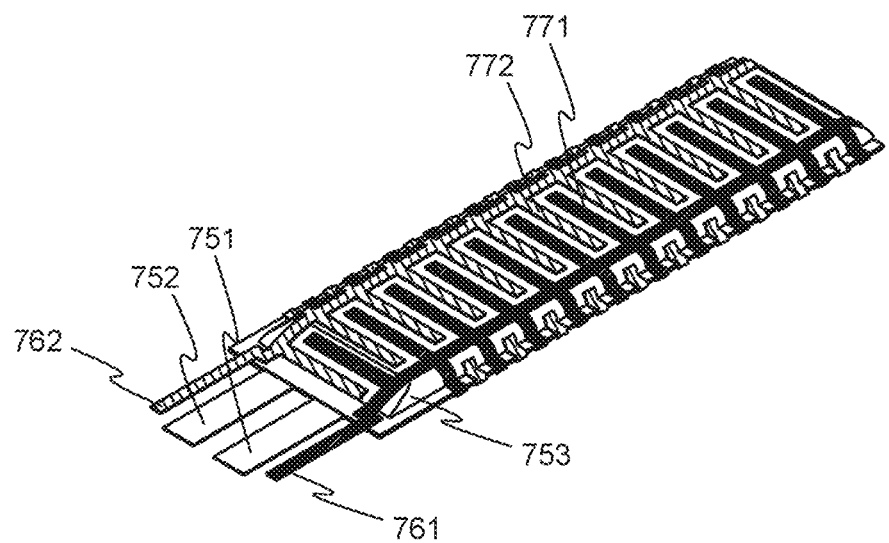
FIGS. 14A and 14B illustrate an example of a power storage device.
Figure 14B:
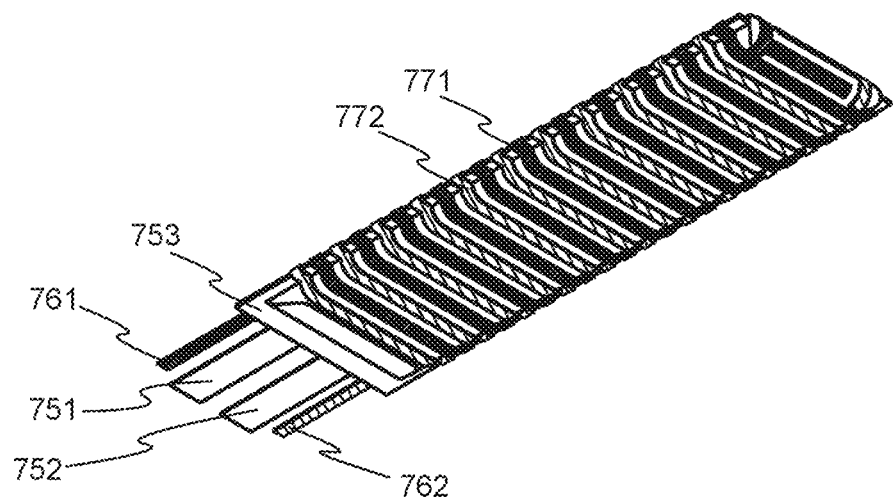

Although FIG. 13C illustrates the example where the wirings 771 and 772 are provided only on the top surface of the exterior body 753, the wirings 771 and 772 are preferably provided on the entire surface of the exterior body 753 as illustrated in FIG. 14A. FIG. 14B is a perspective view of the back surface of the power storage device 760 illustrated in FIG. 14A.

The wirings 771 and 772 each preferably have a small thickness and a small width, in which case the flexibility of the power storage device 760 can be ensured. For example, the power storage device 760 preferably includes a region in which the thickness of each of the wirings 771 and 772 is 5 µm to 500 µm inclusive. Furthermore, it is preferred that the gap between the wiring 771 and the wiring 772 be small and the width of each of the wiring 771 and the wiring 772 be small, in which case even a small amount of electrolytic solution leakage can be detected. For example, the power storage device 760 preferably includes a region in which the length of the gap between the wirings 771 and 772 is 0.5 mm and 20 mm inclusive. Furthermore, the power storage device 760 preferably includes a region in which the width of each of the wiring 771 and the wiring 772 is 0.5 mm and 5 mm inclusive. When the occupation area of the wirings 771 and 772 in the surface of the exterior body 753 is excessively small, the detection of electrolytic solution leakage for the entire surface of the exterior body 753 is not possible in some cases, whereas when the occupation area is excessively large, the flexibility of the power storage device 760 is low in some cases. In the power storage device 760, the proportion of the surface area of the wirings 771 and 772 except side surfaces thereof (the surfaces in contact with the exterior body 753) to the surface area of the exterior body 753 is preferably 5% to 50% inclusive.

The Wirings 771 and 772 preferably include a material having high ductility or high malleability. In particular, the use of a material having both high ductility and high malleability can suppress breakage, of the wirings 771 and 772 clue to curving of the power storage device 760. Examples of the material having both high ductility and high malleability include a metal material such as gold, silver, platinum, iron, nickel, copper, aluminum, zinc, and tin and an alloy containing any of the metal materials.

<<Leakage Detecting Method>>

Figure 15A:
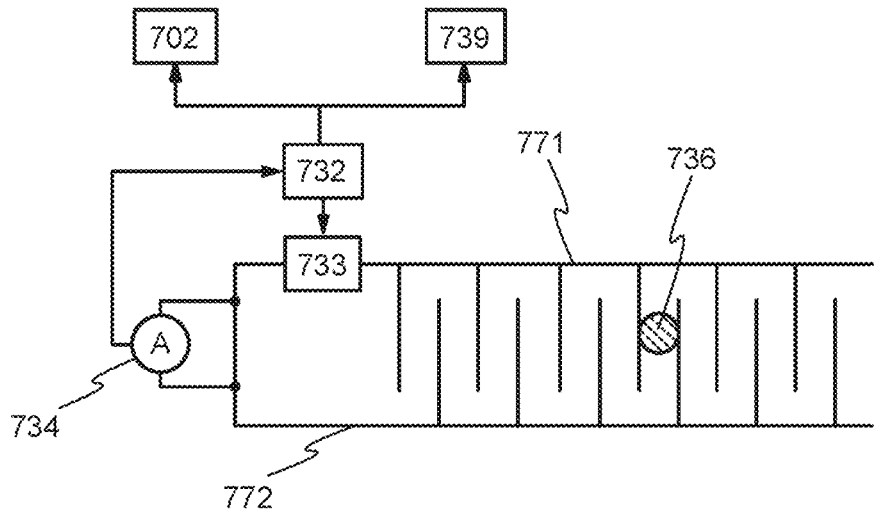
FIG. 15A to 15C illustrate an example of a method for detecting leakage.

An example of a method for detecting electrolytic solution leakage in the portable information terminal 730 will be described below. FIG. 15A is a block diagram of the configuration of the portable information terminal 730 when the electrolytic solution 736 leaks. In FIG. 15A, lines with arrows indicate the directions in which a wired signal or a wireless signal is transmitted. Thus, components connected by the corresponding line are electrically connected to each other in some cases. Lines without an arrow indicate wirings, and components connected by the corresponding line are electrically connected to each other.

The portable information terminal 730 includes a leakage detection circuit 732, a power source 733, an ammeter 734, the wiring 771, and the wiring 772 (see FIG. 15A). The leakage detection circuit 732, the power source 733, and the ammeter 734 are included in the housing 731. The power source 733 and the ammeter 734 may be included in the leakage detection circuit 732. The portable information terminal 730 also includes a functional circuit 739. The functional circuit 739 includes the speaker, the sensor, the microphone, and the like. The functional circuit 739 is included in the housing 731.

The wirings 771 and 772 are electrically connected to the power source 733, and a given voltage is applied between the wiring 771 and the wiring 772 (see FIG. 15A). The on/off of the power source 733 is controlled by the leakage detection circuit 732.

Figure 15B:
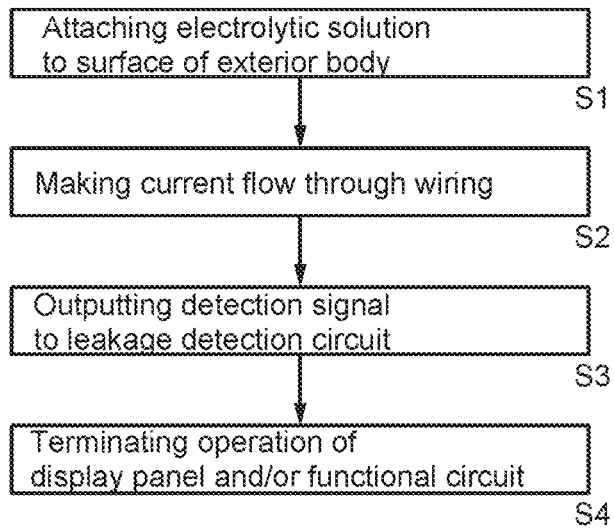
Figure 15C:
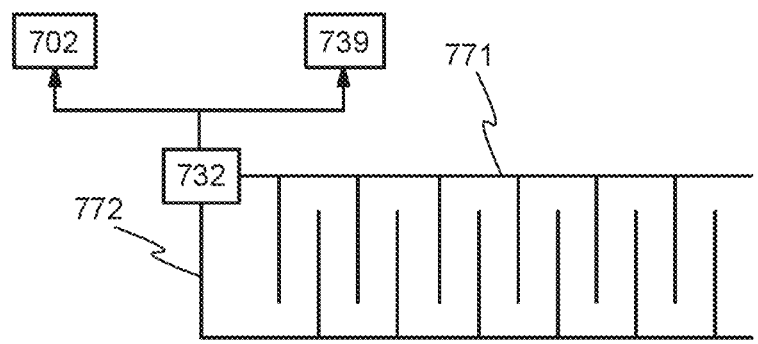

FIG. 15B is a flow chart showing the flow of detection of electrolytic solution leakage in the portable information terminal 730. The method for detecting electrolytic solution leakage in the portable information terminal 730 includes the following four steps, for example.

When the electrolytic solution 736 of the power storage device 760 leaks, the electrolytic solution 736 is attached to a surface of the exterior body 753 (see FIG. 15A and S1 in FIG. 15B). The electrolytic solution 736 attached to the surface of the exterior body 753 comes in contact with the wiring 771 and the wiring 772, whereby a current flows through the wiring 771 and the wiring 772 (see S2 in FIG. 15B). On detecting the current, the ammeter 734 connected in parallel to the wiring 772 outputs a detection signal to the leakage detection circuit 732 (see S3 in FIG. 15B). The leakage detection circuit 732 terminates the operation of the display panel 702 and/or the functional circuit 739 in response to the detection signal (see S4 in FIG. 15B).

Although FIG. 15A illustrates the example where the ammeter 734 is connected to the wiring 772, the ammeter 734 may be connected to the wiring 771. Furthermore, the power source 733 and the ammeter 734 may be included in the leakage detection circuit 732, and the leakage detection circuit 732 may be electrically connected to the wirings 771 and 772 (see FIG. 15C). In that case, the leakage detection circuit 732 has a function of applying a predetermined voltage to the wirings 771 and 772 and a function of detecting a current flowing through the wirings 771 and 772.

This embodiment can be combined with any of the other embodiments as appropriate.

Embodiment 3

In this embodiment, flexible power storage devices that are embodiments of the present invention will be described with reference to FIGS. 16A and 16B to FIG. 23. The power storage device of one embodiment of the present invention may have a curved shape. The power storage device of one embodiment of the present invention may be flexible and capable of being used while being curved and while being not curved.

<Structural Example 1>

Figure 16A:
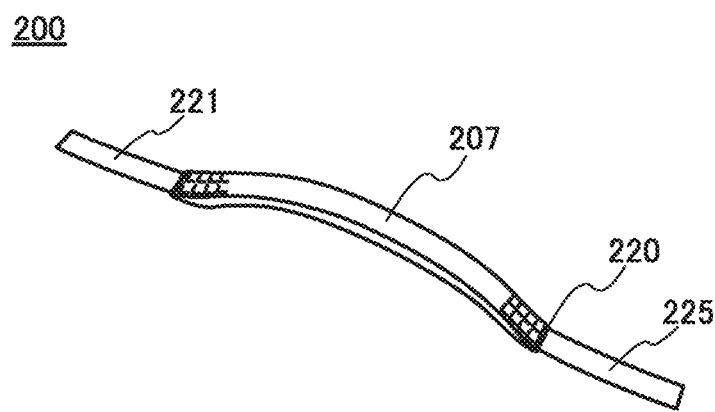
FIGS. 16A and 16B illustrate an example of a power storage device.
Figure 16B:
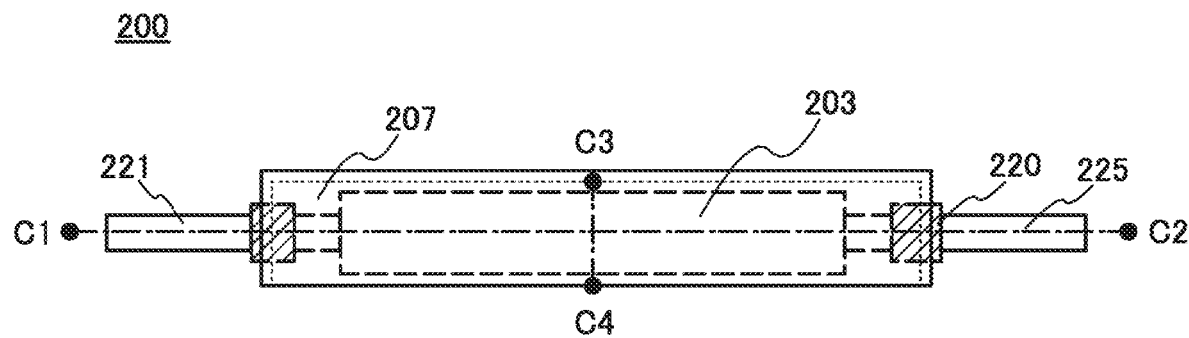

FIG. 16A is a perspective view of a secondary battery 200 and FIG. 16B is a top view of the secondary battery 200.

Figure 17A:
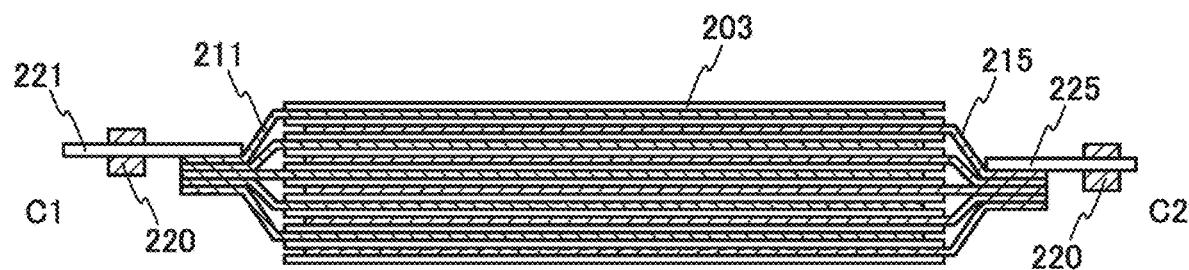
FIGS. 17A and 17B illustrate an example of a power storage device.
Figure 17B:
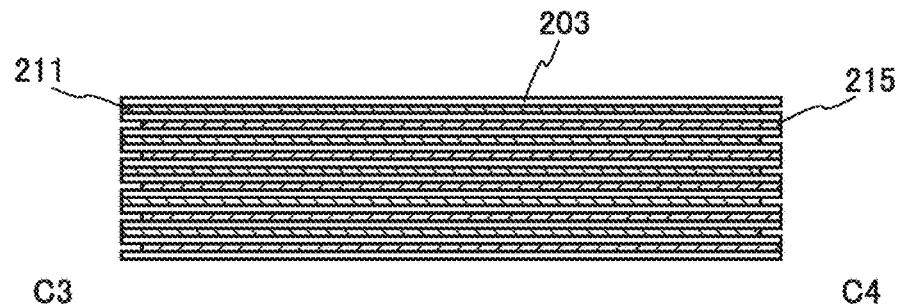

FIG. 17A is a cross-sectional view along dashed-dotted line C1-C2. In FIG. 16B, and FIG. 17B is a cross-sectional view along, dashed-dotted line C3-C4 in FIG. 16B. Note that FIGS. 17A and 17B do not illustrate all components for clarity of the drawings.

The secondary battery 200 includes a positive electrode 211, a negative electrode 215, and a separator 203. The secondary battery 200 further includes a positive electrode lead 221, a negative electrode lead 225, and an exterior body 207.

The positive electrode 211 and the negative electrode 215 each include a current collector and an active material layer. The positive electrode 211 and the negative electrode 215 are provided such that the active material layers face each other with the separator 203 provided therebetween.

One of the electrodes (the positive electrode 211 and the negative electrode 215) of the secondary battery 200 that is positioned on the outer diameter side of a curved portion is preferably longer than the other electrode that is positioned on the inner diameter side of the curved portion, in the direction in which the electrode is curved. With such a structure, ends of the positive electrode 211 and those of the negative electrode 215 are aligned when the secondary battery 200 is curved with a certain curvature. That is, the entire region of the positive electrode active material layer included in the positive electrode 211 can face the negative electrode active material layer included in the negative electrode 215. Thus, positive electrode active materials included in the positive electrode 211 can efficiently contribute to a battery reaction. Therefore, the capacity of the secondary battery 200 per volume can be increased. Such a structure is particularly effective in a case where the curvature of the secondary battery 200 is fixed in using the secondary battery 200.

The positive electrode lead 221 is electrically connected to a plurality of positive electrodes 211. The negative electrode lead 225 is electrically connected to a plurality of negative electrodes 215. The positive electrode lead 221 and the negative electrode lead 225 each include a sealing layer 220.

The exterior body 207 covers a plurality of positive electrodes 211, a plurality of negative electrodes 215, and a plurality of separators 203. The secondary battery 200 includes an electrolytic solution (not shown) in a region covered with the exterior body 207. Three sides of the exterior body 207 are bonded, whereby the secondary battery 200 is sealed.

In FIGS. 17A and 17B, the separators 203 each having a strip-like shape are used and each pair of the positive electrode 211 and the negative electrode 215 sandwich the separator 203; however, one embodiment of the present invention is not limited to this structure. One separator sheet may be folded in zigzag (or into a bellows shape) or wound so that the separator is positioned between the positive electrode and the negative electrode.

Figure 18:
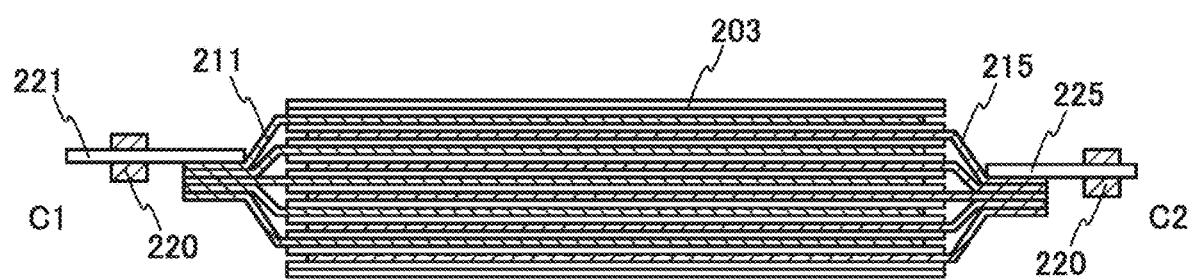
FIG. 18 illustrates an example of a power storage device.

An example of a method for fabricating the secondary battery 200 is illustrated in FIGS. 19A to 19D. FIG. 18 is a cross-sectional view along dashed-dotted line C1-C2 in FIG. 16B of the case of employing this manufacturing method.

First, the negative electrode 215 is positioned over the separator 203 (FIG. 19A) such that the negative electrode active material layer of the negative electrode 215 overlaps with the separator 203.

Then, the separator 203 is folded to overlap with the negative electrode 215. Next, the positive electrode 211 overlaps with the separator 203 (FIG. 19B) such that the positive electrode active material layer of the positive electrode 211 overlaps with the separator 203 and the negative electrode active material layer. Note that in the case of using an electrode in which one surface of a current collector is provided with an active material layer, the positive electrode active material layer of the positive electrode 211 and the negative electrode active material layer of the negative electrode 215 are positioned to face each other with the separator 203 provided therebetween.

Figure 19A:
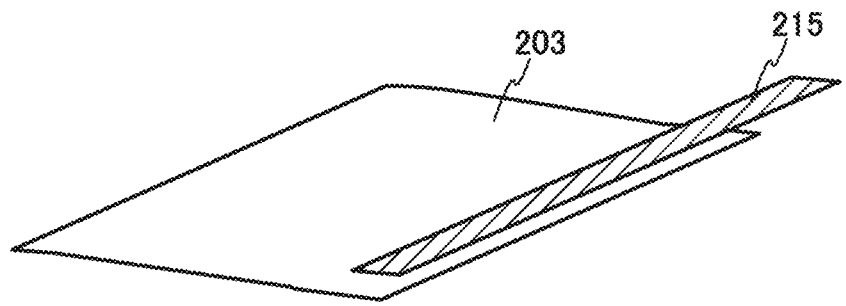
FIGS. 19A to 19D illustrate an example of a method for fabricating a power storage device.
Figure 19B:
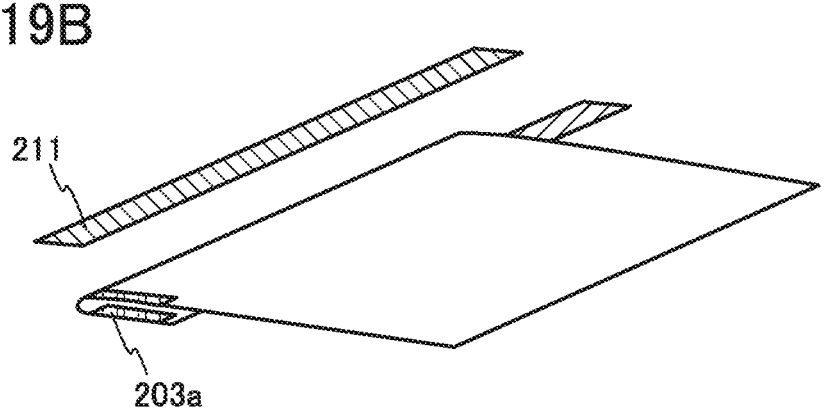

In the case where the separator 203 is formed using a material that can be thermally welded, such as polypropylene, a region where the separator 203 overlaps with itself is thermally welded and then another electrode overlaps with the separator 203, whereby the slippage of the electrode in the fabrication process can be suppressed. Specifically, a region which does not overlap with the negative electrode 215 or the positive electrode 211 and in which the separator 203 overlaps with itself, e.g., a region denoted as 203a in FIG. 19B, is preferably thermally welded.

Figure 19C:
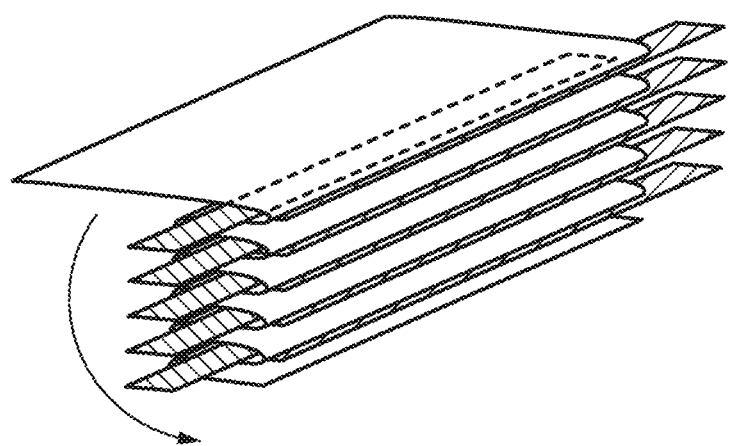

By repeating the above steps, the positive electrode 211 and the negative electrode 215 can overlap with each other with the separator 203 provided therebetween as illustrated in FIG. 19C.

Note that a plurality of positive electrodes 211 and a plurality of negative electrodes 215 may be placed to be alternately sandwiched by the separator 203 that is repeatedly folded in advance.

Then, as illustrated in FIG. 19C, a plurality of positive electrodes 211 and a plurality of negative electrodes 215 are covered with the separator 203.

Figure 19D:
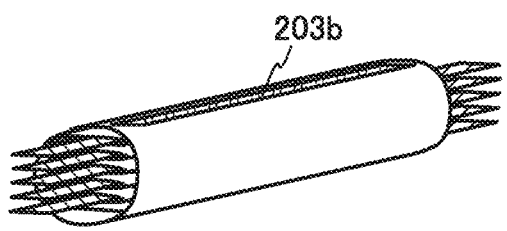

Furthermore, the region where the separator 203 overlaps with itself, e.g., a region 203b in FIG. 19D, is thermally welded as illustrated in FIG. 19D, whereby a plurality of positive electrodes 211 and a plurality of negative electrodes 215 are covered with and tied with the separator 203.

Note that a plurality of positive electrodes 211, a plurality of negative electrodes 215, and the separator 203 may be tied with a binding material.

Since the positive electrodes 211 and the negative electrodes 215 are stacked in the above process, one separator 203 has a region sandwiched between a plurality of positive electrodes 211 and a plurality of negative electrodes 215 and a region covering a plurality of positive electrodes 211 and a plurality of negative electrodes 215.

In other words, the separator 203 included in the secondary battery 200 in FIG. 18 and FIG. 19D is a single separator which is partly folded. In the folded regions of the separator 203, a plurality of positive electrodes 211 and a plurality of negative electrodes 215 are provided.

<Structural Example 2>

FIG. 20A is a perspective view of a secondary battery 250 and FIG. 20B is a top view of the secondary battery 250. Furthermore, FIG. 20C1 is a cross-sectional view of a first electrode assembly 230 and FIG. 20C2 is a cross-sectional view of second electrode assembly 231.

The secondary battery 250 includes the first electrode assembly 230, the second electrode assembly 231, and the separator 203. The secondary battery 250 further includes the positive electrode lead 221, the negative electrode lead 225, and the exterior body 207.

As illustrated in FIG. 20C1, in the first electrode assembly 230, a positive electrode 211a, the separator 203, a negative electrode 215a, the separator 203, and the positive electrode 211a are stacked in this order. The positive electrode 211a and the negative electrode, 215a each include active material layers on opposite surfaces of a current collector.

As illustrated in FIG. 20C2, in the second electrode assembly 231, a negative electrode 215a, the separator 203, the positive electrode 211a, the separator 203, and the negative electrode 215a are stacked in this order. The positive electrode 211a and the negative, electrode 215a each include active material layers on opposite surfaces of a current collector.

In other words, in each of the first electrode assembly 230 and the second electrode assembly 231, the positive electrode and the negative electrode are provided such that the active material layers face each other with the separator 203 provided therebetween.

The positive electrode lead 221 is electrically connected to a plurality of positive electrodes 211. The negative electrode lead 225 is electrically connected to a plurality of negative electrodes 215. The positive electrode lead 221 and the negative electrode lead 225 each include the sealing layer 220.

Figure 21:
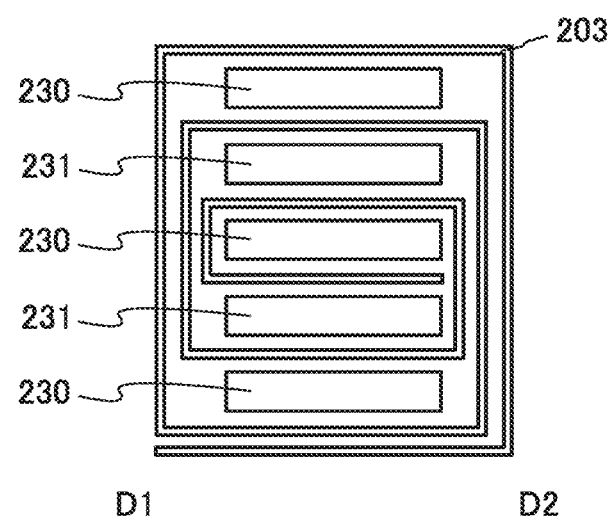
FIG. 21 illustrates an example of a power storage device.

FIG. 21 is an example of a cross-sectional view along dashed-dotted line D1-D2 in FIG. 20B. Note that FIG. 21 does not illustrate all components for clarity of the drawings.

As illustrated in FIG. 21, the secondary battery 250 has a structure in which a plurality of first electrode assemblies 230 and a plurality of second electrode assemblies 231 are covered with the wound separator 203.

The exterior body 207 covers a plurality of first electrode assemblies 230, a plurality of second electrode assemblies 231, and the separator 203. The secondary battery 200 includes an electrolytic solution (not shown) in a region covered with the exterior body 207. Three sides of the exterior body 207 are bonded, whereby the secondary battery 200 is sealed.

An example of a method for fabricating the secondary battery 250 is illustrated in FIGS. 22A to 22D.

Figure 22A:
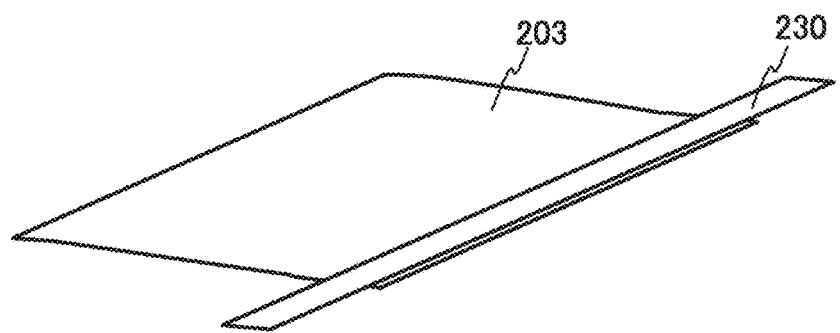
FIGS. 22A to 22D illustrate an example of a method for fabricating a power storage device.

First, the first electrode assembly 230 is positioned over the separator 203 (FIG. 22A).

Figure 22B:
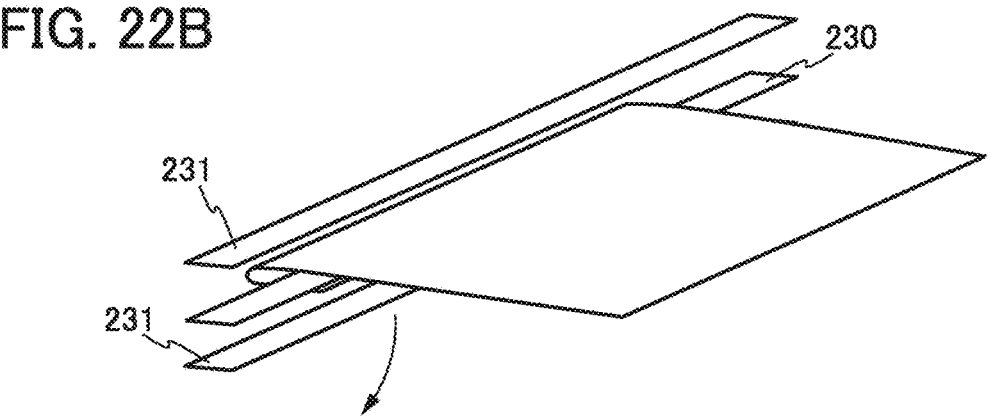

Then, the separator 203 is folded to overlap with the first electrode assembly 230. After that, two second electrode assemblies 231 are positioned over and under the first electrode assembly 230 with the separator 203 positioned between each of the second electrode assemblies 231 and the first electrode assembly 230 (FIG. 22B).

Figure 22C:
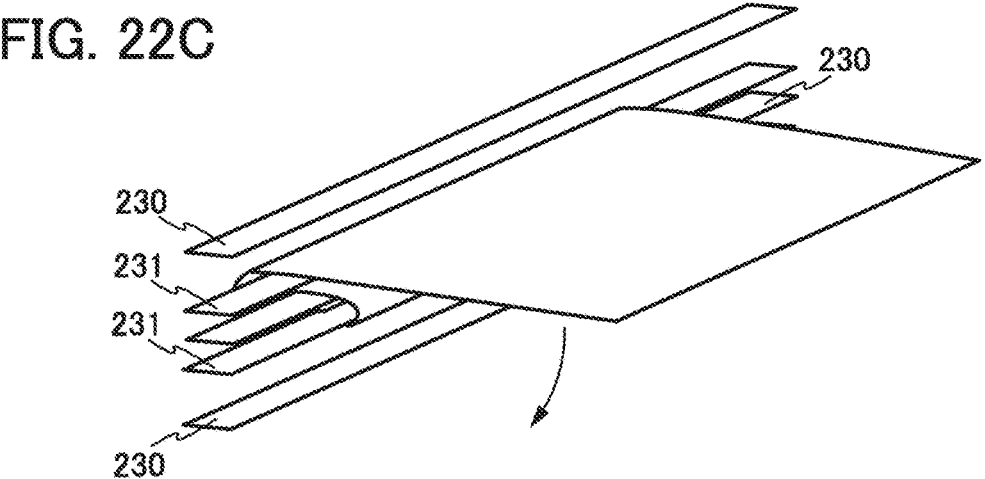

Then, the separator 203 is wound to cover the two second electrode assemblies 231. Moreover, two first electrode assemblies 230 are positioned over and under the two second electrode assemblies 231 with the separator 203 positioned between each of the first electrode assemblies 230 and each of the second electrode assemblies 231 (FIG. 22C).

Figure 22D:
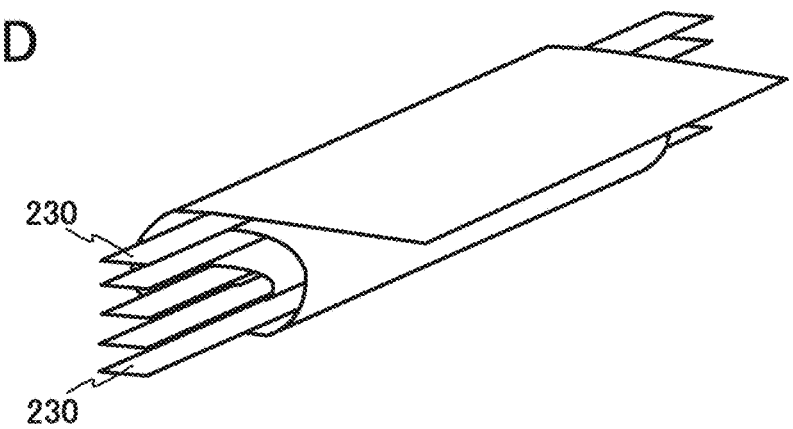

Then, the separator 203 is wound to cover the two first electrode assemblies 230 (FIG. 22D).

Since a plurality of first electrode assemblies 230 and a plurality of second electrode assemblies 231 are stacked in the above process, these electrode assemblies are each positioned surrounded with the spirally wound separator 203.

Note that the outermost electrode preferably does not include an active material layer on the outer side.

Although FIGS. 20C1 and 20C2 each illustrate a structure in which the electrode assembly includes three electrodes and two separators, one embodiment of the present invention is not limited to this structure. The electrode assembly may include four or more electrodes and three or mote separators. A larger number of electrodes lead to higher capacity of the secondary battery 250. Alternatively, the electrode assembly may include two electrodes and one separator. A smaller number of electrodes enable higher resistance of the secondary battery against bending. Although FIG. 21 illustrates the structure in which the secondary battery 250 includes three first electrode assemblies 230 and two second electrode assemblies 231, one embodiment of the present invention is not limited to this structure. The number of the electrode assemblies may be increased. A larger number of electrode assemblies lead to higher capacity of the secondary battery 250. The number of the electrode assemblies may be decreased. A smaller number of electrode assemblies enable higher resistance of the secondary battery against bending.

Figure 23:
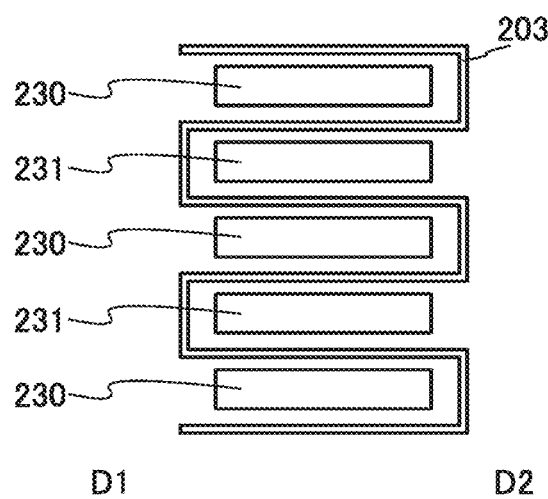
FIG. 23 illustrates an example of a power storage device.

FIG. 23 illustrates another example of a cross-sectional view along dashed-dotted line D1-D2 in FIG. 20B. As illustrated in FIG. 23, the separator 203 may be folded into a bellows shape so that the separator 203 is positioned between the first electrode assembly 230 and the second electrode assembly 231.

This embodiment can be combined with any of the other embodiments as appropriate.

Embodiment 4

In this embodiment, application examples of the power storage device of one embodiment of the present invention will be described with reference to FIGS. 24A to 24F to FIGS. 28A and 28B.

The power storage device of one embodiment of the present invention can be used for an electronic device or a lighting device, for example. The power storage device of one embodiment of the present invention has excellent charge and discharge characteristics. Therefore, the electronic device or the lighting device can be used for a long time by a single charge. Moreover, since a decrease in capacity with an increasing number of charge and discharge cycles is inhibited, the time between charges is unlikely to be reduced by repetitive charge. Furthermore, the power storage device of one embodiment of the present invention exhibits excellent charge and discharge characteristics and high long-term reliability and is highly safe at a wide range of temperature including high temperatures, so that the safety and reliability of an electronic device or a lighting device can be improved.

Examples of electronic devices include a television set (also referred to as a television or a television receiver), a monitor of a computer or the like; a digital camera, a digital video camera, a digital photo frame, a mobile phone (also referred to as mobile phone device), a portable game machine, a portable information terminal, an audio reproducing device; a large game machine such as a pinball machine, and the like.

Since the power storage device of one embodiment of the present invention is flexible, the power storage device or an electronic device or a lighting device using the power storage device can be incorporated along a curved inside/outside wall surface of a house or a building or a curved interior/exterior surface of a motor vehicle.

Figure 24A:
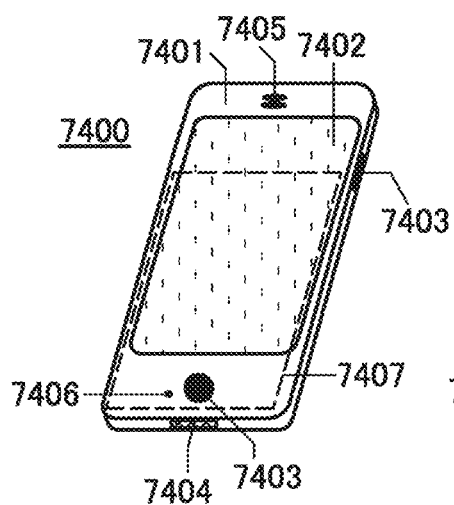
FIGS. 24A to 24F illustrate examples of electronic devices.

FIG. 24A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 24B:
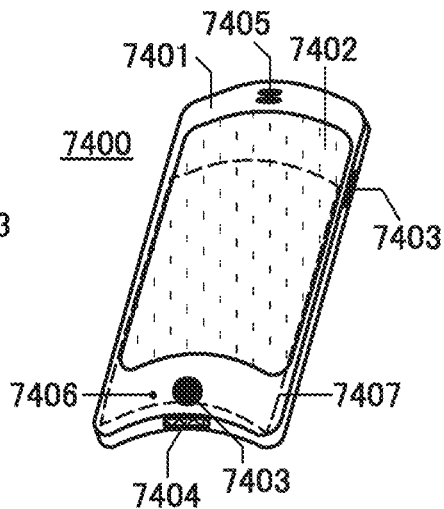
Figure 24C:
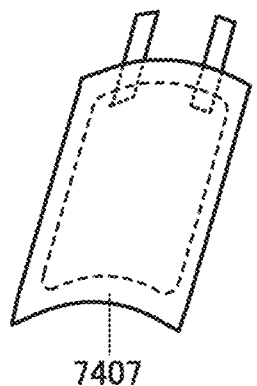

FIG. 24B illustrates the mobile phone 7400 in the state of being bent. When the whole mobile phone 7400 is bent by the external force, the power storage device 7407 included in the mobile phone 7400 is also bent. The power storage device 7407 is a thin power storage device. The power storage device 7407 is fixed in a state of being bent. FIG. 24C illustrates the power storage device 7407 in the state of being bent.

Figure 24D:
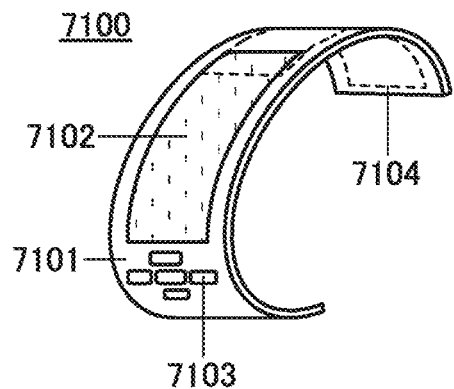
Figure 24E:

FIG. 24D illustrates an example of a bangle display device. A portable display device 7100 includes a housing 7101, a display portion 7102, an operation button 7103, and a power storage device 7104. FIG. 24E illustrates the bent power storage device 7104.

Figure 24F:
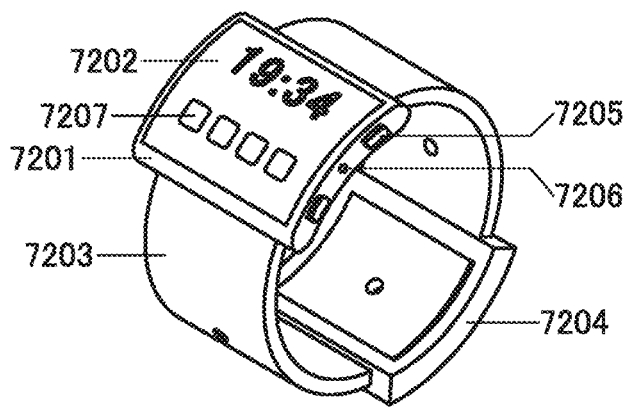

FIG. 24F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing text, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power ON/OFF, ON/OFF of wireless communication, setting and cancellation of silent mode, and setting and cancellation of power saving mode can be performed. For example, the functions of the operation button 7205 can be set freely by the operating system incorporated in the portable information terminal 7200.

Furthermore, the portable information terminal 7200 can employ near field communication, which is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with the power storage device of one embodiment of the present invention. For example, the power storage device 7104 illustrated in FIG. 24E that is in the state of being curved can be provided in the housing 7201. Alternatively, the power storage device 7104 illustrated in FIG. 24E can be provided in the band 7203 such that it can be curved.

Figure 25A:
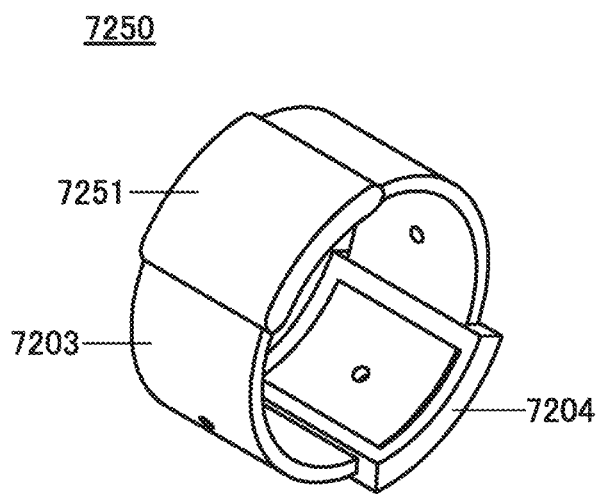
FIGS. 25A to 25D illustrate examples of electronic devices.

FIG. 25A illustrates an example of a wrist-worn activity meter. The activity meter 7250 includes a housing 7251, the band 7203, the buckle 7204, and the like. Furthermore, the housing 7251 incorporates a wireless communication device, a pulse sensor, an acceleration sensor, a temperature sensor, and the like. The activity meter 7250 has a function of acquiring data such as pulse variation and the amount of activity of the user with the pulse sensor and the acceleration sensor and sending the data to an external portable information terminal by the wireless communication device. Furthermore, the activity meter 7250 may have a function of measuring calorie consumption and calorie intake of the user, a function of measuring the number of steps taken, a function of measuring a sleeping condition, or the like. Note that the activity meter 7250 may be provided with a display portion for displaying data acquired by the above function.

The activity meter 7250 includes the power storage device of one embodiment of the present invention. For example, the power storage device 7104 illustrated in FIG. 24E that is in the state of being curved can be provided in the housing 7201. Alternatively, the power storage device 7104 illustrated in FIG. 24E can be provided in the band 7203 such that it can be curved.

Figure 25B:
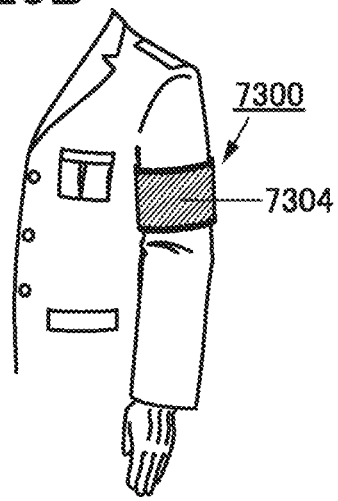

FIG. 25B illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example; near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

Figure 25C:
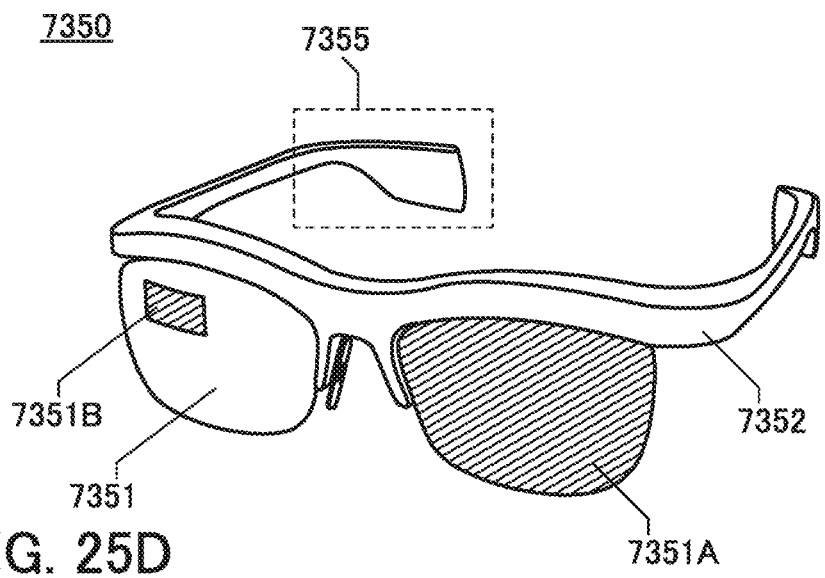

FIG. 25C illustrates an example of a glasses-type display device. A display device. 7350 includes lenses 7351, a frame 7352, and the like. Furthermore, a projection portion (not illustrated) that projects an image or video on the lenses 7351 is provided in the frame 7352 or in contact with the frame 7352. The display device 7350 has a function of displaying an image 7351A on the entire lenses 7351 in the direction in which the user can see the image 7351A. Alternatively, the display device 7350 has a function of displaying an image 7351B on part of the lenses 7351 in the direction in which the user can see the image 7351B.

Figure 25D:
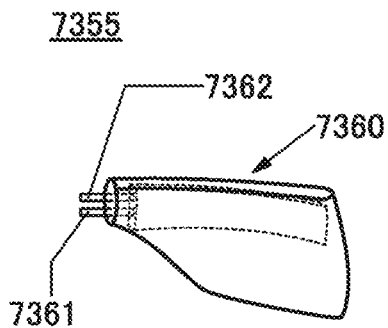

The display device 7350 includes the power storage device of one embodiment of the present invention. FIG. 25D is an enlarged view of an edge portion 7355 of the frame 7352. The edge portion 7355 can be formed using a rubber material such as fluorine rubber or silicone rubber. The power storage device 7360 of one embodiment of the present invention is embedded in the edge portion 7355, and the positive electrode lead 7361 and the negative electrode lead 7362 protrude from the edge portion 7355. The positive electrode lead 7361 and the negative electrode lead 7362 are electrically connected to a wiring provided in the frame 7352 and connected to a projection portion or the like. Note that the edge portion 7355 can be formed so as to incorporate the power storage device 7360 as in Embodiment 2.

The edge portion 7355 and the power storage device 7360 have flexibility. Thus, the display device 7350 can be worn so as to be in close contact with the user along with the shape of the head of the user.

Figure 26A:
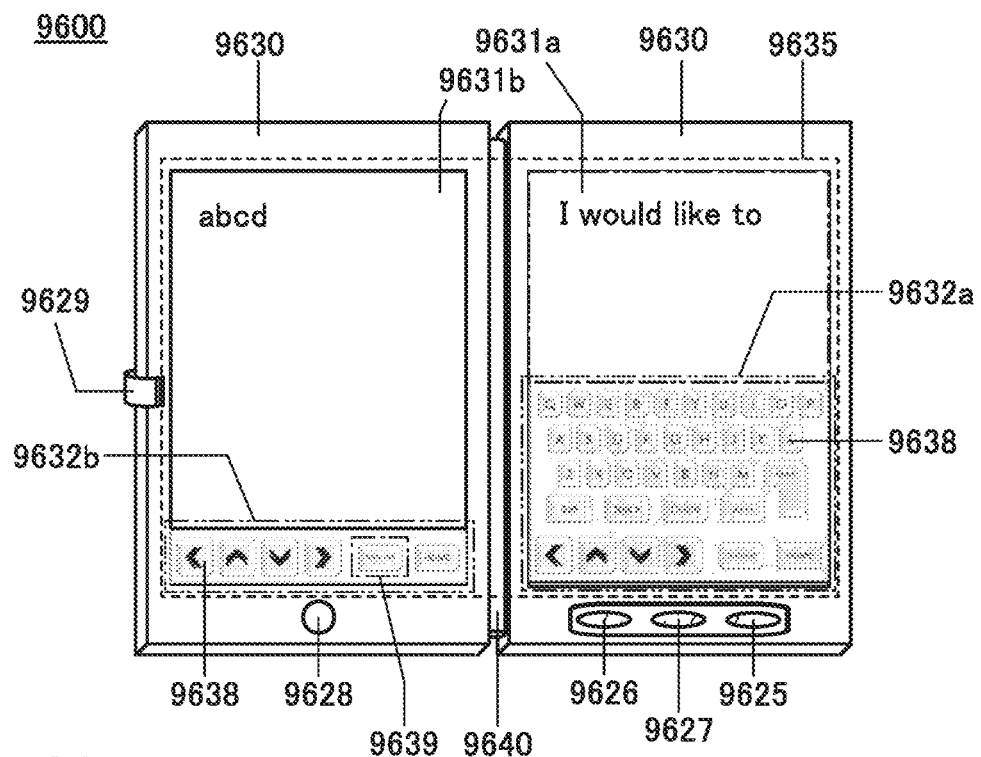
FIGS. 26A to 26C illustrate an example of an electronic device.
Figure 26B:
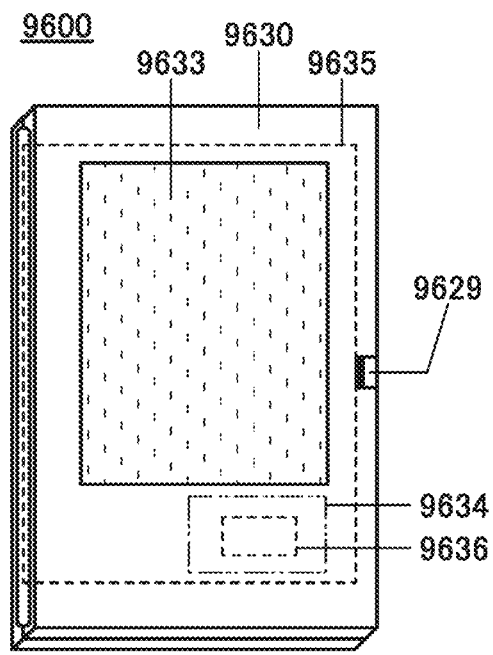

FIGS. 26A and 26B illustrate an example of a tablet terminal that can be folded in half. A tablet terminal 9600 illustrated in FIGS. 26A and 26B includes a pair of housings 9630, a movable portion 9640 connecting the pair of housings 9630, a display portion 9631a, a display portion 9631b, a display mode changing switch 9626, a power switch 9627, a power saving mode changing switch 9625, a fastener 9629, and an operation switch 9628. FIG. 2.6A illustrates the tablet terminal 9600 that is opened, and FIG. 26B illustrates the tablet terminal 9600 that is closed.

The tablet terminal 9600 includes a power storage unit 9635 inside the housings 9630. The power storage unit 9635 is provided across the housings 9630, passing through the movable portion 9640.

Part of the display portion 9631a can be a touch panel region 9632a, and data can be input by touching operation keys 9638 that are displayed. Note that FIG. 26A shows, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display a keyboard and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a linger, a stylus, or the like, a keyboard can be displayed on the display portion 9631b.

Touch input can be performed in the touch panel region 9632a and the touch panel region 9632b at the same time.

The display mode changing switch 9626 allows switching between a landscape node and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631a and the display portion 9631b have the same area in FIG. 26A, one embodiment of the present invention is not limited to this example. The display portion 9631a and the display portion 9631b may have different areas or different display quality. For example, one of the display portions 9631a and 9631b may display higher definition images than the other.

The tablet terminal is closed in FIG. 26B. The tablet terminal includes the housings 9630, a solar cell 9633, and a charge and discharge control circuit 9634 including a DC-DC converter 9636. The power storage device of one embodiment of the present invention is used as the power storage unit 9635.

The tablet terminal 9600 can be folded such that the housings 9630 overlap with each other when not in use. Thus, the display portions 9631a and 9631b can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 26A and 26B can also have a function or displaying various kinds of data (e.g., a still image, a moving image, and a text image) on the display portion, a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one surface or opposite surfaces of the housing 9630 and the power storage unit 9635 can lie charged efficiently. The use of a lithium-ion battery as the power storage unit 9635 brings an advantage such as reduction in size.

Figure 26C:
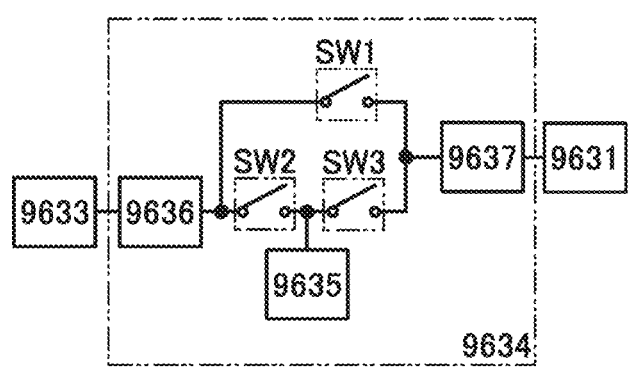

The structure and operation of the charge and discharge control circuit 9634 illustrated in FIG. 26B will be described with reference to a block diagram in FIG. 26C. The solar cell 9633, the power storage unit 9635, the DC-DC converter 9636, a converter 9637, switches SW1 to SW3, and the display portion 9631 are illustrated in FIG. 26C, and the power storage unit 9635, the DC-DC converter 9636, the converter 9637, and the switches SW1 to SW3 correspond to the charge and discharge control circuit 9634 in FIG. 26B.

First, an example of operation when electric power is generated by the solar Cell 9633 using external light will be described. The voltage of electric power generated by the solar cell is raised or lowered by the DC-DC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 27:
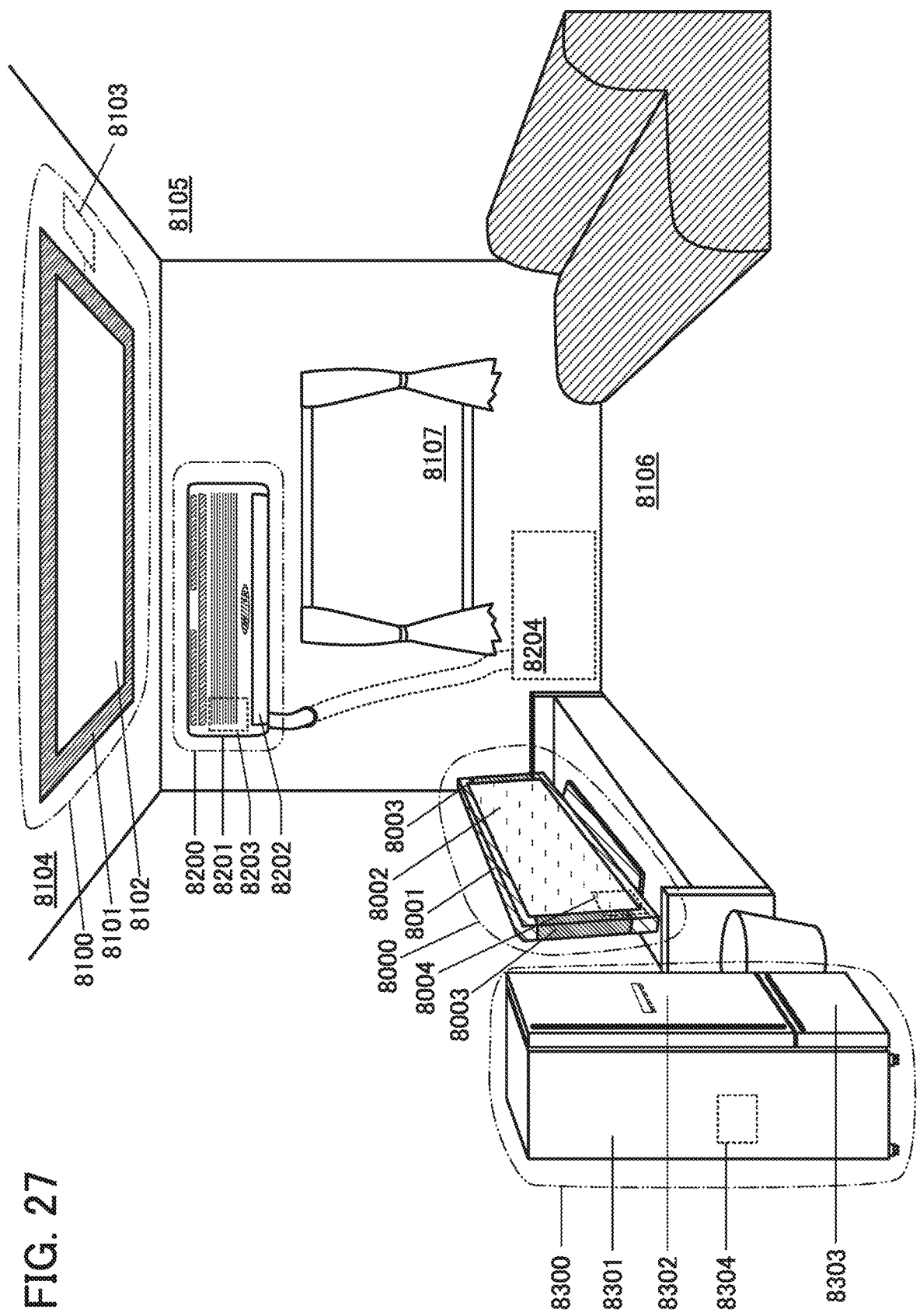
FIG. 27 illustrates examples of electronic devices.

FIG. 27 illustrates other examples of electronic devices. In FIG. 27, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one-embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterrupted power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 27, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 27 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 27 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used.

Specifically, an incandescent lamp, a discharge lamp such as a fluorescent lamp, and light-emitting elements such as an LED and an organic EL element are given as examples of the artificial light source.

In FIG. 27, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 27 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 27 as an example, the power storage device of one embodiment of the present invention can be used in an air conditioner in which the functions of an indoor unit and an outdoor unit are integrated in one housing.

In FIG. 27, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 27. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that a high-frequency heating apparatus such as a microwave oven and an electronic device such as an electric, rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

Furthermore, the power storage device of one embodiment of the present invention can be provided in a vehicle.

The use of power storage devices in vehicles enables production of next-generation clean energy vehicles such as hybrid electric vehicles (HEVs), electric vehicles (EVs), and plug-in hybrid electric vehicles (PHEVs).

Figure 28A:
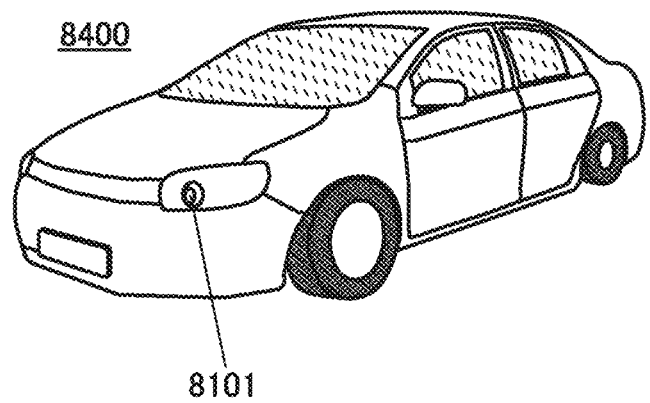
FIGS. 28A and 28B illustrate examples of electronic devices.
Figure 28B:
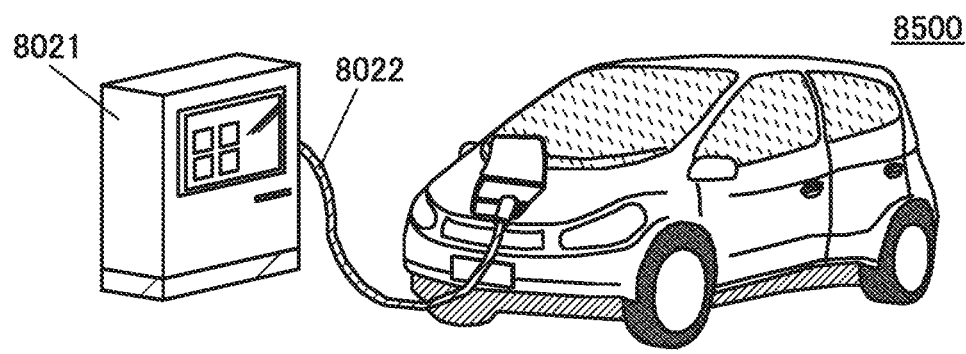

FIGS. 28A and 28B each illustrate an example of a vehicle using one embodiment of the present invention. An automobile 8400 illustrated in FIG. 28A is an electric vehicle that runs on the power of an electric motor. Alternatively, the automobile 8400 is a hybrid electric vehicle capable of driving appropriately using either the electric motor or the engine. One embodiment of the present invention can provide a high-mileage vehicle. The automobile 8400 includes the power storage device. The power storage device is used not only for driving the electric motor, but also for supplying electric power to a light-emitting-device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 28B illustrates an automobile 8500 including the power storage device. The automobile 8500 can be charged when the power storage device is supplied with electric power through external charging equipment by a plug-in system, a contactless power feeding system, or the like. In FIG. 28B, a power storage device included in the automobile 8500 is charged with the use of a ground-based charging apparatus 8021 through a cable 8022. In charging a given method such as CHAdeMO (registered trademark) or combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner in the case of the contactless power feeding system, by fitting a power transmitting device in a road or an exterior wall, charging can be performed not. Only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic, resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to produces other than the vehicle. In such a case, the use of a commercial power source can be avoided at peak time of electric power demand.

This embodiment can be combined with any of the other embodiments as appropriate.

Example 1

In this example, evaluation results of the characteristics of the power storage device of one embodiment of the present invention that was fabricated will be described.

In this example, the power storage device 500 illustrated in FIG. 1A was fabricated.

In this example, the following 8 samples formed using one embodiment of the present invention were used in total: Samples A1, A2, B1, B2, C1, C2, D1, and D2.

The samples fabricated in this example each include one positive electrode in which a positive electrode active material layer is provided on one surface of a positive electrode current collector and one negative electrode in which a negative electrode active material layer is provided on one surface of a negative electrode current collector. In other words, the samples in this example each include one positive electrode active material layer and one negative electrode active material layer.

First, methods for fabricating the electrodes will be described.

[Fabricating Method for Negative Electrode]

The same fabricating method was used to form the negative electrodes of all the samples in this example.

Spherical natural graphite having a specific surface area of 6.3 m$^2$/g and an average particle size of 15 μm (CGB-15 manufactured by Nippon Graphite Industries, Co., Ltd.) was used as a negative electrode active material. For a binder, sodium carboxymethyl cellulose (CMC-Na) and SBR were used. The polymerization degree of CMC-Na that was used was higher than or equal to 600 and lower than or equal to 800, and the viscosity of a 1 wt % CMC Na aqueous solution was in the range from 300 mPa·s to 500 mPa·s. The compounding ratio of graphite: CMC-Na:SBR was set to 97:1:1.5 (wt %).

First, CMC-Na powder and an active material were mixed and then kneaded with a mixer, so that a first mixture was obtained.

Subsequently, a small amount of water was added to the first mixture and kneading was performed, so that a second mixture was, obtained. Here, "kneading" means "mixing something with a high viscosity".

Then, water was further added and the mixture was kneaded with a mixer, so that a third mixture was obtained:

Then, a 50 wt % SBR aqueous dispersion liquid was added to the third mixture, and mixing was performed with a mixer. After that, the obtained mixture was degassed under a reduced pressure, so that a slurry was obtained.

Subsequently, the slurry was applied to a negative electrode current collector with the use of a continuous coater. An 18-μm-thick rolled copper foil was used as the negative electrode current collector. The coating speed was set to 0.75 m/min.

Then, the solvent in the slurry applied to the negative electrode current collector was vaporized in a drying furnace. Vaporization treatment was performed at 50° C. in an air atmosphere for 120 seconds and then further performed at 80° C. in the air atmosphere for 120 seconds. After that, further vaporization treatment was performed at 100° C. under a reduced pressure (−100 KPa) for 10 hours.

Through the above steps, the negative electrode active material layer was formed on one surface of the negative electrode current collector, so that the negative electrode was fabricated.

[Fabrication Method for Positive Electrode]

The same fabrication method was used to fabricate the positive electrodes of all the samples in this example.

As each positive electrode active material, $LiCoO_2$ with a specific surface area of 0.21 m$^2$/g and an average particle size of 10 μm was used. As each binder, polyvinylidene fluoride (PVdF) was used. As each conductive additive, acetylene black was used. The compounding ratio of $LiCoO_2$:acetylene black:PVdF was set to 90:5:5 (wt %).

First, acetylene black and PVdF were mixed in a mixer, so that a first mixture was obtained.

Next, the active material was added to the first mixture, so that a second mixture was obtained.

After that, a solvent N-methyl-2-pyrrolidone (NMP) was added to the second mixture and mixing was performed with a mixer. Through the above steps, a slurry was formed.

Then, mixing was performed with a large-sized mixer.

Subsequently, the slurry was applied to a positive electrode current collector with the use of a continuous coater. A 20-μm-thick aluminum current collector was used as the positive electrode current collector. The coating speed was set to 0.2 m/min.

Then, the solvent in the slurry applied to the positive electrode current collector was vaporized in a drying furnace. Solvent vaporization treatment was performed at 70° C. in an air atmosphere for 7.5 minutes and then further performed at 90° C. in the air atmosphere for 7.5 minutes.

After that, heat treatment was performed in a reduced-pressure atmosphere (at a gauge pressure of −100 kPa) at 170° C. for 10 hours, Subsequently, the positive electrode active material layer was pressed by a roll press method so as to be consolidated.

Through the above steps, the positive electrode active material layer was formed on one surface of the positive electrode current collector, so that the positive electrode was fabricated.

Table 1 lists the averages of the active material loadings, the thicknesses, and the densities of each of the positive electrode active material layers and the negative electrode active material layers that were formed. The values shown in this specification are the averages of measurement values of each of the electrodes used in fabricating the samples. Note that when the active material layers, were formed on opposite surfaces of the current collector, the values are the averages of the active material loadings, the thicknesses, and the densities of the active material layer on one surface of the current collector.

TABLE 1

|  |  | Sample A1 | Sample A2 | Sample B1 | Sample B2 |
|---|---|---|---|---|---|
| Positive electrode | Load (mg/cm$^2$) | 19.8 | 19.8 | 19.8 | 19.8 |
|  | Thickness (μm) | 82 | 80 | 79 | 78 |
|  | Density (g/cc) | 2.42 | 2.48 | 2.50 | 2.54 |
| Negative electrode | Load (mg/cm$^2$) | 10.2 | 10.2 | 10.3 | 10.3 |
|  | Thickness (μm) | 108 | 107 | 111 | 110 |
|  | Density (g/cc) | 0.94 | 0.95 | 0.92 | 0.93 |

|  |  | Sample C1 | Sample C2 | Sample D1 | Sample D2 |
|---|---|---|---|---|---|
| Positive electrode | Load (mg/cm$^2$) | 19.8 | 19.8 | 19.0 | 19.9 |
|  | Thickness (μm) | 81 | 81 | 84 | 75 |
|  | Density (g/cc) | 2.40 | 2.40 | 2.26 | 2.65 |
| Negative electrode | Load (mg/cm$^2$) | 10.2 | 10.2 | 10.1 | 10.4 |
|  | Thickness (μm) | 108 | 107 | 108 | 111 |
|  | Density (g/cc) | 0.94 | 0.95 | 0.93 | 0.93 |

In electrolytic solutions, a solvent in which EC and PC are mixed at a volume ratio of 1:1 was used, and various kinds of solutes and additives were used as in Table 2. In each of Samples A1 and A2 (hereinafter, the composition of the electrolytic solutions of these samples is referred to as Condition A), 1 mol/l of LiTFSA was used as a solute of the electrolytic solution, and 1 wt % of VC and 2 wt % of LiFSA were used as additives. In each of Samples B1 and B2 (hereinafter, the composition of the electrolytic solutions of these samples is referred to as Condition B), 1 mol/l of LiFSA was used as a solute of the electrolytic solution, and 1 wt % of VC was used as an additive. In each of Samples C1 and C2 (hereinafter, the composition of the electrolytic solutions of these samples is referred to as Condition C), 1 mmol/l of LiBETA was used as a solute of the electrolytic solution, and 1 wt % of VC was used as an additive. In each of Samples D1 and D2 (hereinafter, the composition of the electrolytic solutions of these samples is referred to as Condition D), 1 mol/l of LiBETA was used as a solute of the electrolytic solution, and 1 wt % of PS was used as an additive. In each sample of Condition A, LiFSA was used as the additive, whereas in each sample of Condition B, LiFSA was used as the solute.

TABLE 2

|  |  | Sample A1, A2 | Sample B1, B2 | Sample C1, C2 | Sample D1, D2 |
|---|---|---|---|---|---|
| Electrolytic solution | Solvent | EC:PC = 1:1 (v/v) | | | |
|  | Solute | LiTFSA 1 mol/l | LiFSA 1 mol/l | LiBETA 1 mol/l | LiBETA 1 mol/l |
|  | Additive 1 | VC 1 wt % | VC 1 wt % | VC 1 wt % | PS 1 wt % |
|  | Additive 2 | LiFSA 2 wt % |  |  | — |

As each separator, a stack of two 46-μm-thick separators using polyphenylene sulfide (hereinafter also referred to as PPS separators) was used.

As an exterior body, an aluminum film with opposite surfaces covered with a resin layer was used.

Next, fabrication methods for the samples will be described.

First, a positive electrode, a negative electrode, and a separator were cut. The size of the positive electrode is 20.49 cm$^2$, and the size of the negative electrode is 23.84 cm$^2$.

Then, the positive electrode active material and the negative electrode active material in tab regions were removed to expose the current collectors.

After that, the positive electrode and the negative electrode were stacked with the separator therebetween. At this time, the positive electrode and the negative electrode were stacked such that the positive electrode active material layer and the negative electrode active material layer faced each other.

Then, leads were attached to the positive electrode and the negative electrode by ultrasonic welding.

Then, facing parts of two of four sides of the exterior body were bonded to each other by heating.

After that, sealing layers provided for the leads were positioned so as to overlap with a sealing layer of the exterior body, and bonding was performed by heating. At this time, facing parts of a side of the exterior body except a side used for introduction of an electrolytic solution were-bonded to each other.

Next, heat treatment for drying the exterior body and the positive electrode, the separator, and the negative electrode wrapped by the exterior body was performed in a reduced-pressure atmosphere (at a gauge pressure of −100 kPa) at 80° C. for 10 hours.

Subsequently, in an argon gas atmosphere, an approximately 600 μl of electrolytic solution was introduced from one side of the exterior body that was not sealed. After that, the one side of the exterior body was sealed by heating in a reduced-pressure atmosphere (at a gauge pressure of −60 kPa). Through the above steps, each thin storage battery was fabricated.

Next, heat treatment was performed on Samples A2, B2, C2, and D2. Assuming that each sample and fluorine rubber are integrally formed as in Embodiment 2, heat treatment was performed in an atmospheric pressure atmosphere at 170° C. for 15 minutes. Specifically, the temperature of a thermostatic bath was raised to approximately 170° C., each sample was put in the thermostatic bath, and after 15 minutes, the sample was taken out. Expansion accompanying the heat treatment did not occur in the exterior body of each sample.

Through the above steps, the samples were fabricated.

Next, the charge and discharge characteristics at 25° C. of the samples in this example were measured. The measurement was performed with a charge-discharge measuring instrument (produced by TOYO SYSTEM Co., LTD.). Constant current-constant voltage charging was performed until the voltage reached an upper voltage limit of 4.3 V, and constant voltage discharging was performed until the voltage reached a lower voltage limit of 2.5 V. The charging and discharging were performed at a rate of 0.1 C, and a 10-minute break was taken after the charging. Note that two charge and discharge cycles were performed.

Here, a charge rate and a discharge rate will be described. A charge rate of C means a current value at which a cell with a capacity of X (Ah) is charged at a constant current such that charging is terminated in exactly 1 hour. When 1 C=I(A), a charge rate of 0.2 C means I/5 (A), i.e., a current value at which charging is terminated in exactly 5 hours. Similarly, a discharge rate of 1 C means a current value at which a cell with a capacity of X (Ah) is discharged at a constant current such that discharging is terminated in exactly 1 hour. A discharge rate of 0.2 C means I/5 (A), i.e., a current value at which discharging is terminated in exactly 5 hours. Note that the rates were calculated using 170 mAh/g, which is capacity obtained when the upper charging voltage limit of $LiCoO_2$ serving as the positive electrode active material, is 4.3 V, as a reference.

Figure 29A:
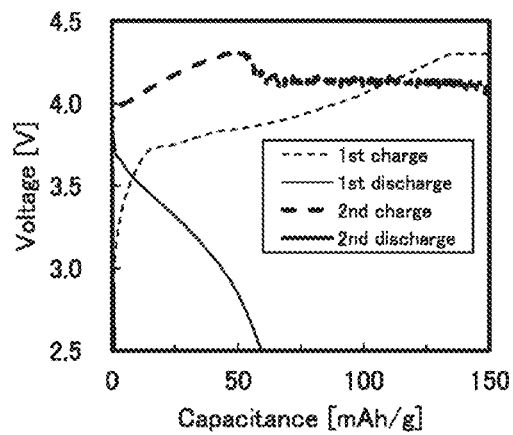
FIGS. 29A to 29D each show charge and discharge curves in Example 1.
Figure 29B:
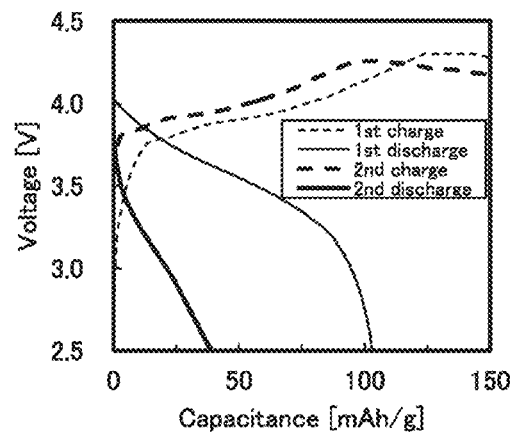
Figure 29C:
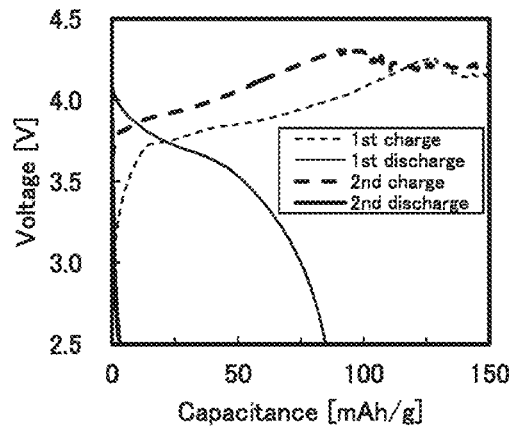
Figure 29D:
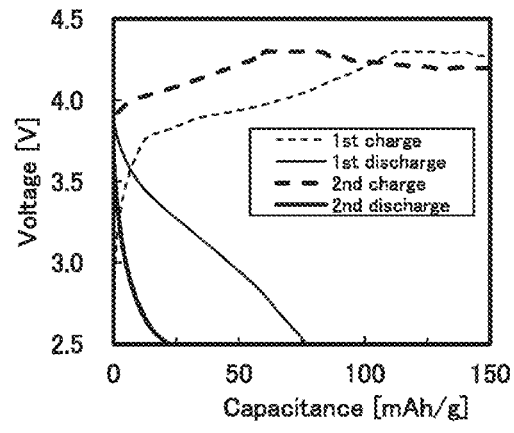
Figure 30A:
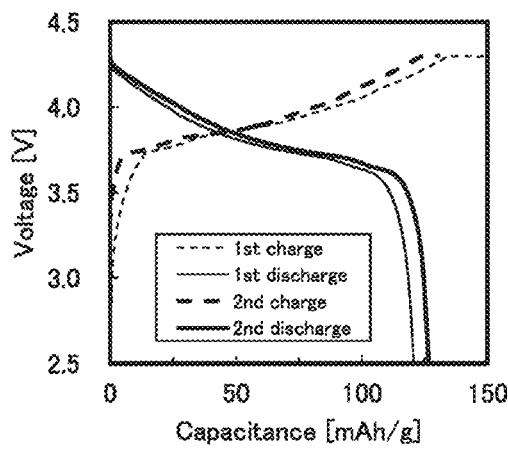
FIGS. 30A to 30D each show charge and discharge curves in Example 1.
Figure 30B:
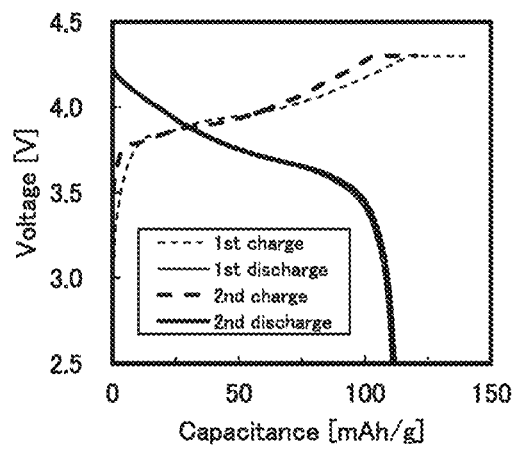
Figure 30C:
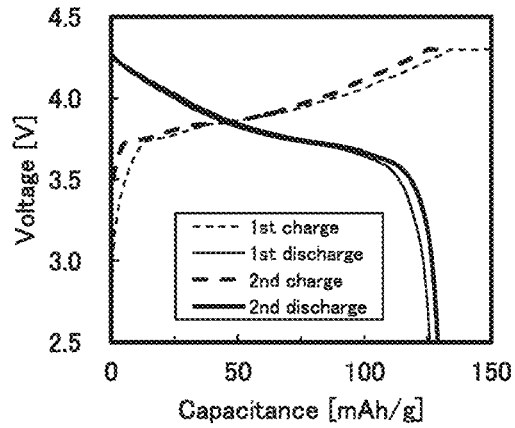
Figure 30D:
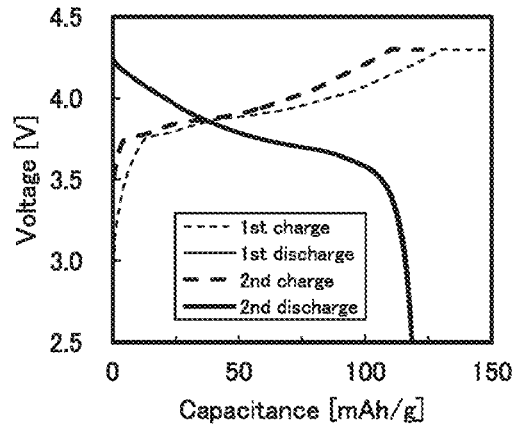

FIG. 29A shows charge and discharge curves of Sample A1. FIG. 29B shows charge and discharge curves of Sample A2. FIG. 29C shows charge and discharge curves of Sample B1. FIG. 29D shows charge and discharge curves of Sample B2. FIG. 30A shows charge and discharge curves of Sample C1. FIG. 30B shows charge and discharge curves of Sample C2. FIG. 30C shows charge and discharge curves of Sample D1. FIG. 30D shows charge and discharge curves of Sample D2. In FIGS. 29A to 29D and FIGS. 30A to 30D, the horizontal axis represents capacity (mAh/g), and the vertical axis represents voltage (V).

As shown in FIGS. 29A and 29C, abnormal conditions occurred in the first charging of Samples A1, A2, B1, and B2, and the characteristics of Samples A1, A2, B and B2 were noticeably degraded in the first discharging. In the second discharging, the characteristics were further degraded. This suggests that LiTFSA and LiFSA, which are solutes of the electrolytic solutions, corrode aluminum of the positive electrode current collectors in the state where the potentials of the positive electrodes are high. Similar abnormal conditions occurred in the samples of Conditions A and B subjected to heat treatment (see FIGS. 29B and 29D).

In contrast, as shown in FIGS. 30A and 30C, the first charging and the second charging were normally performed in Samples C1, C2, D1, and D2, and they have favorable charge and discharge characteristics. These results indicate that even in charging and discharging at a charging voltage of 4.3 V, corrosion of the positive electrode current collectors in the power storage devices using LiBETA as the solutes was inhibited and thus the power storage devices stably operated. As shown in FIGS. 30B and 30D, decreases in the capacities of the samples of Conditions C and D subjected to heat treatment are small, and the samples have normal charge and discharge characteristics and high heat resistance. Table 3 shows the discharge capacity retention rates of the samples of Conditions C and D that are subjected to heat treatment. The discharge capacity retention rates were calculated using respective discharge capacities of the samples in the second cycle.

TABLE 3

|  | Capacity obtained without heat treatment (mAh/g) | Capacity obtained with heat treatment (mAh/g) | Capacity retention ratio obtained by heating (%) |
|---|---|---|---|
| Condition C | 126.7 (C1) | 111.9 (C2) | 88.3 |
| Condition D | 129.0 (D1) | 118.6 (D2) | 91.9 |

FIGS. 30B and 30D and Table 3 indicate that the power storage device using the electrolytic solution of Condition D have the highest heat resistance and the highest battery capacity.

Example 2

In this example, results obtained by performing experiments to examine the state of a surface of spherical natural graphite used for the negative electrode active material included in the power storage device of one embodiment of the present invention will be described.

[Cross-Sectional TEM Observation]

Figure 31A:
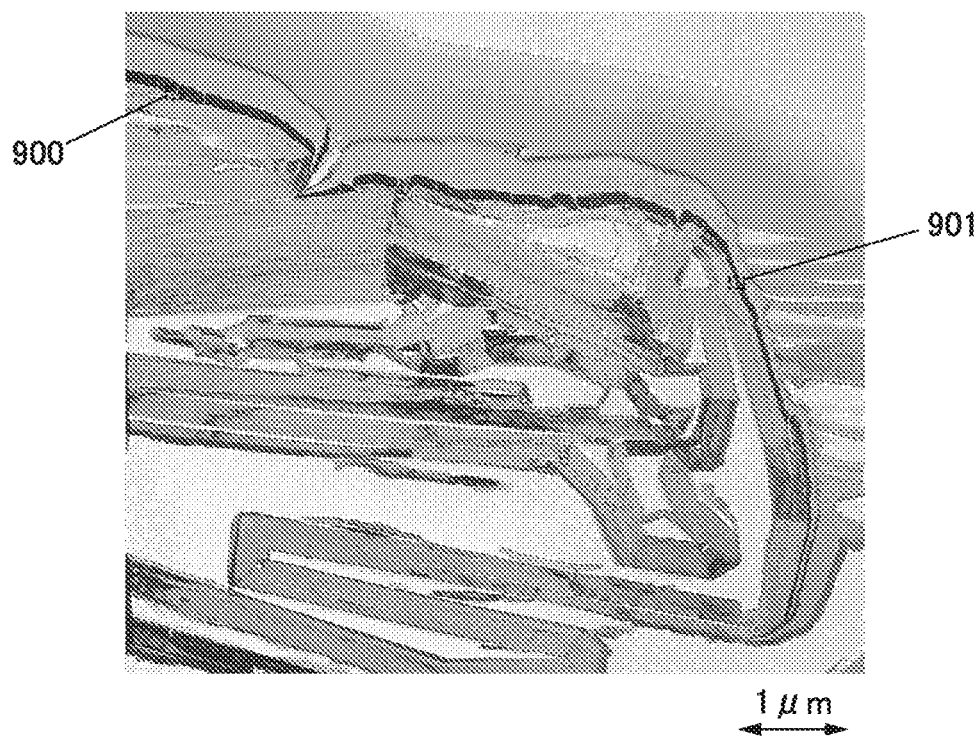
FIGS. 31A to 31C are cross-sectional TEM images in Example 2.
Figure 31B:
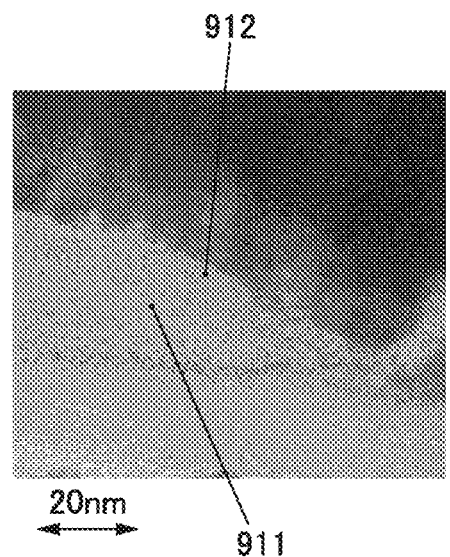
Figure 31C:
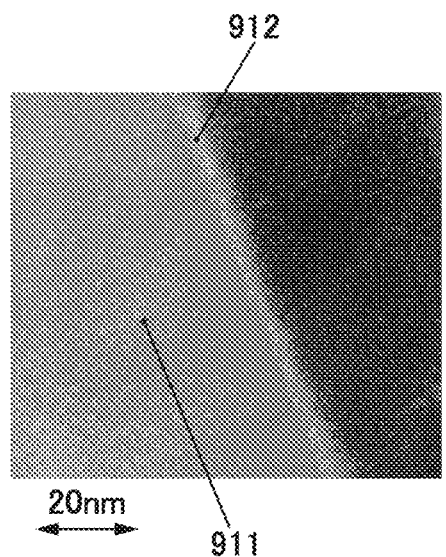

Spherical natural graphite powder was sliced by a focused ion beam (FIB) method and taken out as a sample. The sample was observed with a cross-sectional transmission electron microscope (TEM) (H-9000NAR manufactured by Hitachi High-Technologies Corporation) at an acceleration voltage of 200 kV. FIGS. 31A to 31C show obtained TEM images. FIGS. 31B and 31C are enlarged TEM images showing a region 900 including the vicinity of an edge plane and a region 901 including the vicinity of a basal plane in FIG. 31A, respectively. Note that a minute edge presumably exists even in a plane seen as the basal plane in the cross-sectional TEM observation.

The spherical natural graphite has a structure in which a graphite layer is folded (see FIG. 31A). As shown in FIGS. 31B and 31C, a coating layer 912 having lower crystallinity than graphite layers 911 arranged regularly is located outward from the graphite layers 911 (as the outermost surface layer of the spherical natural graphite) both in the vicinity of the edge plane and in the vicinity of the basal plane of the spherical natural graphite.

[Raman Spectroscopy]

Next, analysis results of Raman spectra by Raman spectroscopy will be described. For the analysis, two-point measurement was performed on spherical natural graphite powder with the use of a Raman microscope (LabRAM manufactured by HORIBA, Ltd.). Note that the wavelength of laser light used for the Raman analysis is 532 nm.

Figure 32:
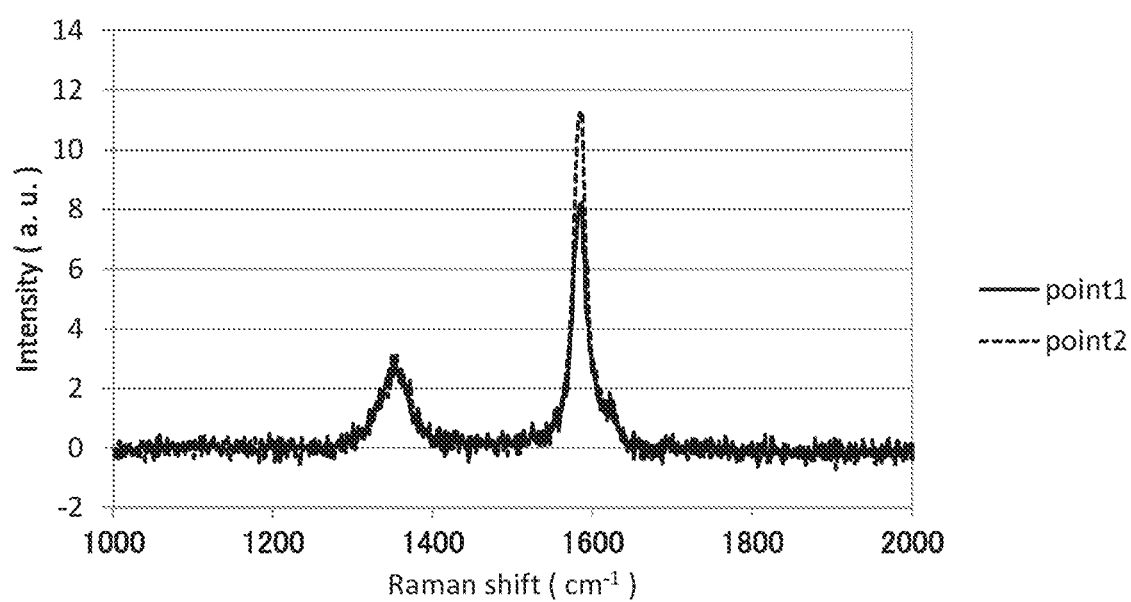
FIG. 32 shows analysis results of Raman spectra in Example 2.

FIG. 32 shows analysis results of Raman spectra of the spherical natural graphite powder. In FIG. 32, the D band (the peak at around 1360 $cm^{-1}$ of the Raman spectra), showing crystallinity disorder of graphite is clearly observed. Table 4 lists the intensity ratios (R values) of the D band to the G band (the peak at around 1580 $cm^{-1}$ of the Raman spectra). Since the D band is clearly observed, the R values are not small, specifically, 0.28 and 0.38. The R values, which are not small, may have a relation with the fact that the layer having reduced crystallinity on the surface of the spherical natural graphite is observed as shown in FIGS. 31B and 31C.

TABLE 4

|  | R value (D/G ratio) |
|---|---|
| Point 1 | 0.38 |
| Point 2 | 0.28 |

Such a layer having low crystallinity on the outermost surface of a graphite particle, which can be observed with a TEM or by Raman spectroscopy as in this example, may be able to inhibit PC intercalation between graphite layers.

Example 3

In this example, evaluation results of the characteristics of the power storage device of one embodiment of the present invention that was fabricated will be described.

In this example, the power storage device 500 illustrated in FIG. 1A was fabricated.

In this example, the following two samples formed using one embodiment of the present invention were used in total: Samples E1 and E2.

The samples fabricated in this example each include one positive electrode in which a positive electrode active material layer is provided on one surface of a positive electrode current collector and one negative electrode in which a negative electrode active material layer is provided on one surface of a negative electrode current collector. In other words, the samples in this example each include one positive electrode active material layer and one negative electrode active material layer.

First, methods for fabricating the electrodes will be described.

[Fabricating Method for Negative Electrode]

The same fabricating method was used to form the negative electrodes of all the samples in this example.

Spherical natural graphite having a specific, surface area of 6.3 m$^2$/g and an average particle size of 15 μm (CGB-15 manufactured by Nippon Graphite Industries, Co., Ltd.) was used as a negative electrode active material. For a binder, sodium carboxymethyl cellulose (CMC-Na) and SBR were used. The polymerization degree of CMC-Na that was used was higher than or equal to 600 and lower than or equal to 800, and the viscosity of a 1 wt % CMC-Na aqueous solution was in the range from 300 mPa·s to 500 mPa·s. The compounding ratio of graphite: CMC-Na:SBR was set to 97:1.5:1.5 (wt %).

First, CMC-Na powder and an active, material were mixed and then kneaded with a mixer, so that a first mixture was obtained.

Subsequently, a small amount of water was added to the first mixture and kneading was performed, so that a second mixture was obtained. Here, "kneading" means "mixing something with a high viscosity".

Then, water was further added and the mixture was kneaded with a mixer, so that a third mixture was obtained.

Then, a 50 wt % SBR aqueous dispersion liquid was added to the third mixture, and mixing was performed with a mixer. After that, the obtained mixture was degassed under a reduced pressure, so that a slurry was obtained.

Subsequently, the slurry was applied to a negative electrode current collector with the use of a continuous coater. An 18-μm-thick rolled copper foil was used as the negative electrode current collector. The coating speed was set to 0.75 m/min.

Then, the solvent in the slurry applied to the negative electrode current collector was vaporized in a drying furnace. Vaporization treatment was performed at 50° C. in an air atmosphere for 120 seconds and then further performed at 80° C. in the air atmosphere for 120 seconds. After that, further vaporization treatment was performed at 100° C. under a reduced pressure (−100 KPa) for 10 hours.

Through the above steps, the negative electrode active material layer was formed on opposite surfaces of the negative electrode current collector, so that the negative electrode was fabricated.

[Fabrication Method for Positive Electrode]

The same fabrication method was used to fabricate the positive electrodes of all the samples in this example.

As each positive electrode active material, LiCoO$_2$ with an average particle size of 6 μm was used. As each binder, polyvinylidene fluoride (PVdF) was used. As each conductive additive, acetylene black was used. The compounding ratio of LiCoO$_2$:acetylene black:PVdF was set to 95:3:2 (wt %).

First, acetylene black and PVdF were mixed in a mixer, so that a first mixture was obtained.

Next, the active material was added to the first mixture, so that a second mixture was obtained.

After that, a solvent N-methyl-2-pyrrolidone (NMP) was added to the second mixture and mixing was performed with a mixer. Through the above steps, a slurry was formed.

Then, mixing was performed with a large-sized mixer.

Subsequently, the slurry was applied to a positive electrode current collector with the use of a continuous coater. A 20-μm-thick aluminum current collector was used as the positive electrode current collector. The coating speed was set to 0.2 m/min.

Then, the solvent in the slurry applied to the positive electrode current collector was vaporized in a drying furnace. Solvent Vaporization treatment was performed at 70° C. in an air atmosphere for 7.5 minutes and then further performed at 90° C. in the air atmosphere for 7.5 minutes.

After that, heat treatment was performed in a reduced-pressure atmosphere (at a gauge pressure of −100 kPa) at 170 V for 10 hours. Subsequently, the positive electrode active material layer was pressed by a roll press method so as to be consolidated.

Through the above steps, the positive electrode active material layer was formed on one surface of the positive electrode current collector, so that the positive electrode was fabricated.

Table 5 lists the averages of the active material loadings, the thicknesses, and the densities of each of the positive electrode active material layers and the negative electrode active material layers that were formed. The values shown in this specification are the averages of measurement values of each of the electrodes used in fabricating, the samples. Note that when the active material layers were formed on opposite surfaces of the current collector, the values are the averages of the active material loadings, the thicknesses, and the densities of the active material layer on one surface of the current collector.

TABLE 5

|  |  | Sample E1 | Sample E2 |
|---|---|---|---|
| Positive electrode | Load (mg/cm$^2$) | 19.1 | 21.4 |
|  | Thickness (μm) | 61 | 69 |
|  | Density (g/cc) | 3.14 | 3.10 |
| Negative electrode | Load (mg/cm$^2$) | 10.3 | 10.4 |
|  | Thickness (μm) | 113 | 113 |
|  | Density (g/cc) | 0.92 | 0.92 |

In each electrolytic solution, a solvent in which EC and PC are mixed at a volume ratio of 1:1 was used, 1 mol/l of LiBETA was used as a solute, and 1 wt % of PS was used as an additive. Table 6 lists the condition of the electrolytic solution. The condition of the electrolytic solution for Samples E1 and E2 is similar to Condition D in Example 1.

TABLE 6

|  |  | Sample E1, E2 |
|---|---|---|
| Electrolytic solution | Solvent | EC:PC = 1:1 (v/v) |
|  | Solute | LiBETA 1 mol/l |
|  | Additive 1 | PS 1 wt % |
|  | Additive 2 | — |

As each separator, a stack of two 46-μm-thick separators using solvent-spun regenerated cellulosic fiber was used.

As an exterior body, an aluminum film with opposite surfaces covered with a resin layer was used.

Next, fabrication methods for the samples will be described.

First, a positive electrode, a negative electrode, and a separator were cut. The size of the positive electrode is 20.49 cm$^2$, and the size of the negative electrode is 23.84 cm$^2$.

Then, the positive electrode active material and the negative electrode active material in tab regions were removed to expose the current collectors.

After that, the positive electrode and the negative electrode were stacked with the separator therebetween. At this time, the positive electrode and the negative electrode were stacked such that the positive electrode active material layer and the negative electrode active material layer fated each other.

Then, leads were attached to the positive electrode and the negative electrode by ultrasonic welding.

Then, the stack of the positive electrode and the negative electrode was wrapped in a sheet using polyphenylene sulfide in order to prevent the positive electrode or the negative electrode from coming in contact with an aluminum layer of the exterior body when the aluminum layer is exposed by heat treatment performed on the battery; accordingly, a short circuit can be prevented.

Then, facing parts of two of four sides of the exterior body were bonded to each other by heating.

After that, sealing layers provided for the leads were positioned so as to overlap with a sealing layer of the exterior body, and bonding was performed by heating.

At this time, facing parts of a side of the exterior body except a side used for introduction of an electrolytic solution were bonded to each other.

Next, heat treatment for drying the exterior body and the positive electrode, the separator, and the negative electrode wrapped by the exterior body was performed in a reduced-pressure atmosphere (at a gauge pressure of −100 kPa) at 80° C. for 10 hours.

Subsequently, in an argon gas atmosphere, an approximately 600 μl of electrolytic solution was introduced from one side of the exterior body that was not sealed. After that, the one side of the exterior body was sealed by heating in a reduced-pressure atmosphere (at a gauge pressure of −100 kPa). Through the above steps, each thin power storage device was fabricated.

Next, heat treatment was performed on Sample E2. Assuming that the sample and fluorine rubber are integrally formed as in Embodiment 2, heat treatment was performed in an atmospheric pressure atmosphere at 170° C. for 15 minutes. Specifically, the temperature of a thermostatic bath was raised to approximately 170° C., the sample was put in the thermostatic bath, and after 15 minutes, the sample was taken out. Expansion accompanying the heat treatment did not occur in the exterior body of the sample.

Through the above steps, the samples were fabricated.

Next, the charge and discharge characteristics at 25° C. of the samples in this example were measured. The measurement was performed with a charge-discharge measuring instrument (produced by TOYO SYSTEM Co., LTD.). Constant current-constant voltage charging was performed until the voltage reached an upper voltage limit of 4.3 V, and constant voltage discharging was performed until the voltage reached a lower voltage limit of 2.5 V. The charging and discharging were performed at a rate of 0.1 C, and a 10-minute break was taken after the charging. Note that two charge and discharge cycles were performed.

Figure 33A:
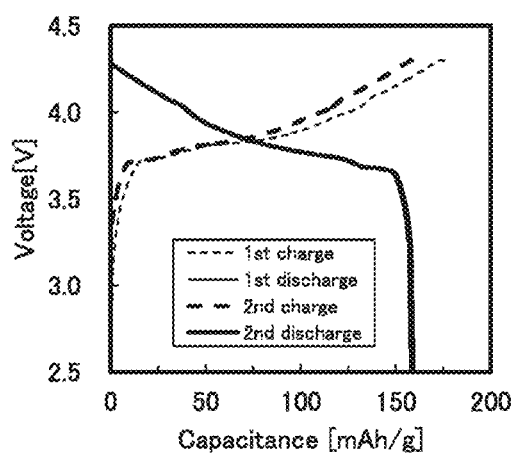
FIGS. 33A and 33B each show charge and discharge curves in Example 3.
Figure 33B:
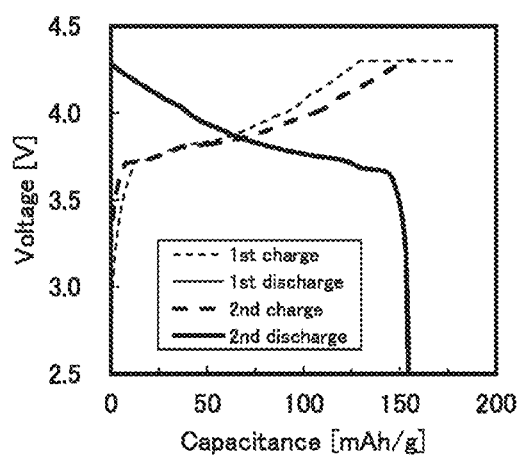

FIG. 33A shows charge and discharge curves of Sample E1. FIG. 33B shows charge and discharge curves of Sample E2. In FIGS. 33A and 33B, the horizontal axis represents capacity (mAh/g), and the vertical axis represents voltage (V).

As shown in FIGS. 33A and 33B, the first charging and the second charging were normally performed in Samples E1 and E2, and they have favorable charge and discharge characteristics. Furthermore, the results shown in FIG. 33B indicate that a decrease in the capacity of even the sample subjected to heat treatment is small, and the sample has normal charge and discharge characteristics and high heat resistance.

This application is based on Japanese Patent Application serial no. 2015-240755 filed with Japan Patent Office on Dec. 10, 2015, the entire contents of which are hereby incorporated by reference.

What is claimed is:

1. An electronic device comprising:
a power storage device comprising;
 a positive electrode electrically connected to a positive electrode lead;
 a negative electrode electrically connected to a negative electrode lead;
 a separator between the positive electrode and the negative electrode; and
 an electrolyte including propylene carbonate and ethylene carbonate, wherein the propylene carbonate is the highest proportion in the electrolyte except the ethylene carbonate as a solvent,
a band comprising a rubber material;
a display panel electrically connected to the power storage device; and
a housing,
wherein the negative electrode comprises graphite,
wherein the electrolyte further includes lithium bis(pentafluoroethanesulfonyl)amide,
wherein the power storage device is buried in the band,
wherein part of the positive electrode lead and part of the negative electrode lead protrude from the band,
wherein the power storage device has flexibility,
wherein the display panel is incorporated in the housing,
wherein the band is connected to the housing.

2. The electronic device according to claim 1, wherein the graphite in the negative electrode comprises a region having low crystallinity on a surface side.

3. The electronic device according to claim 1,
wherein the negative electrode comprises spherical natural graphite,
wherein the spherical natural graphite comprises a first region and a second region,
wherein the first region covers the second region, and
wherein the first region has lower crystallinity than the second region.

4. The electronic device according to claim 1, wherein the positive electrode comprises $LiCoO_2$.

5. The electronic device according to claim 1, wherein the positive electrode comprises aluminum or stainless steel.

6. The electronic device according to claim 1, wherein the rubber material is fluorine rubber or silicone rubber.

7. The electronic device according to claim 1, wherein the electrolyte further comprises any one of propane sultone and tert-butylbenzene.

8. The electronic device according to claim 1, wherein the electrolyte further comprises any one of vinylene carbonate and fluoroethylene carbonate.

9. The electronic device according to claim 1, wherein the electrolyte further comprises lithium bis(oxalato)borate.

\* \* \* \* \*